United States Patent [19]
Badagnani

[11] 3,987,420
[45] Oct. 19, 1976

[54] ELECTRONIC COMPUTER WITH EQUIPMENT FOR DEBUGGING OPERATIVE PROGRAMS

[75] Inventor: Guido Badagnani, Segrate (Milan), Italy

[73] Assignee: Ing. C. Olivetti & C., S.p.A., Ivrea (Turin), Italy

[22] Filed: Jan. 12, 1976

[21] Appl. No.: 648,587

Related U.S. Application Data

[63] Continuation of Ser. No. 529,493, Dec. 4, 1974.

[30] Foreign Application Priority Data

Dec. 28, 1973 Italy .................. 70879/73

[52] U.S. Cl. ............................. 340/172.5
[51] Int. Cl.² .............. G06F 3/02; G06F 11/04
[58] Field of Search ........................ 340/172.5

[56] References Cited
UNITED STATES PATENTS

| | | | |
|---|---|---|---|
| 3,187,321 | 6/1965 | Kameny | 340/172.5 X |
| 3,585,599 | 6/1971 | Hitt et al. | 340/172.5 |
| 3,618,028 | 11/1971 | Johnson et al. | 340/172.5 |
| 3,636,521 | 1/1972 | Wallace et al. | 340/172.5 |
| 3,678,466 | 7/1972 | Spangler | 340/172.5 |
| 3,744,034 | 7/1973 | Paul | 340/172.5 |
| 3,859,635 | 1/1975 | Watson et al. | 340/172.5 |

OTHER PUBLICATIONS

Bartow et al., "System/360 Model 85 Microdiagnostics" *S.J.C.C.* (*A.F.I.P.S.*), vol. 36, May 5–7, 1970, pp. 191–197.

*Primary Examiner*—Raulfe B. Zache
*Attorney, Agent, or Firm*—Schuyler, Birch, Swindler, McKie & Beckett

[57] ABSTRACT

Apparatus is provided for debugging a utility program without material increase in the memory capacity required. Such apparatus performs the debugging functions by using only the input-output devices as the keyboard, the console, the display, the M.C. reader which normally equip the computer. Actuation of a correction key activates the debugging program and interrupts operation of the utility program. The debugging program may be stored in a reserved portion of a ROM, or transferred into a predetermined storage area from magnetic card storage. This area is predetermined not to hold information significant to resumption of the utility program under test. A search is then made of the utility program, e.g., by addresses of the individual instructions, for the erroneous instruction. Upon discovery thereof, a correct instruction is keyed in directly from the keyboard to replace the erroneous instruction.

The debugging program records this correct instruction at the approriate addressed location in memory.

16 Claims, 36 Drawing Figures

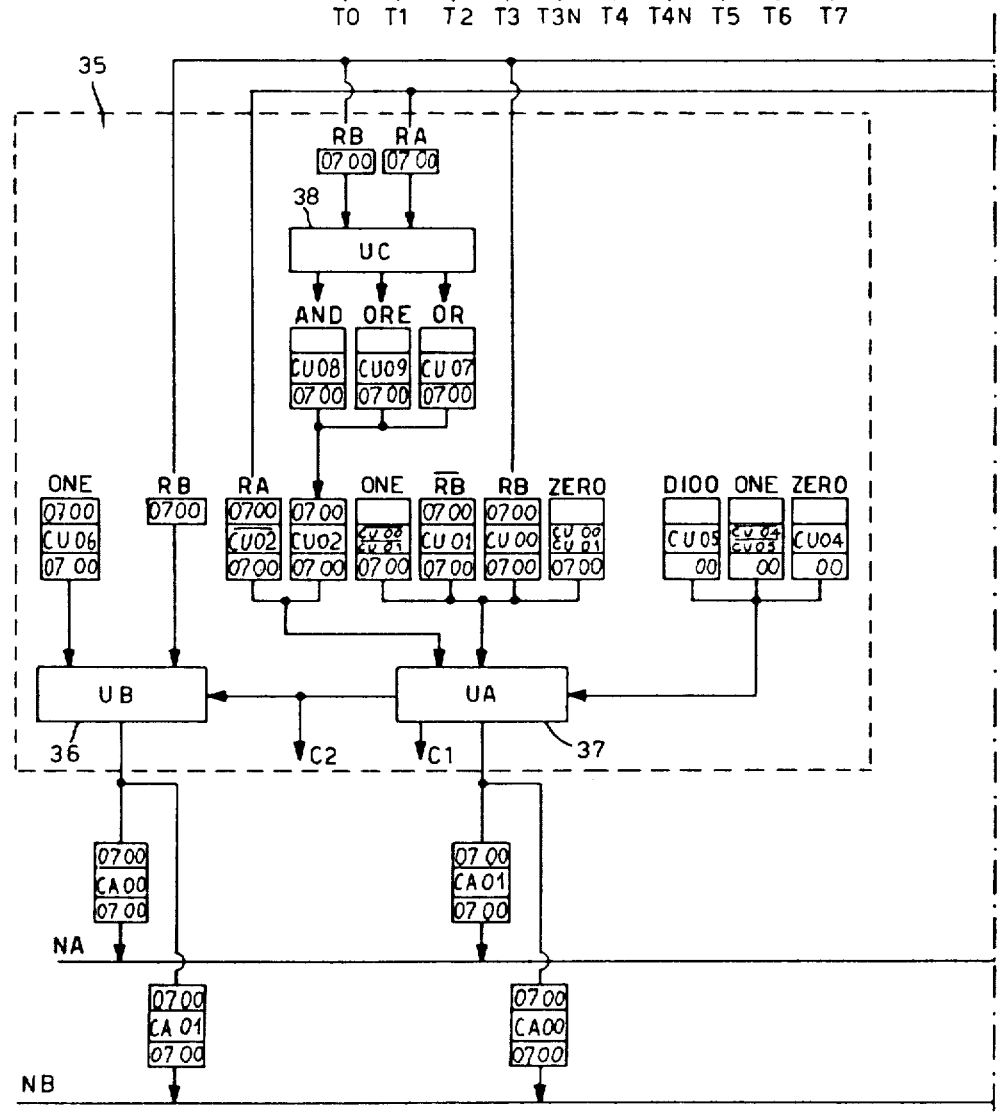

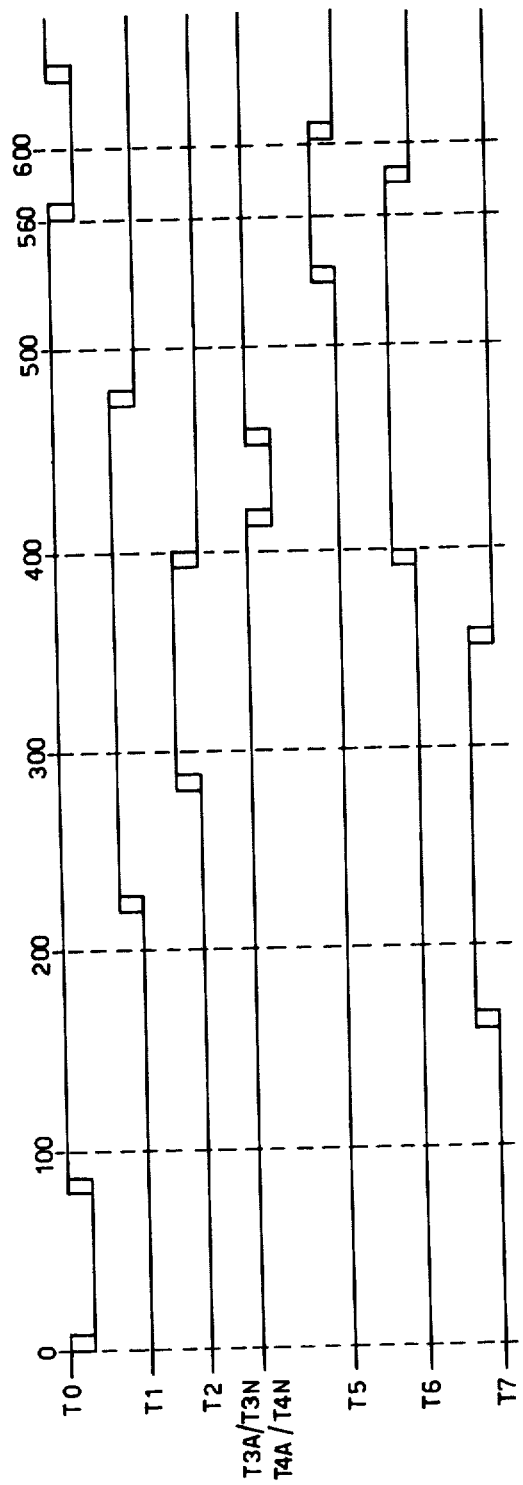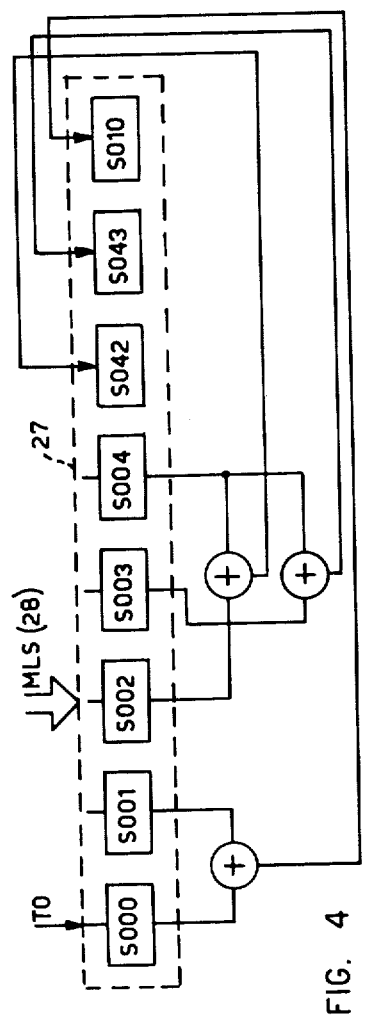
FIG. 3
FIG. 4

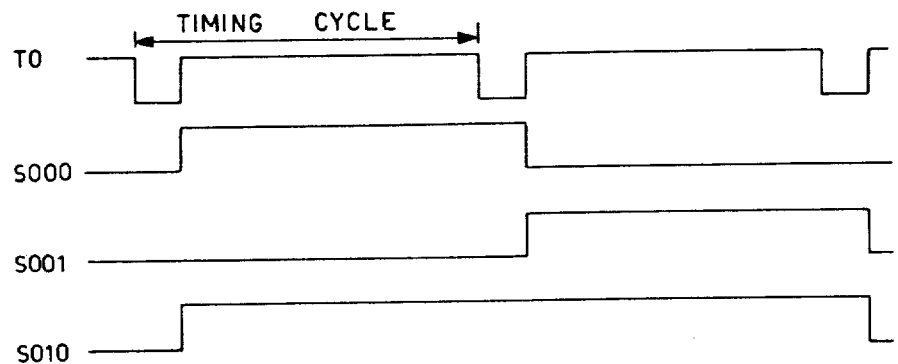
FIG. 5
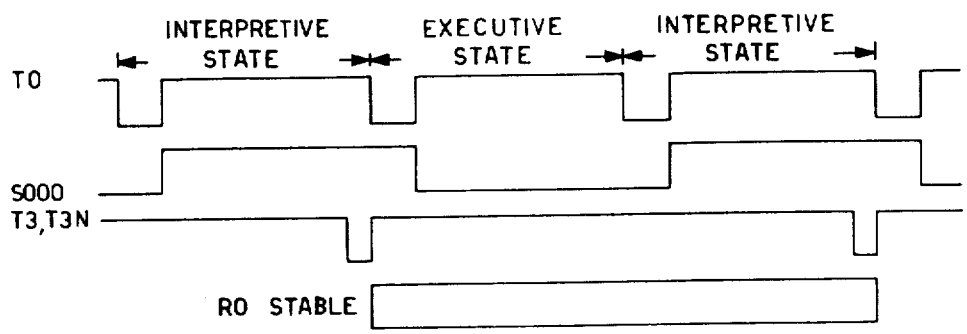
FIG. 6
FIG. 7
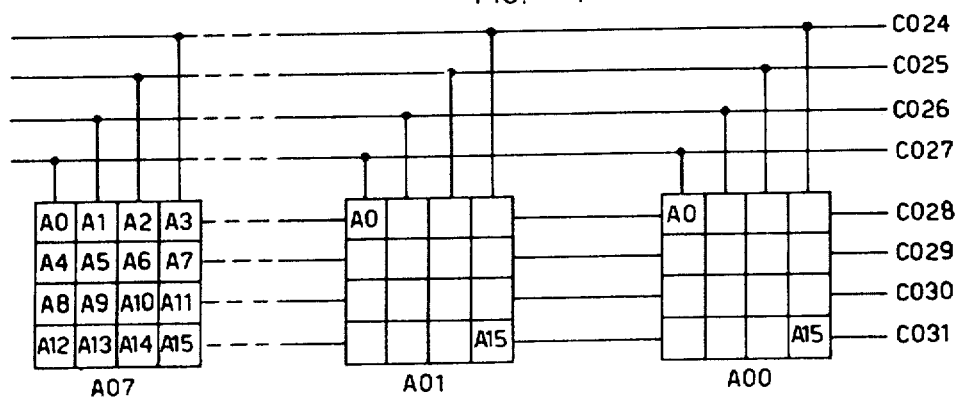

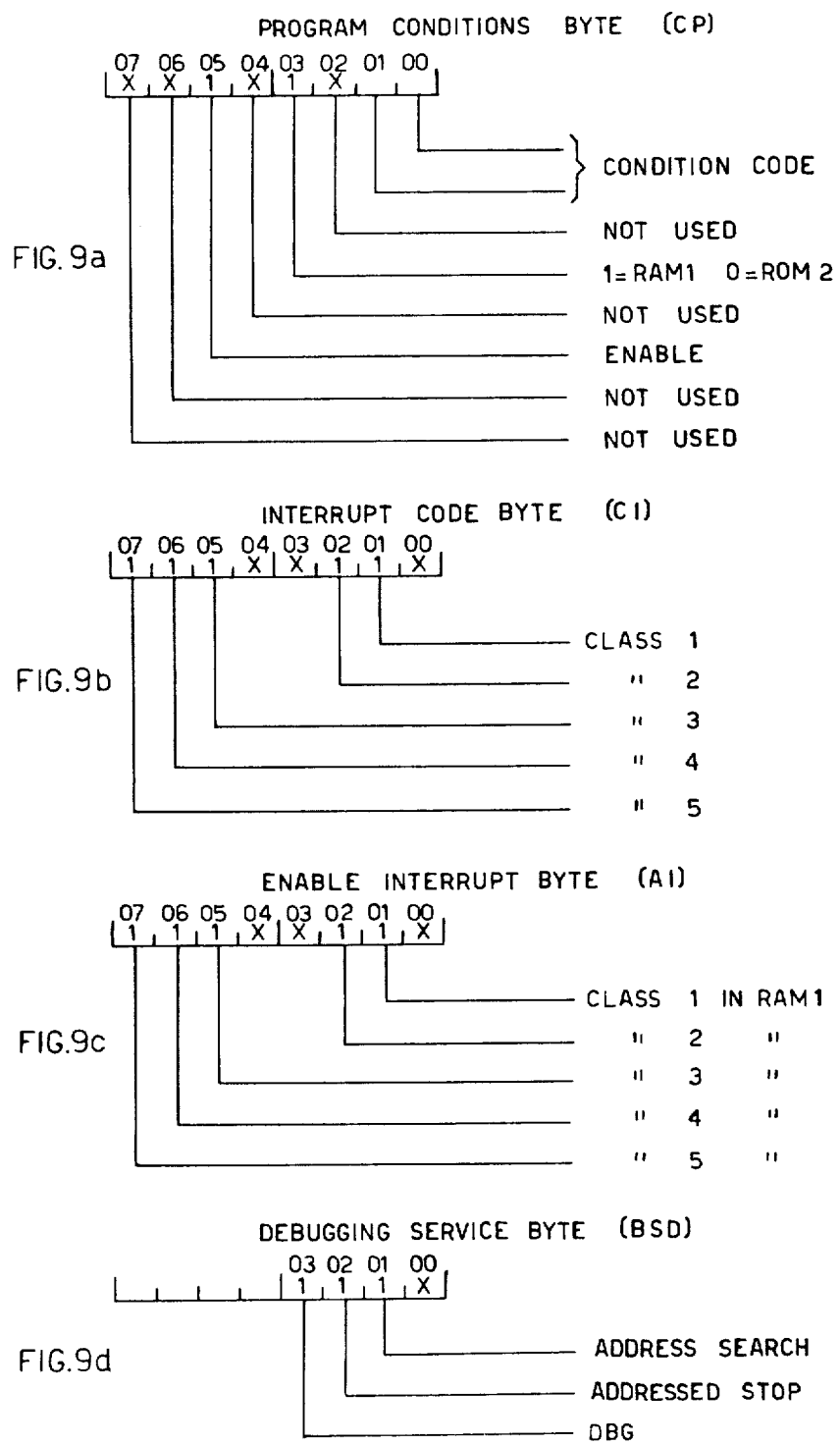

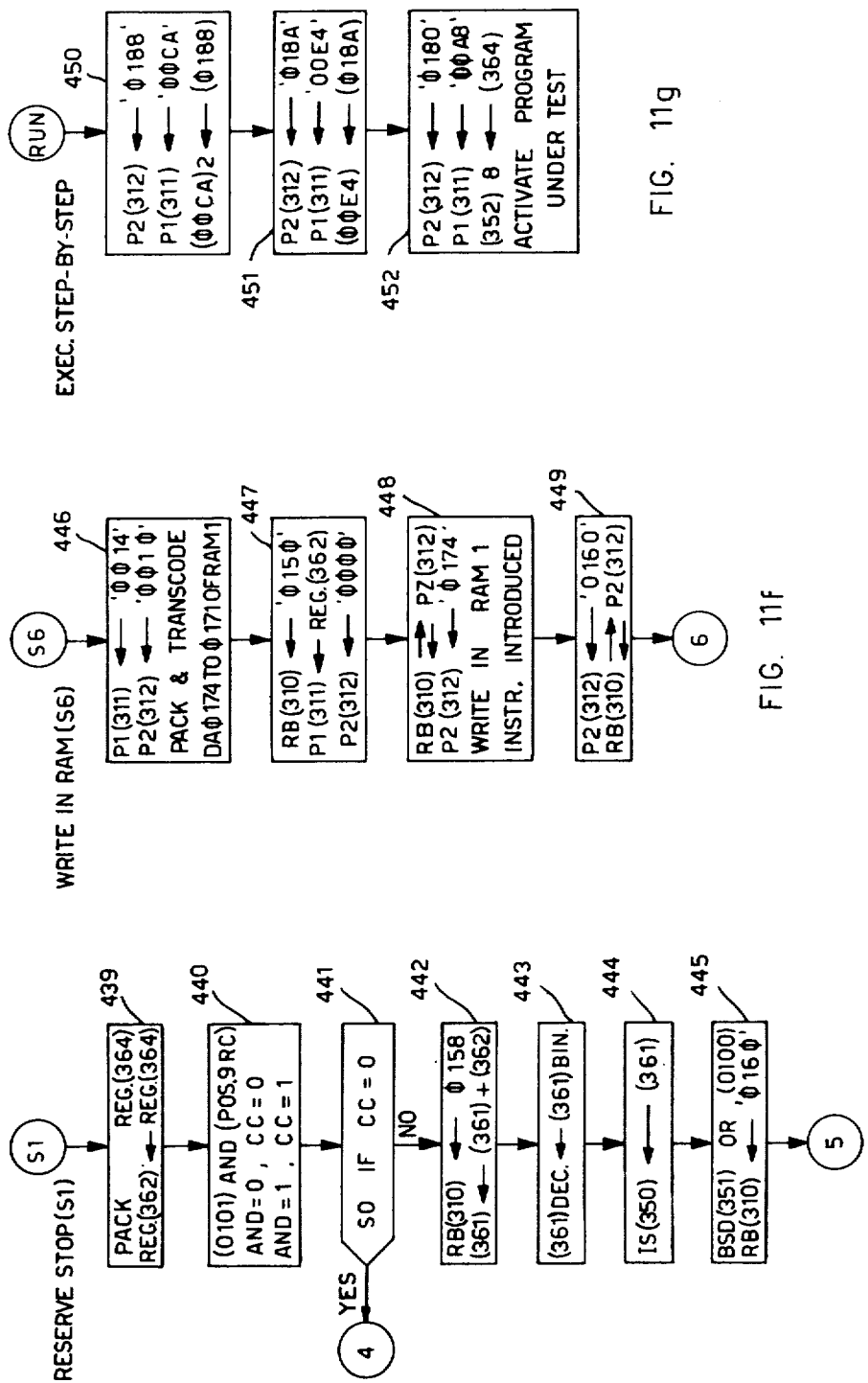

ELECTRONIC COMPUTER WITH EQUIPMENT FOR DEBUGGING OPERATIVE PROGRAMS

This is a continuation of application Ser. No. 529,493, filed Dec. 4, 1974.

BACKGROUND OF THE INVENTION

The present invention relates to an electronic computer with equipment for debugging of the operative programs compiled by the operator before they are used.

Normally, in processors of high computing and storage capacity there are test or debugging programs already compiled and adapted to provide the operator with all the facilities which will enable him to follow the working out of the program under test and to obtain a visual display of any errors there may be.

It is obvious that since these debugging programs act on the programs being tested they must exist side by side with the latter in the memory of the processor. For this reason only processors of large dimensions offer these facilities.

Moreover, in the case of processors of small dimensions, the capacity of the memory is dimensioned to contain the program of maximum size from among those appertaining to the specific application of the processor (for example, application to accounting problems). Thus it is not possible for the programmer to test the compiled program, there being no available memory space. In fact, the makers of such processors tend to supply the necessary programs to the user already perfected or debugged.

This tendency finds its justification in the fact that an enlargement of the memory for the purpose of accomodating the debugging programs would affect the cost of the processor in a negative manner. Moreover, the user would acquire a processor with a low efficiency because of the unutilized portion of the memory.

The obvious disadvantage for the user deriving from this tendency is the absolute lack of flexibility of the processor purchased, inasmuch as the user is unable to personally make the slightest modification in the programs supplied with the processor.

This rigidity of performance of the processor puts the user in the position of depending entirely on the supplier of the processor for any development of service linked to a change of program.

Consequently, the user is compelled to request the supplier to modify the programs, a matter which involves long waiting times and high costs. In order to obviate these disadvantages, the user is prompted to modify the programs by himself and to ask outside computing centers for debugging of the modifications made. Even in this case, the user is forced to endure long waiting times and incur additional costs.

It is known however a minicomputer having an apparatus for debugging operative programs. This apparatus comprises a debugging panel not operable by the operator but only by the programmer. This panel includes a switch for switching the operation of the minicomputer from the normal mode to the debugging mode. There are provided also a group of switches each associated to a particular debugging operation, as displaying work memory register writing into the memory, step-by-step resuming etc.

In addition to this panel there is another panel for entering data and addresses into the memory which include also a display for displaying only two memory 8-bit bytes on binary code.

This debugging apparatus basically has two disadvantages, the first of which is of requiring specific devices and only in debugging mode and not used during the normal mode.

Such specific devices increase the cost of the debugging apparatus which therefore is expensive. The second disadvantage of such apparatus is of having a display which displays only two bytes at time.

Whereby it is difficult for the programmer to have a complete displaying of the desired memory register.

In consideration of the fact that the two modes of operations normal and debugging are mutually exclusive, there is therefore the technical problem of having a debugging equipment which utilizes the input-output devices as the keyboard, the console, the display and M.C. reader which normally equip the computer.

SUMMARY OF THE INVENTION

The main object is to carry out all the operations relating to the debugging using only the keyboard, the console and the display with which the processor is normally equipped, without making use of normally required equipment for debugging as performed in large processors.

Another object is to provide this debugging system without increasing the capacity and, therefore, the cost of the memory of the processor.

A further object is to provide a basic set of debugging programs resident in the read-only memory (ROM) of the processor and the possibility of introducing debugging programs which are pre-recorded on a magnetic card into a particular zone of the working memory (RAM) without altering the significant parameters of the programs being tested.

A further object is to enable the programmer to write and use the debugging programs most suited to his particular problem by recording such programs on magnetic cards.

BRIEF DESCRIPTION OF THE DRAWINGS

These characteristics and other characteristics of the invention will become clearer from the description and the accompanying drawings, in which:

FIGS. 2a, 2b, 2c show a detailed block diagram of the central unit of the processor;

FIG. 2 shows the arrangement of FIGS. 2a to 2c;

FIG. 3 shows timing signals of the central unit;

FIG. 4 shows the state register SO;

FIG. 5 shows timing signals of the state register SO;

FIG. 6 shows signals operating on the register SO during the reading of a microinstruction;

FIG. 7 shows the operative registers 30;

FIG. 9a represents the program conditions byte;

FIG. 9b represents the interrupt code byte;

FIG. 9c represents the interrupt reservation byte;

FIG. 9d represents the debugging service byte;

FIGS. 11a to 11g show the flow charts of the DBG (debugging) program;

SUBJECT INDEX

Figures 1A, 8:
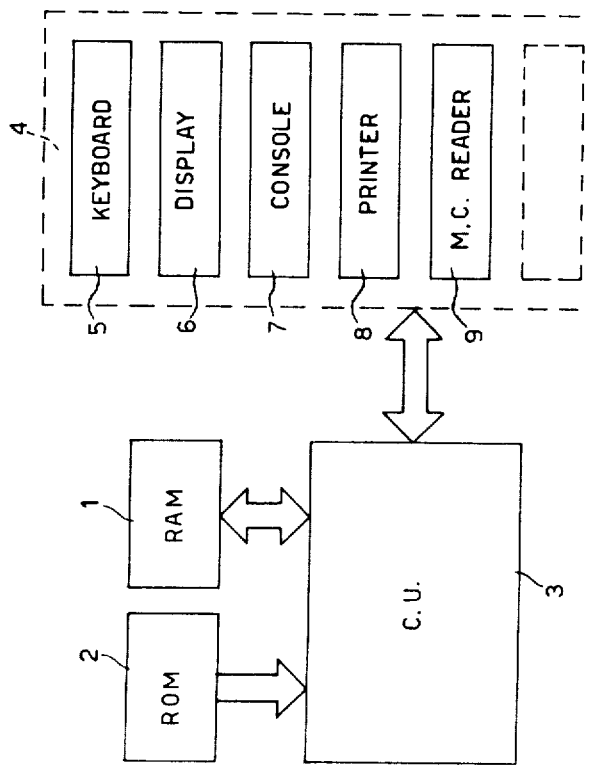
FIG. 1a is a block diagram of the processor using the program debugging system according to the invention.
FIG. 8 is a block diagram of the registers 30.

| | |
|---|---|
| LIST OF ABBREVIATIONS | Page 6 |
| GENERAL DESCRIPTION | Page 7 |
| CENTRAL UNIT (FIG. 2) | Page 9 |
| 1. Timer 20 | Page 10 |
| 2. Execution of microinstructions (TABLE A) | Page 11 |
| 3. State register (SO) 27 | Page 17 |
| 4. Instruction register (RO) 26 | Page 19 |
| 5. Operative registers 30 (scratch pad) | Page 19 |
| 6. Arithmetic unit 35 | Page 20 |
| 7. Switching elements 40 | Page 22 |
| 8. Shift network 41 | Page 23 |
| 9. Input network to the operative registers | Page 24 |
| 10. Network providing connection to the RAM 1 | Page 24 |
| 11. Channel logic 45 | Page 27 |
| DETAILED DESCRIPTION OF THE RAM 1 AND THE ROM 2 | Page 28 |
| INSTRUCTION INTERPRETING MICROPROGRAM | Page 41 |
| DBG PROGRAMS | Page 56 |
| 1. Instructions used | Page 56 |
| 2. Visual display of the instruction in the registers 362 and 363 | Page 61 |
| 3. Bar recognition | Page 76 |
| 4. Program for introduction from magnetic card (Bar S2) | Page 85 |
| 5. Read-RAM program (Bar S0) | Page 92 |
| 6. STOP reservation program (Bar S1) | Page 94 |
| 7. Writing-in-RAM program (Bar S6) | Page 95 |
| 8. Step-by-step execution program (RUN key) | page 96 |
| CONCLUDING REMARKS AND EXAMPLES | Page 98 |
| CLAIMS | Page 104 |

LIST OF ABBREVIATIONS

Figure 9:
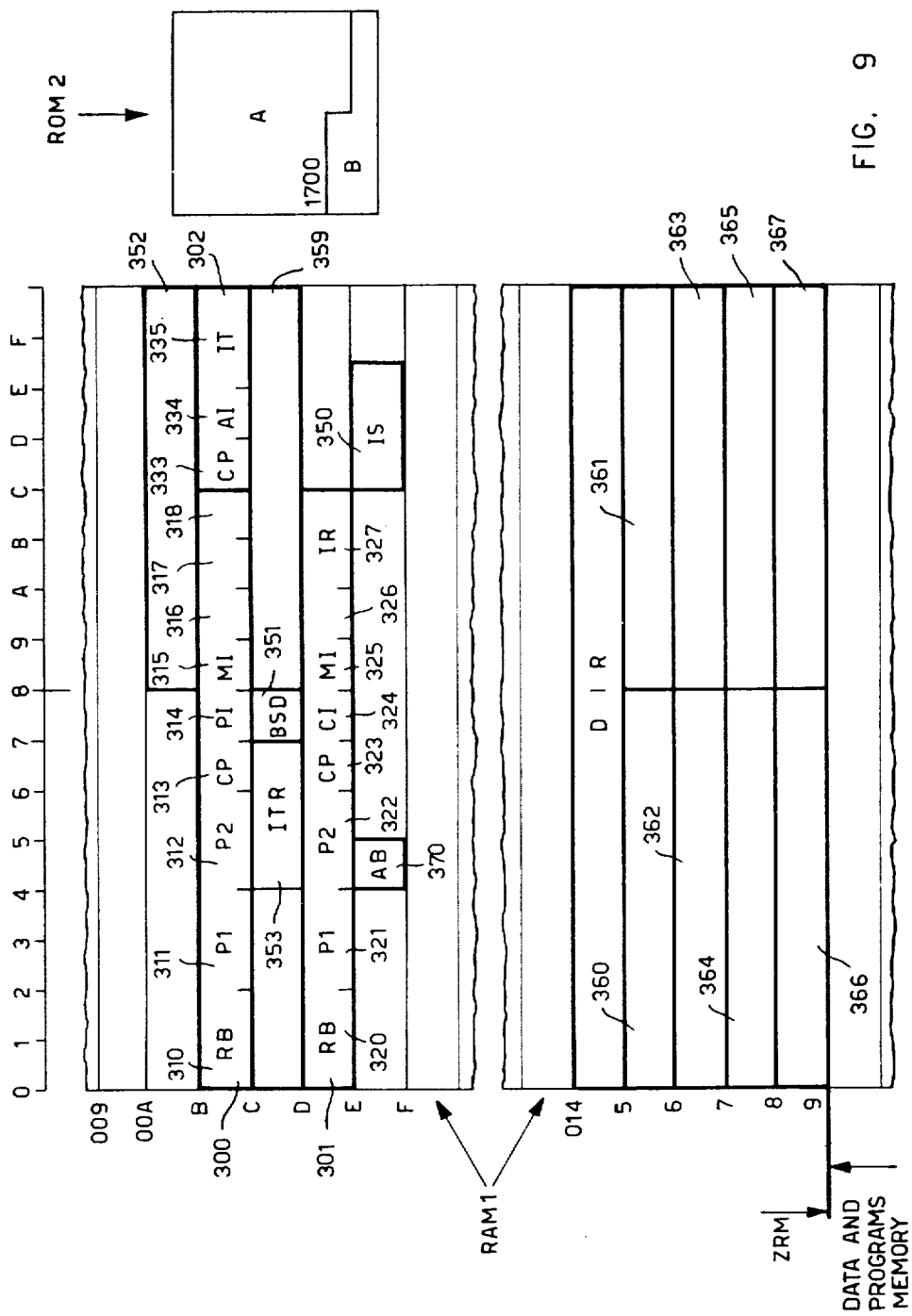
FIG. 9 is a diagram of the reserved zone (ZRM) of the RAM 1.

DI = Register 40, indicates the eight switching elements
DEV = A switching element of the register 40, specified by three bits
CRT = Character, corresponds to eight memory bits
MEM = Memory RAM 1
IND = Address
MLS = Sequence logic matrix 28
RB = Base register
P1 = Pointer 1
P2 = Pointer 2
CP = Program conditions
CI = Interrupt code
MI = Instruction modification
DBG = Debugging
BSD = DBG service byte
M.C. = Magnetic card
EXOR = Exclusive-OR
CI = Interrupt code
IP = Program addresser (207)
AI = Enable interrupt
PSR = Program in progress (Register 300 of RAM 1)
IPSR = Interrupt program (Register 302 of RAM 1)
OPSR = Interrupted program (Register 301 of RAM 1)
ZRM = Reserver zone of RAM 1
RC = Current reference
CC = Condition code
CU = Central unit 3
PU = Peripheral unit 4
IR = Reentry address (Reg. 327, FIG. 9)

II = Addresses of interrupt program (Register 335 of FIG. 9)
IS = Stop address (Register 350, FIG. 9)
BSD = Debugging service byte (Register 351 of FIG. 9)
RL = Working register (Register 352 of FIG. 9)
AB = Enable bars
ITR = Reference Table address register.

DESCRIPTION OF PREFERRED EMBODIMENTS

A brief description of the processor using the program debugging system according to the invention will now be given with reference to FIGS. 1a and 1b.

Of course, reference is made herein to a particular embodiment of the processor without on that account limiting the possibilities of application of the system according to the invention to other types of processor.

Figure 1B:
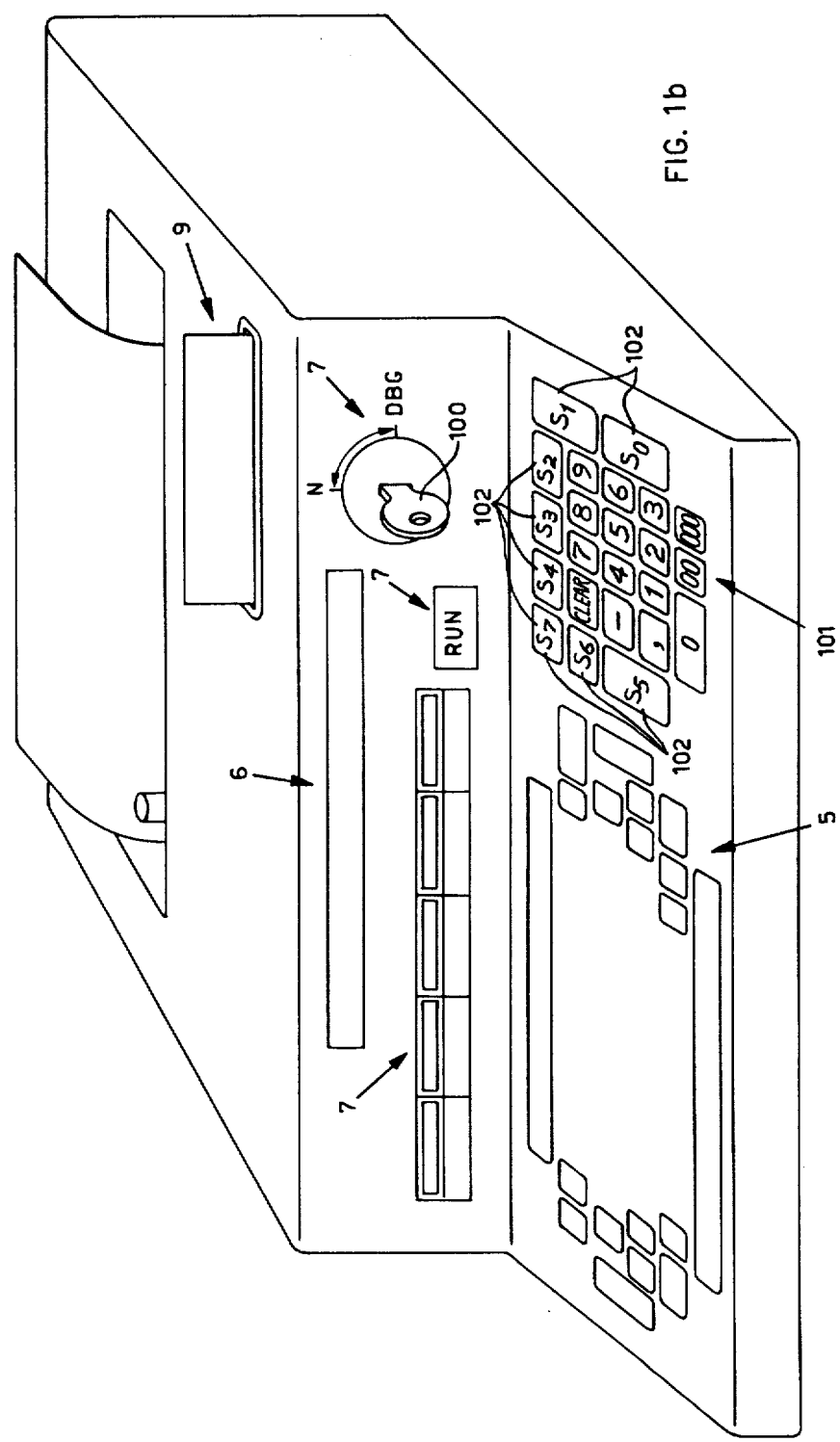
FIG. 1b is a perspective view of the processor.

More particularly, the processor of FIGS. 1a and 1b is of the microprogrammed type. That is, to each instruction of the program there corresponds a microprogram recorded in a permanent memory. The execution of a program instruction is achieved by means of the sequential execution of the microinstructions of the respective microprogram.

The processor of FIGS. 1a and 1b comprises a memory RAM 1 adapted to contain the instructions and the data of the program in process of execution, and a memory ROM 2 adapted to contain both the microprograms which implement the instructions of the programs and the programs used by the debugging system according to the invention, as will be better explained hereinafter.

The RAM 1 and the ROM 2 may be of any known type on the market and will therefore not be described in detail; it is only made clear that each cell of both of the memories is adapted to contain 16 bits.

The RAM 1 and the ROM 2 are connected to a central processing unit 3, which will be described in detail hereinafter and which is connected in turn to a group of peripheral units 4.

The peripheral units 4 may be of various kinds according to the particular application for which the processor is intended. In this particular case, there will be described and demonstrated hereinafter only the peripheral units used by the debugging system according to the invention. More particularly, the peripheral units shown are: an alphanumeric keyboard 5, a visual display 6, a control console 7, a printer 8, and a read/write unit 9' adapted to record and read data on a magnetic card 9. The read/write unit 9' is of the type described in U.S. Pat. No. 3,495,222 issued on Feb. 10, 1970 and assigned to the same assignee of this application.

There will now be described briefly with reference to FIGS. 1a and 1b the operations which the programmer must carry out during the stage of debugging a program recorded previously in the RAM 1. Of course, these operations will be described in detail later on.

Let it now be assumed that the program recorded in the RAM 1 is not being executed correctly by the processor because of errors of various kinds which the programmer may have made during the compilation thereof.

At this point, the programmer intends to carry out a check of the instructions of the program which the processor is not able to execute. He presumes that one of them is wrong. To correct this instruction directly in the RAM 1, the programmer acts on the console 7, positioning a key change-over switch 100 (FIG. 1b) from the normal setting to the debugging setting, writes the respective address of the instruction on the numeric part 101 of the keyboard 5 and then actuates a service bar S1 belonging to a group of bars 102.

Corresponding to this operation, an interrupt is generated in the program to be corrected (being caused by the switch 100 actuated on the console 7) and one of the debugging programs recorded in the ROM 2 is performed, the program being associated with the particular bar actuated on the keyboard 5. This program, for example, may have the effect of producing a visual display of the instruction corresponding to the address written on the keyboard and halting of processing with enabling of the keyboard 5. In this way, the programmer can enter the instruction he considers correct on the keyboard 5. Thereafter, the operator actuates another service bar S6 with which is associated another debugging program which records the correct instruction in the memory RAM 1 at the address previously entered.

The programmer may wish to carry out a debugging program different from those recorded in the ROM 2. If so, he inserts in the reader 9' the magnetic card 9 on which the desired debugging program is recorded, and actuates the service bar S2. This bar calls a special program of the ROM 2 which causes: the reading of the program recorded on the card 9, the transfer thereof to a fixed zone (ZRM) of the RAM 1, and the immediate execution of this program.

It is emphasized — and this is explained in detail hereinafter — that the fixed zone of the RAM 1 to which the card program is transferred does not contain information significant for the resumption of the program under test. Thus there is no loss of information in performing the debugging program recorded on the magnetic card 9. From what has been said, one of the advantages of the system according to the invention becomes obvious, i.e., the possibility of testing programs simply by actuating a change-over switch and using the same devices (keyboard, display, magnetic card) which are used during normal operation.

CENTRAL UNIT (FIG. 2)

A detailed description of the central unit 3 will now be given with reference to FIG. 2.

The central unit 3 is an assembly of logic circuits which handle and execute the various microprograms contained in the ROM 2.

It is composed of the following main blocks:

A timer 20 which times the development of the processing of the data inside the control unit 3. This timer is composed of an oscillator 21 and an assembly of signal generating circuits 22.

A sequence logic matrix network 25, which staticizes and interprets the codes of the microinstructions read from the ROM 2 and generates the commands necessary for the execution thereof. This network is composed of a microinstruction register (R0) 26, a state register (S0) 27 and a sequence logic matrix (MLS) 28.

An operative network which carries out the processing of the data by methods imposed by the sequence logic matrix 28. The operative network comprises: the operative registers 30 (scratch pad) which are divided into two groups RA-31 and RB-32 each of which is composed of sixteen eight-bit registers hereinafter referred to as A0-A15 and B0-B15, respectively; an arithmetic unit 35 which is formed by three blocks UA-36, UB-37, UC-38 with eight-bit parallelism; the switching elements DI-40; a shift network ND-41, an input network to the operative registers which comprises the nodes NA and NB and two registers BA-42, BB-43, and a network providing connection with the RAM 1 and composed of nodes NO and NC; a channel logic 45 which controls the interface providing connection to the peripheral units and monitors the operative simultaneity of the central unit 3.

A detailed description of the above-enumerated blocks will now be given.

1. Timer 20

The oscillator 21 generates periodic pulses which define a fixed period of time called the machine cycle which lasts for the time necessary for the execution of an elementary operation (for example: reading of an operative register 30, its incrementing and rewriting in the operative register 30).

During the machine cycle, signals are generated by the circuit 22, the duration of which and the positioning of which in the machine cycle are fixed.

The function of these signals is predetermined. The fact that they act or do not act on the circuits of the central unit 3 is determined by the conditions generated by the sequence matrix 28 in the manner to be described hereinafter.

The working of the central unit 3 is completely synchronous with this timing, as is also the conversation with the peripheral units.

Ten signals are generated by the circuit 22 and their use is illustrated hereinafter. The signals are:

T0 which acts on the state register 27,
T1 which times the reading of the ROM 2,
T2 which times the RAM 1,
T3A which acts on the register R0-26,
T3N which also acts on the register R0-26,
T4A which acts on the registers BA42, BB43 and on the switching elements 40,
T5 which acts on the operative registers 31 and 32,
T6 and T7 which act on the channel logic 45.

FIG. 3 is a timing diagram in which the signals mentioned appear.

Of course, the oscillator 21 and the circuits 22 are not described in detail, since they are known in the field of circuit design.

2. EXECUTION OF MICROINSTRUCTIONS

Before proceeding to the description of the other blocks of the central unit 3, a brief mention will now be made of the microinstructions used by the central unit 3 in the debugging system according to the invention and of the execution thereof.

The execution of a microinstruction can be divided into two phases: An interpretive phase, common to all the microinstructions, which reads the address microinstruction from the ROM 2, prearranges the carrying out thereof and increments the addresser of the ROM 2. This phase is obviously independent of the code of the microinstruction read. An execute phase, during which the processing of the data takes place in accordance with the procedures indicated by the microinstruction read in the preceding interpretive phase. The interpretive phase is always performed in a single machine cycle and the configuration of the signals (hereinafter called "commands") is stable within the limits of the cycle. The configuration of these commands defines the operations to be performed and is called the "Interpretive State."

The presence of the interpretive state is indentified by a flip-flop S000 of the register 27 (FIG. 4).

The execute phase is performed in one or more machine cycles to which there correspond as many states, each defined by a corresponding flip-flop of the register 27.

Throughout the execute phase, the code of the microinstruction in question remains stable in the register 26, while the situation of the flip-flops of the register 27 which define the current state develops.

Each state defines the next as a function of the code of the microinstruction read.

At the end of the execution of each microinstruction a return is made to the interpretive state S000 to read the following microinstruction from the ROM 2.

During the two phases, the interpretive phase and the execute phase, the combinatory network 28 (MLS), which has the registers 26 and 27 as inputs, generates commands C which enable given flows of information through the operative network or the other blocks of the central unit 3.

The information then flows between the blocks of the central unit 3 through a series of AND gates of various types which are controlled by the commands C generated by the combinatory network 28. In FIG. 2 these gates are symbolically represented divided into three zones. The central zone contains the control signal of the gate generated by the network 28 (MLS). When this command is present, the signals at the input of the gate are transferred to the following block. The pairs of numbers varying from 00 to 15 which are in the top zone and the bottom zone of the gates indicate the number of bits which they allow to pass and more precisely the positions in which these bits are at the input and the output. For example, a gate having the pairs of numbers 07, 00 both input and output is a gate which transfers an eight-bit character in direct parallel. On the other hand, a gate having the pair of numbers 03, 00 in the top zone, that is as input, and the pair of numbers 07, 04 in the bottom zone, that is as output, is a gate which transfers four bits shifting them to the left by four places. If 07, 04 are input and 03, 00 are output, the shifting is by four places to the right. Finally, if the input zone is empty, this signifies that the bits are forced into the gate from outside.

There is described hereinafter, with reference to Table A, the set of microinstructions used by the debugging system according to the invention, omitting the other microinstructions which the central unit is capable of carrying into effect. The microinstructions given in Table A have a fixed format of sixteen bits which corresponds to one word of the ROM 2. The format of the microinstructions is as follows:

```
|   F   |   X   |   Y   |   Z   |
 15      11      07      03      00
```

The fields, each of four bits, have the following significance:

F is the operative code of the microinstruction;
X indicates the first operand;
Y indicates the second operand;
Z is an extender of one of the foregoing fields.

When the fields X and Y specify as operands the registers A, B or L of the operative registers 30, they will be indicated in the microinstructions by the symbols A$x$, B$x$, L$x$, A$y$, B$y$, L$y$, respectively.

The microinstructions are divided into groups distinguished by the different function code, that is by the different binary configuration of the field F of the microinstruction.

The microinstructions having the same function code are executed with the same sequence of states.

TABLE A

| Name | F | X | Y | Z | FUNCTION |
|------|---|---|---|---|----------|
|      |   |   |   |   | LOGICAL ARITHMETIC |
| ADDB | 0110 | A | B | 0101 | B ← (A+B) |
| ANDA | 0110 | A | B | 1000 | If (A ← A AND B) = 0 |
| ANDB | 0110 | A | B | 0100 | If (B ← A AND B) = 0 |
|      |      |   |   |      | PUTS |
| AND  | 0110 | A | B | 0000 | if (A AND B) = 0 |
| ORA  | 0110 | A | B | 1110 | If (A ← A OR B) = 0 |
| ORE  | 0110 | A | B | 0111 | If (A EX OR B) = 0 |
| SOT  | 0110 | A | B | 0010 | If (A - B)>0 D00 = 1 |
|      |   |   |   |   | TRANSFER |
| TAB  | 0101 | A | B | 1100 | B ← A |
| TBA  | 0101 | A | B | 0011 | A ← B |
|      |   |   |   |   | EXCHANGE |
| SLL  | 0100 | L | L | 1111 | A$x$ ⇌ B$y$; B$x$ ⇌ A$y$ |
|      |   |   |   |   | DECREMENT |
| DCA  | 1010 | A | 0100 | 1010 | If (A ← A - 1) = 0 puts D01=1 |

TABLE A-continued

| Name | F | X | Y | Z | FUNCTION |
|---|---|---|---|---|---|
| | | | | | LOAD SWITCHING ELEMENT |
| TAD1 | 1011 | A | 1110 | 0111 | DI ← A |
| TBDI | 1011 | B | 1111 | 0111 | DI B |
| REDI | 1011 | 0 DEV | 0110 | 0110 | DEV '0' |
| SEDI | 1011 | 1 DEV | 0110 | 0110 | DEV '1' |
| SHSB | 1011 | B | 0001 | 0101 | SHIFT B one bit to left |
| ROTB | 1011 | B | 0001 | 0110 | Exchange semibyte |
| AZAP | 1011 | A | 0010 | 0111 | Zeroize left semibyte |
| | | | | | JUMP |
| SAI | 000 | | 1 | | Unconditional jump IND. 1 |
| SAD0 | 0010 | 0 DEV | 1 | | Jump to 1 if DEV = 0 |
| SADI | 0011 | 0 DEV | 1 | | " " " " " DEV = 1 |
| | | | | | WRITE/READ RAM 1 |
| MAD | 1100 | A | 1 | | A MEM. IND. 1 |
| AMD | 1101 | A | 1 | | MEM. IND. 1 A |
| AMI | 1110 | L | A | 1011 | MEM. IND. L. A |
| BMI | 1110 | L | B | 0011 | MEM. IND. 1. B |
| AMIP | 1110 | L | A | 1001 | MEM. IND. 1. A; L. 1. + 1 |
| BMIP | 1110 | L | B | 0001 | MEM.IND.L B; 1. 1. + 1 |
| MAIP | 1110 | L | A | 1101 | A MEM.IND.L; L L + 1 |
| MBIP | 1110 | L | B | 0101 | B MEM.IND.L; 1. 1. + 1 |
| | | | | | FORCE REGISTERS 30 |
| CRTA | 1000 | A | | CRT | A ← CRT |
| CRTB | 1001 | B | | CRT | B ← CRT |
| | | | | | READ ROM 2 |
| ROMA | 0111 | A | 0000 | 0000 | A ← MEM.IND.L2; if bo7 = 0, put 8 least significant bits, if bo7 = 1, put 8 most significant bits. bo7 = most significant bit of the register B2. L2 L2 + 1 |
| TCCA | 1010 | A | 1000 | 1000 | A ← CRT FROM CONSOLE |

3. REGISTER S0 (27)

The register 27 is formed by eight flip-flops (FIG. 4) which differentiate the various machine cycles. They are:

S000-S001-S002-S003-S004-S042-S043-S010.

Their positioning is controlled by the logic matrix 28 is directly analyzing the field F of the microinstruction present in the register 26 (RO). The changing of the configuration of the register 27 takes place with the leading edge of the signal T0 and this is the first operation which the matrix 28 effects within the limits of a timing cycle.

The signals S042, S043, S010 are obtained from the OR function of the following states:

S042 = S004 + S002
S043 = S004 + S003
S010 = S000 + S001

FIG. 5 shows the timing diagram relating to the state S010 starting from the states S000 and S001. Of course, the states S042 and S043 will be generated in similar manner. It is to be noted, therefore, that the matrix 28 generates only five states, that is to say S000 to S004, while the other three states are derived therefrom.

The sequence of the states corresponding to the microinstructions of TABLE A is now given in TABLE B.

TABLE B

| F. | SEQUENCE OF EXECUTION | | | TYPE OF MICRO-INSTRUCTION |
|---|---|---|---|---|
| 000 | S001 | | | |
| 0010 | S001 | | | |
| | | | | JUMP |
| 0011 | S001 | | | |
| 0100 | S002 | S003 | | |
| 0101 | S002 | | | TRANSFER |
| 0110 | S002 | | | ARITHMETICAL AND LOGICAL |
| 0111 | S002 | S001 | S004 | READING |
| 1000 | S004 | | | ROM 2 INTO RA/RB |
| 1001 | S004 | | | |
| | | | | VARIOUS |
| 1010 | S004 | | | ± CHECK./CONSOLE |
| 1010 | S004 | | | SHIFT AND OPER. ON SWITCHING ELEMENTS 40 |
| 1100 | S004 | S002 | | |
| 1101 | S004 | S002 | | |
| 1110 | S004 | S002 | | MEMORY RAM 1 |
| 1110 | S004 | S003 | | |
| 1111 | S004 | S003 | | |

It is to be noted, finally, that all the sequences are preceded by the interpretive state S000. The commands generated by the matrix 28 in the individual states will be described in the continuation of the description.

4. MICROINSTRUCTION REGISTER 26 (RO)

The register 26 comprises sixteen flip-flops which staticize the code of the microinstruction or the information read from the ROM at the address specified by predetermined operative registers 30.

The sixteen flip-flops are divided into two groups of eight; those which are least significant are commanded by the signal T3N, the others by the signal T3A.

The generation of the signals T3N and T3A takes place only in the two states in which reading of the ROM is performed. These are the interpretive state S000 for all the microinstructions and the state S001 for the microinstruction ROMA.

With the leading edge of the signals T3N and T3A, the sixteen bits read from the ROM 2 are staticized in the register RO-26 and constitute the code of the microinstruction which must be executed.

The information remains stable in the register during all the following execute states, as shown in FIG. 6.

As has been said, in the state S001 of the microinstruction ROMA a second reading of the ROM takes place. The eight least significant flip-flops of the register 26 are positioned with the signal T3N by the eight most or least significant bits read. This depends on the value of the bit 07 of the register B2 (see Table A).

5. THE OPERATIVE REGISTERS 30 (SCRATCH PAD)

The operative registers 30 are arranged in two series, referred to as A and B, of sixteen registers, each register having a capacity of eight bits (FIG. 8). The bits of the same weight of the registers of each of the two series, for example the series A, are arranged in a 4 × 4 matrix (FIG. 7). Thus there are eight 4 × 4 matrices in which the first bits of each thereof form the register A0, the second bits the register A1, and so on.

To select a register, for example the register A15, it is sufficient to send on the eight select wires shown in FIG. 7 eight commands C024 – C031 having the following configuration: 10000001.

Of course, the commands C024 – C031 are generated by the sequence matrix 28, which takes account of the fields X and Y of the microinstructions for generating both the select commands (C024 – C031) and the tate associated (forced into S0) with one of the two series of registers. More particularly, the state S043 selects one of the registers of the series B, while the state S042 selects a register of the series A. The state 010, on the other hand, is associated with a register having a length of sixteen bits and formed by the like A and B registers, this register being called a "Long Register" and indicated by the letter L. The writing of an item of information in one of the registers 30 with the information already recorded in the registers 42 and 43 is timed, as has been said, by the signal T5 (FIG. 2). At this instant, the commands CT04 – CT07 generated by the logic matrix 28 select the data to be transferred to the registers 31 and 32 at the level of four bits at a time. Thus it is possible to modify one of the registers A or B in one part thereof, leaving the other part unchanged.

6. ARITHMETIC UNIT 35

The arithmetic unit 35 executes arithmetical and logical operations on the contents of the operative registers 30. It comprises two adders UA-36 and UB-37 with eight-bit parallelism and a logic network U-38. The two adders 36 and 37 (UA and UB) are interconnected in such manner as to obtain a single adder with sixteen-bit parallelism. However, only in particular operations, that is when a long register (L) is operated on, are all the sixteen outputs of the adder significant.

The network UC-38, which may enter UA as first operand, performs the logical OR, AND and exclusive-OR functions.

By means of a decoder 50 (FIG. 2b), the arithmetic unit 35 moreover supplies information on the result of the arithmetical and logical operations which are stored in the switching device D02 as a consequence of the commands CD11 and CD12 generated by the logic matrix MLS-28. This switching device is then sensed by the instructions SAD0 and SAD1 to effect conditional jumps.

There is given hereinafter in Table C a list of the mircoinstructions which concern the arithmetic unit 35, in which appears the symbolic name of the commands CU00–CU09 generated by the MLS-26 which effect the transfer of the data, and the states of validity of the commands.

TABLE C

| Micro-instrn. | CU00 | CU01 | CU02 | CU04 | CU05 | CU06 | CU07 | CU08 | CU09 | State of Validity |
|---|---|---|---|---|---|---|---|---|---|---|
| ADDB | 1 | 0 | 0 | 0 | 1 | X | X | X | X | S002 |
| DCA  | 0 | 0 | 0 | 1 | 0 | X | X | X | X | S004 |
| AND  | 1 | 1 | 1 | 1 | 0 | X | 0 | 1 | 0 | S002 |
| ANDA | 1 | 1 | 1 | 1 | 0 | X | 0 | 1 | 0 | S002 |
| ANDB | 1 | 1 | 1 | 1 | 0 | X | 0 | 1 | 0 | S002 |
| ORA  | 1 | 1 | 1 | 1 | 0 | X | 1 | 0 | 0 | S002 |
| ORE  | 1 | 1 | 1 | 1 | 0 | X | 0 | 0 | 1 | S002 |
| ROMA | 1 | 1 | 0 | 0 | 0 | 0 | X | X | X | S001 |
| TAB  | 1 | 1 | 0 | 1 | 0 | 0 | X | X | X | S002 |
| TBA  | 1 | 1 | 0 | 1 | 0 | 0 | X | X | X | S002 |
| MAIP | 1 | 1 | 0 | 0 | 0 | 0 | X | X | X | S004 |
| AMIP | 1 | 1 | 0 | 0 | 0 | 0 | X | X | X | S004 |
| MBIP | 1 | 1 | 0 | 0 | 0 | 0 | X | X | X | S004 |
| BMIP | 1 | 1 | 0 | 0 | 0 | 0 | X | X | X | S004 |
| MBI  | 1 | 1 | 0 | 1 | 0 | 0 | X | X | X | S004 |
| AMI  | 1 | 1 | 0 | 1 | 0 | 0 | X | X | X | S004 |
| BMI  | 1 | 1 | 0 | 1 | 0 | 0 | X | X | X | S004 |

NOTE: X = Immaterial

7. THE SWITCHING ELEMENTS (40)

The switching elements 40 comprise eight flip-flops (D00-D07) which staticize events which occur during the execution of some microinstructions. Their contents are tested during the execution of the microprograms to condition the making of address jumps in the addressers of the ROM 2. The logical microinstructions (AND, OR, etc.) affect them automatically for depositing the result of the logical operation carried out.

Each individual switching element can moreover be positioned at ZERO or at ONE by the microinstructions REDI and SEDI, respectively, (Table A).

In the format of the microinstruction (Table A) the three least significant bits of the field X constitute the binary address (00-07) of the switching element concerned.

Some microinstructions (TADI-TBDI-SADI) force the eight bits of the register A or B selected into the eight switching elements (See Table A).

Some arithmetical and logical microinstructions (AND, OR, ORE, ADD), on the other hand, position the switching elements with their qualitative result; more particularly, the switching element D0I staticizes the occurrence of a zero result output by the arithmetic unit 35.

The switching elements 40 change their state at two different times. The switching elements D00-D03 change over with the signal T4N, while the switching elements D04-D07 change over with the signal T4A. Given hereunder is Table D, which contains the microinstructions concerning the switching elements 40 and the commands enabling the switching elements themselves which are generated by the MLS 28.

TABLE D

| MICROINSTRUCTION | CDRR | CU05 | CD11 | CD13 | CD14 |
|---|---|---|---|---|---|
| REDI | 1 | 0 | 0 | 0 | 0 |
| DCA | 0 | 0 | 1 | 0 | 0 |
| AND/A/B | 0 | 1 | 1 | 0 | 1 |
| OR/A/B | 0 | 0 | 1 | 1 | 0 |
| ORE | 0 | 0 | 1 | 0 | 1 |
| ADD/A/B | 0 | 1 | 1 | 0 | 0 |
| TADI | 0 | 0 | 0 | 1 | 1 |
| SADI | 0 | 0 | 0 | 1 | 0 |
| TBDI | 0 | 0 | 0 | 0 | 1 |

8. SHIFT NETWORK 41

Through this network formed by circuits of the AND-OR type it is possible to open a flow of information among all the possible flows towards the input network (NA, NB) to the operative registers (31, 32). The shift network 41 is formed by a group of eight gates divided into two sub-groups connected to the operative registers RA-31 and RB-32, respectively. Each of these sub-groups is capable of performing a shift or a rotation on the data coming from the operative registers 30, as is shown symbolically in FIG. 2b. Each gate of the two sub-groups is addressed by a combination of three bits of the microinstructions SHSB and ROTB which act on this network. These combinations are indicated symbolically in FIG. 2b by the synbols CZ00-CZ07 while the other two gates of the network 41 are commanded in direct manner and serve to force the conditions of the switching elements or zero. An input to the shift network 41 is moreover constituted by a gate 70 which is connected to the channel logic 45 by means of the data introducing channel D. This gate 70 permits the introduction of the date coming from the peripheral units through the medium of the logic 45 into the operative registers 30 through the nodes NA or NB.

9. INPUT NETWORK TO THE OPERATIVE REGISTERS

This is a network to which the operative registers 31 and 32 lead; the network enables the byte which is to be sent to and written in the operative registers 31 and 32 to be selected.

This network is formed by the nodes NA and NB and the registers BA-42 and BB-43.

The nodes NA and NB are two networks, each with parallelism of eight bits, which select the eight possible flows of information to the operative registers 31 and 32 by means of the commands CA00-CA07 generated by the MLS 28.

The information selected may come in fact the following units:
the arithmetic unit 35 (two flows),
the shift network 41 (ND),
the ROM 2,
the RAM 1,
the console 7 (two flows),
the channel logic 45.

The registers BA-42 and BB-43 staticize the information present on the nodes NA and NB and selected by one of the commands CA00-CA07 in the presence of the signal T4. The contents of BA-42 and BB-43 may or may not be written in the operative registers 31 and 32 according to whether the commands CT04-CT07 hereinbefore described are activated or not.

10. NETWORK PROVIDING CONNECTION TO THE RAM 1

The central unit 3 is connected to the input of the memory RAM 1 through the medium of a node N0 with parallelism of 16 bits (N000-15). This node is activated during the execution of the microinstructions for writing into the memory and for reading from the memory. In both cases the node N0 supplies the address which it is desired to access; in the writing microinstructions it sends the character (eight bits) to be stored.

The output of the RAM 1 comprises a node NC with parallelism of eight bits (NC00-07) and is used only in the case of reading.

All the microinstructions which provide for reading from or writing in the RAM 1 are executed in three machine cycles: in the first cycle S000 the interpretive state takes place, in the second cycle S004 the address in the RAM 1 at which the microinstruction operates is sent through the node N0.

The registers which can be connected to the node N0 as addressers are the register RO-26, if it is desired to access an address lower than 255 (that is say, the reserved zone of the RAM1), or a pair of registers (AB or BA), if it is desired to access any address whatsoever of the RAM 1. In FIG. 2, the addressing commands of the memory RAM 1 are represented by the commands CM03-CM07. The command CM03 enables the register RO, while the commands CM04 and CM05 enable the registers RA-31 and RB-32.

From the state S004 the machine passes to the third cycle which is the state S002 or the state S003, according to the type of microinstruction being worked out.

The machine passes to the state S002 for all those microinstructions in which it is a B register which supplies the item of data to be written or receives the information read.

It passes to the state S003, on the other hand, when it is an A register which is concerned in the reading or writing.

Within the limits of the states S002 and S003 it is necessary to distinguish two different functions: (1) in the writing microinstructions there is sent, accompanied by the signal T2, the item of data to be written in memory (at the address already specified in the state S004) through the medium of the first eight bits (N000-07) of the node N0. The output NC of the memory is not significant and is not used.

The information which can be written may come from the registers RA-31, RB-32 or from the peripheral units through the medium of the channel logic 45 when the commands CM04, CM06 and CM07, respectively, are generated by the MLS 28.

(2) In the reading microinstructions, on the other hand, the node N0 is not significant and is not used by the RAM1. Instead, the output NC is of value and can be sent to a B register if the state S002 and the command CA05 are present, or to an A register if the state S003 and the command CA05 are present.

In Table E are listed the microinstructions using the RAM 1, with the respective commands and states generated by the MLS 28.

TABLE E

| MICRO-INSTRUCTION | State S004 COMMANDS | | | State S002 COMMANDS | | | State S003 COMMANDS | | |
|---|---|---|---|---|---|---|---|---|---|
| | CM03 | CM04 | CM05 | CM04 | CM06 | CM07 | CM04 | CM06 | CM07 |
| AMD | 1 | 0 | 0 | 1 | 0 | 0 | | | |
| MAD | 1 | 0 | 0 | X | X | X | | | |
| MAIP | 0 | 1 | 1 | | | | X | X | X |
| MBIP | 0 | 1 | 1 | X | X | X | | | |
| AMI | 0 | 1 | 1 | | | | 1 | 0 | 0 |
| AMIP | 0 | 1 | 1 | | | | 1 | 0 | 0 |
| BMI | 0 | 1 | 1 | 0 | 1 | 0 | | | |
| BMIP | 0 | 1 | 1 | 0 | 1 | 0 | | | |

All the blocks of the central unit 3 and also all the commands generated by the MLS 28 for controlling the flow of information between the blocks themselves are specifically described in the foregoing description. The MLS 28 has not been described in detail, however; this is nothing but a matrix having as rows the outputs of the registers 26 and 27 and as columns the conductors on which the commands C are generated. The MLS 28 is moreover conditioned by the timer 20 to generate the commands in the desired sequence.

For further details on the MLS 28, references should be made to the bood "Microprogramming, Principles and Practices" by Samir S. Husson, published in 1970 by Prentice-Hall Inc., Englewood Cliff, N.J., United States of America. In Chapter 2, the principle on which a sequence of commands adapted to execute microinstructions is generated is explained with reference to concrete examples.

11. CHANNEL LOGIC 45

The channel logic 45 is a complex of circuits adapted to handle and coordinate the exchange of data and commands between the central unit 3 and the peripheral units 4 connected thereto, excluding the console 7, which has direct access to the central unit 3 through the node NA-NB.

A detailed description of the channel logic 45 is given in U.S. patent application Ser. No. 454,973 for "Electronic Computer" filed on Mar. 26, 1974 and assigned to the same assignee of this application which is a continuation-in-part of the U.S. patent application Ser. No. 92,777 filed on Nov. 25, 1970 and now abandoned.

At the present time it is desired only to make it clear that the channel logic 45 handles the microinstructions among the various priority levels present in the processor on the basis of a predetermined order or priority.

The reason for inserting the channel logic 45 is therefore to permit interruption of the microprogram in progress in order to execute an interrupting microprogram having greater priority.

In this particular case there are four priority levels of microprograms, that is:

The main microprogram or microprogram of priority 4, which normally has the function of interpreting and executing the instructions of the program by processing the data and starting the input and output operations;

A microprogram of priority, 3, normally intended for executing operations which do not come within the predetermined time sequence of the program, microprogrammed handling of input-output operations;

Microprograms of priorities 2 and 1, normally intended for effecting the transfer of data from a peripheral unit to the memory or vice versa.

With each microprogram there is associated an addressing register as shown in FIG. 8.

More particularly, level 4 is addressed by the register L00, level 3 by the register L01, level 2 by the register A13 and level 1 by the register A12.

The transfer of the data from the peripheral units to the central unit 3 may take place in two modes. The first is handled by the gate 99 which permits direct access to the RAM 1 through the node N0 (FIG. 2c). This gate is controlled by the microinstructions for direct access to the RAM 1 which have already been described hereinbefore. The second mode is handled by the gate 70 of the node ND-41 and permits access to the operative registers 31 and 32 through the nodes NA and NB. The data and commands from the peripheral units which are recorded in the operative registers 30 and 31 are processed directly by the set of microinstructions which work on the registers.

DETAILED DESCRIPTION OF THE RAM 1 AND THE ROM 2

A description of the part of RAM 1 used by the DBG programs will not be given with references to FIG. 9. The first zone, called the reserved zone (ZRM), is at the disposal of the interpreter microprogram and the microprograms handling the peripheral units and of the DBG programs.

The second zone, on the other hand, is intended for recording the programs to be performed, the data on which these programs operate and the results of the processing operations.

Before describing the RAM 1 in detail, it is necessary to mention briefly the operations performed by a special microprogram residing in the ROM 2 and called the interpreter. This microprogram, which will be described in detail hereinafter, performs the following operations:

Interprets the current instruction (Phase ALFA);
Recognizes the program interrupts;
Starts the interrupt program be recognizing whether it is recorded in the RAM 1 or in the ROM 2;
Inhibits all interrupts, including that of the program in the starting stage;
Enables reading from the RAM 1 or from the ROM 2 according to whether the interrupting program resides in the RAM 1 of in the ROM 2;
Carries out the reading of the instruction from the RAM 1 or from the ROM 2;
Recognizes the formats of the instructions;
Extracts the operands;
Carries out the instructions by starting the microprograms associated therewith (Phase BETA).

More particularly, the ZRM comprises a register PSR-300 (FIG. 9) which contains the parameters of the program in course of processing and is constituted by the following registers (see Table F):

A base register RB-310 which contains the initial address of the memory zone available for normal programs. The register RB-310 is used by the interpreter for computing the addresses of the operands expressed in the instructions. It is modified by suitable instructions during the execution of a program.

This is used by the interpreter to modify the second byte of the instruction to be executed and can be compiled by the programmer as a function of results of preceding instructions.

The bytes 316, 317 and 318 are used for other purposes which do not concern the invention and they are

TABLE F

| REG.NO. | NAME | ABBREVN | NUMBER OF BYTES | ADDRESS FROM | ADDRESS TO | |
|---|---|---|---|---|---|---|
| 310 | BASE REGISTER | RB | 2 | 00B0 | 00B1 | |
| 311 | POINTER 1 | P1 | 2 | 00B2 | 00B3 | |
| 312 | POINTER 2 | P2 | 2 | 00B4 | 00B5 | IPSR-302 |
| 313 | PROGRAM CONDITIONS | CP | 1 | 00B6 | — | |
| 314 | INTERRUPT RESERVATION | PI | 1 | 00B7 | — | |
| 315 | INSTRUCTION MODIFN | MI | 1 | 00B8 | | |
| 320 | BASE REGISTER | RB | 2 | 00D0 | 00D1 | |
| 321 | POINTER 1 | P1 | 2 | 00D2 | 00D3 | |
| 322 | POINTER 2 | P2 | 2 | 00D4 | 00D5 | |
| 323 | PROGRAM CONDITIONS | CP | 1 | 00D6 | — | OPSR-301 |
| 324 | INTERRUPT CODE | CI | 1 | 00D7 | — | |
| 325 | INSTRUCTION MODIFN. | MI | 1 | 00D8 | — | |
| 327 | OPSR ADDRESS | IR | 2 | 00DA | 00DB | |
| 333 | PROGRAM CONDITIONS | CP | 1 | 00BC | — | |
| 334 | ENABLE INTERRUPT | AI | 1 | 00BD | — | PSR-300 |
| 335 | INTERRUPT ADDRESS | II | 2 | 00BE | 00BF | |
| 350 | STOP ADDRESS | IS | 2 | 00EC | 00ED | |
| 351 | DBG SERVICE BYTE | BSD | 1 | 00C7 | — | |
| 352 | WORKING REGISTER | RL | 8 | 00A8 | 00AF | |
| 353 | REFERENCE TABLE ADDRESS | ITR | 3 | 00D4 | 00D6 | |

Pointer registers P1-311 and P2-312; these are registers used by particular instructions for computing the absolute addresses of the operands. These addresses are obtained by adding P1-311 or P2-312 to RB-310. Their contents can be modified by special instructions.

Program conditions byte represented in FIG. 9a has the following significance:

The bits 00, 01 are called the condition code (CC) and are compiled by the arithmetical and logical instructions for storing the significant results. These conditions are then sensed by other instructions for executing conditional jumps. The bit 03 is used by the interpreter to establish whether the instruction to be executed is to be read from the RAM 1 (bit 03 =1) or from the ROM 2 (bit 03 =0). This bit is normally at "one" and is put to "zero" only by the interpreter microprogram when this recognizes an interrupt generated by the actuation of the key 100 which calls a DBG program residing in the ROM 2 to indicate that the instructions of this program must be read in the ROM 2. The bit 05 is normally at one and is used to enable interrupts by the programmer because of DBG requests and is put to zero by the interpreter when the interrupt is activated. The bits 02, 04, 06, 07 are not used by the DBG programs and serve to enable other causes of interruption.

Interrupt Reservation Byte (PI-314 of FIG. 9).

This is used by the interpreter to actuate a request for an interrupt contained therein.

An interrupt is actuated if the AND between PI and CP is different from zero, as will be explained hereinafter (interpreter section). This is compiled by the microprograms associated with causes of interruption originating both from the central unit 3 and from the peripheral units 4. More particularly, the bit 05 indicates a DBG interrupt.

The manner in which the bit 05 of the interrupt reservation byte is forced to 1 will be described in detail hereinafter in the section concerning the debugging service byte (Table F).

Instruction modification byte (MI-315 of FIG. 9).

therefore not described.

The ZRM moreover comprises another register OPSR-301 which serves to contain the parameters of the interrupted program. The OPSR-301 is compiled by the interpreter by taking the corresponding registers and bytes from the register PSR-300. When the interrupt program terminates, the last instruction is always for resumption of the interrupted program, that is to say it is an instruction which transfers OPSR-301 to PSR-300. More particularly, the register OPSR-301 comprises:

The registers RB-320, P1,321, P2-322, CP-323, MI-325, 326, which are compiled with the contents of the corresponding registers 310–316 of PSR-300.

The register 324 contains the interrupt code CI (FIG. 9b), that is the code of the cause of interruption in course of processing in the program being executed. It is compiled by the interpreter before the interrupting program is activated. The causes of interruption specified by the CI are divided into five uniform classes each handled by a different microprogram. To each class there corresponds one bit of the CI; more particularly, classes 1 and 2 each correspond to a single cause of interruption and are identified by the bits 01 and 02, respectively. Classes 3, 4, 5 are identified by the bits 05, 06, 07, respectively, and each comprises a plurality of causes of interruption (sixteen causes at the most) identified by the bits 00–03.

The reason for recording the CI of the cause of interruption in OPSR-301 is the fact that the resumption or non-resumption of the interrupted program really depends on the type of interrupt. For example, if the cause of interruption is such that the interrupted program cannot be resumed, then the interrupt program ends by calling the operator. Only after intervention by the operator will it be possible for the interrupted program to be resumed.

The register IR-327 contains the re-entry address of PSR-300 to which corresponds the instruction which is to be executed at the instant of re-entry.

It is compiled by the interpreter by transferring the contents of the operative register L07 (program addresser) at the time of the interrupt.

The ZRM moreover comprises a register IPSR-302 which serves to contain the parameters of the interrupt program. The register comprises a byte CP-333 which indicates the program conditions associated therewith.

whether a stop has been reserved; it is compiled by the DBG program associated with the addressed stop. The bit 03 indicates whether the key change-over switch 100 is in the normal position (bit 03 =0) or in the debugging position (bit 03 =1). It is compiled by the microprogram given in Table G using the position of the key 100.

TABLE G

| SYMB.ADDRESS | MICROINSTRN. | CODE | 1st OPERAND | 2nd OPERAND |
|---|---|---|---|---|
| IDISO | C A C 7 | MAD | A10 | CC7 |
|  | 9 2 F 7 | CRTB | B02 | CF7 |
|  | 6 A 2 8 | ANDA | A10 | B02 |
|  | A 8 8 8 | TCCA | A08 |  |
|  | B 8 E 7 | TADI | A08 |  |
|  | 9 2 0 0 | CRTB | B02 | C00 |
|  | 2 2 3 6 | SADO | D02 | IDISA0 |
|  | 9 2 0 8 | CRTB | B02 | C08 |
| IDISA0 | 6 A 2 E | ORA | A10 | B02 |
|  | D A C 7 | AMD | A10 | CC7 |
|  | C 2 B 7 | MAD | A02 | CB7 |
|  | 9 2 D 0 | CRTB | B02 | CD0 |
|  | 6 2 2 8 | ANDA | A02 | B02 |
|  | B A E 7 | TADI | A10 |  |
|  | 9 2 3 0 | CRTB | B02 | C20 |
|  | 3 2 4 0 | SADI | D02 | IDISA1 |
|  | 3 3 4 0 | SADI | D03 | IDISA1 |
| IDISA1 | 6 2 2 E | ORA | A02 | B02 |
|  | D 2 B 7 | AMD | A02 | CB7 |

The byte CP has the significance described in FIG. 9a and is transferred to the register CP-313 by the interpreter at the instant of the enabling of the interrupting program.

Figure 2B:
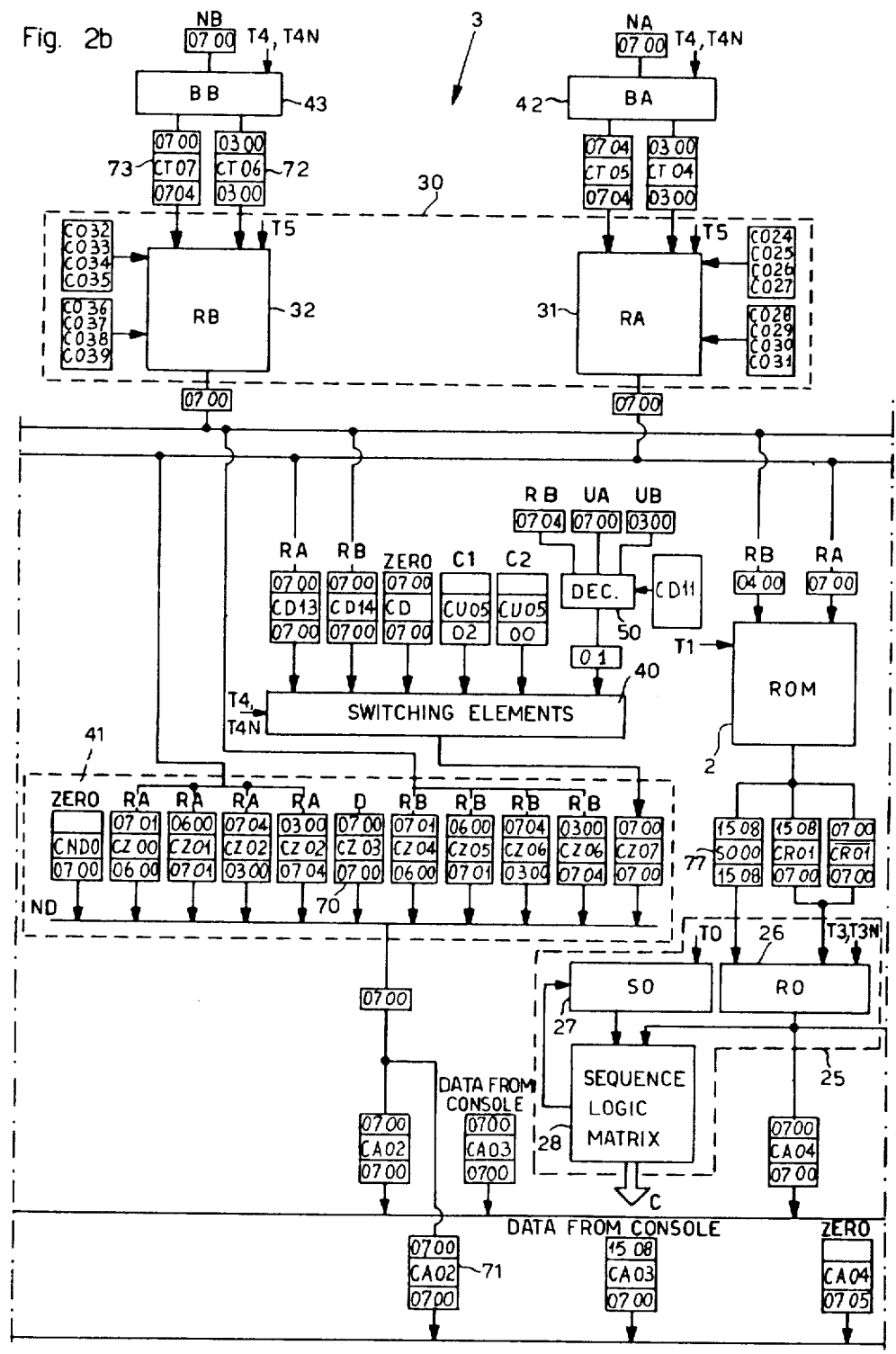
Figure 2C:
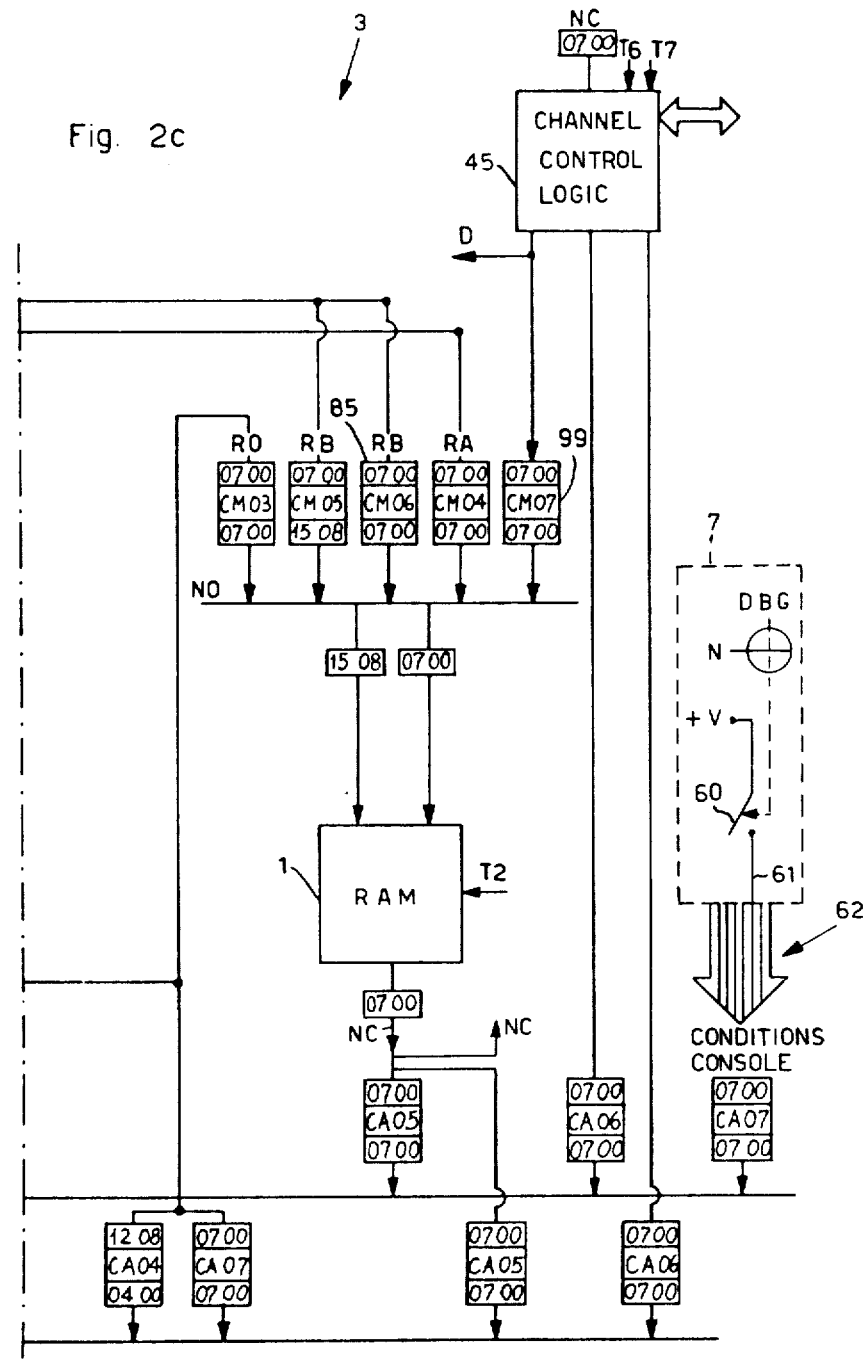

The register IPSR-302 moreover comprises the interrupt program address II-333 (FIG. 9), which is loaded into the register L07 of the registers 30 of FIG. 2b by the interpreter if the interrupt program is recorded in the RAM 1.

The register 302 moreover comprises the interrupt enable byte AI-334 represented in FIGS. 9c, in which the bits 01-02-05-06 and 07, if at 1 level, indicate that the programs corresponding to the respective interrupt classes are recorded in the RAM 1, and, if at zero level, that the programs are recorded in the ROM 2.

More precisely, the interpreter carries out the logical AND function between the interrupt code CI and the interrupt enable byte AI. If the logical AND is zero, this signifies that the program associated with the interrupt is recorded in the ROM 2; if it is one, the program is recorded in the RAM 1.

In the first case, the interpreter forces the contents of the register II-335 into the operative register L07; in the second case it forces therein the address in the ROM 2 of the beginning of the zone B reserved for the DBG programs.

The ZRM moreover comprises a register IS-350 shown in FIG. 9 which contains the STOP address at which the operator desires to halt the processing of the program, as mentioned in the initial part hereof and as will be better explained hereinafter. This register is compiled by a DBG program using the data entered on the keyboard by the programmer.

The ZRM moreover comprises a DBG service byte (BSD-351).

The BSD-351 is represented in detail in FIG. 9d. The bits used are the bit 01, which indicates (as will be better explained in the section on the interpreter) whether the instruction present at the instant of the interrupt is to be executed or not. If this bit is equal to zero, the instruction is executed, otherwise the interrupt program is performed. The bit 02 indicates Referring to FIG. 2c, through the medium of the key 100 the console 7 actuates a switch 60 which is connected directly to the node NA through the wire 61 forming part of the channel 62.

If the key 100 is in the NORMAL (N) position, the switch 60 is open and therefore the wire 61 is at zero level. As has been said, this corresponds to the normal working of the machine. On the other hand, when the key 100 is in the DEBUGGING (DBG) position, the switch 60 is closed, so that the wire 61 is at one level.

The timer 20 generates every 60 milliseconds a signal TM which causes an interrupt in the microprogram of level 4 (that is the interpreter in the microprogram) and executes the microinstruction addressed by the register L01 (addresser of the microprogram of level 3). This microinstruction forms part of a predefined sequence of microinstructions which corresponds to the various external conditions to be checked during the performance of a program.

More particularly, at the instant TM there is present in the register L01 the address corresponding to the microprogram IDISO given in Table G.

By means of a microinstruction MAD there is loaded into A10 the cell of RAM 1 at the address C7, that is the DBG service byte, BSD-351. Then, by means of a microinstruction CRTB, the number F7 = 11110111 is loaded into the register B02. By means of a microinstruction ANDA, the logical AND between BSD and F7 is transferred to A10, that is in A10 there is the BSD with the bit b03 = 0.

Then, by means of a microinstruction TCCA, there is transferred to A08 the byte present on the channel 62 (see FIG. 2). More particularly, if the key 100 is in the DBG position, the wire 61 (which corresponds to the bit 02 of the channel 62) is at 1 level. By means of a microinstruction TADI the byte on the channel 62 is transferred to the switching elements 40. Then, by means of a microinstruction CRTB, the number 00 is forced into the register B02. Thereafter, the logical level of the switching element D02 (on which the condition of the wire 61 corresponding to the DBG position of the key 100 is present) is sensed. If this bit is at 1 level, the number 08 = 00001000 is forced by means of a microinstruction CRTB into the register B02 and the logical OR is then carried out (microinstruction ORA) between the contents of the register A10 and the number 8. It is to be noted that the BSD with the bit b03 = 0 was recorded in the register A10 and therefore the result of the microinstruction ORA is to force the bit b03 to one.

If, on the other hand, the bit on the wire 61 is at zero level, the microinstruction CRTB which forces 00001000 into B02 is not executed, so that the logical OR is carried out between the contents of the register A10 and the number 00000000; this corresponds to leaving the bit 03 of BSD at zero.

After these operations, by means of a microinstruction AMD there is rewritten in the location $\phi\phi$C7 (BSD-351) the BSD modified in this way. In short, if the key 100 is in the NORMAL position, the bit b03 = 0; if, on the other hand, it is in the DBG position, b03 = 1. The same microprogram moreover provides for compiling the bit 05 of the interrupt reservation byte (PI). By means of a microinstruction MAD, the byte recorded at the address $\phi\phi$B7 of the RAM 1, that is the byte PI - 314, is transferred to the register A02.

Then, the bit 05 of PI is zeroized by means of the two microinstructions CTRB and ANDA. By means of the two microinstructions TADI, the contents of the register A10, that is the BSD previously modified in accordance with the condition of the console key 100, are transferred to the switching elements 40.

The number 20 = 00100000 is then written by means of a microinstruction CRTB in the register B02. Then, by means of two microinstructions SADI, there are sensed the bits b02 and b03 of the BSD which have been previously loaded into the switching elements, and which correspond respectively to having reserved a STOP address and to having actuated the key 100. If at least one of the bits sensed is at 1 level, a microinstruction ORA puts to one the bit b05 of the byte PI, which is rewritten in the RAM 1 by means of a microinstruction AMD. If, on the other hand, both of the bits b02 and b03 of the BSD are at zero level, there is forced into the register B02, by means of a microinstruction CRTB, the number 10 = 00010000, which corresponds to another cause of interruption which does not concern the DBG and is therefore not described.

The ZRM moreover comprises an 8-byte register called the working register (RL-352 in FIG. 9), which is used as a work area for accumulating the partial results during the carrying out of some instructions and for supplying, at the end of an instruction, a result which cannot be contained in the registers of the operands (for example, the remainder of a division).

The ZRM moreover comprises an eight-byte register 359 called the conditions register RC. Each byte is divided into two semibytes which identify special conditions of the program. In fact, the register 359 is used to collect all the significant conditions of the program which arise during the execution of internal or external instructions and which, in view of their high number, cannot be expressed in the condition code or which it is appropriate to store independently of this.

Of all the semibytes there will be explained only the contents of the ninth, since this is used by the DBG programs, as will be explained hereinafter. The ninth semibyte occupies the first four bits of the cell $\phi\phi$CB and is used by the introduction-from-keyboard instructions for compiling the code of the bar 102 which has concluded an introduction of data from the keyboard.

The ZRM moreover comprises a one-byte register AB-370 which identifies the bars 102 which are enabled by the program. More particularly, the register is compiled, as will be seen hereinafter, by the DBG programs for enabling the bars S0, S1, S2, S6, since these only have significance during the carrying out of the DBG.

The ZRM moreover comprises a group of eight registers 360 - 367 (FIG. 9) which are normally used by the programs in the following manner. The registers 360 to 363 are used together with the working register 352 to contain the intermediate results during the operations of multiplication and division and the results which cannot be contained in the registers of the operands. More precisely, the multiplication and division instructions are executed by microprograms which operate on the said registers. It is to be noted that the contents of these registers are not significant at the end of the instruction which has used them inasmuch as all the conditions and the results which are significant are transferred to memory areas outside the ZRM which are addressed by the operands of the specific instructions.

The registers 364 and 365 are used by the instructions for EDITING of a register, that is to say they contain all the characters relating to punctuation, the algebraic characters (+, −), the spaces, etc. required during the print-out of an area of memory. They are called by the operands of these instructions and their contents are no longer significant at the end of such an instruction. The registers 366 and 367 are used by the DBG program as an extension of the register OPSR-301. That is to say, they serve to load significant conditions of the interrrupted program which cannot be contained in the register OPSR-301. It is to be noted that while the registers 360 to 365 do not contain significant data at the end of the instruction which uses them, the registers 366 and 367 contain a significant data for the purposes of the resumption of the interrupted program and can therefore be used by the DBG programs only in special cases which will be specified hereinafter.

It is to be noted, moreover, that the registers 360 to 367 do not necessarily have to be allocated to the positions in the RAM 1 which are indicated in FIG. 9, but may be in any zone of the memory. One of the characteristics of the invention resides, in fact, in identification in the RAM 1, by means of the respective addresses, of a certain number of registers (eight in our case) which do not contain significant data at the end of the execution of the instructions and in utilization of these registers as backing registers for the debugging programs. All this is naturally done automatically and without the intervention of the programmer, who only has to actuate the key 100 and the bars 102.

It is made clear, moreover, that it is not necessarily the registers 360 to 367 that have to be used as backing registers for the DBG programs, but registers reserved exclusively for the DBG programs may be used and may be allocated both in the ZRM and in the free memory or may even be registers outside the memory.

The free memory zone, that is the zone immediately following the ZRM, moreover contains a zone called the reference table zone, the location of which is defined by a register of the ZRM. This register ITR-353 is composed of three bytes, the first two of which define the initial address of the table, while the third defines the length of the table itself (at the most 256 bytes). The table of references if addressed by a number of instructions for calculating the addresses of the operands. The free memory zone immediately following the reference table contains sixteen registers, each of eight bytes, which are called privileged registers. These registers, in fact, can be addressed directly by the instructions by citing their reference number in hexadecimal notation. The remaining part of the RAM 1 can moreover be addressed in free fashion.

The ROM 2 is divided into two zones A and B (FIG. 1). The zone A comprises all the microprograms required for the working of the processor, the zone B comprises the DBG programs.

INSTRUCTION INTERPRETING MICROPROGRAM (INTERPRETER)

As has been stated, the programs recorded in the RAM 1 are executed instruction by instruction. Each instruction in turn is executed in two phases: an interpretive phase (Phase ALFA) and an execute phase Phase BETA). The interpretive phase is common to all the instructions and is executed by a suitable microprogram, called the interpreter, recorded in the zone A of the ROM 2. This phase terminates with the recognition of the format of the instruction which the interpreter microprogram itself has read from the RAM 1 or om the ROM 2 and with the preparation of the operands in the operative registers 30. This microprogram is therefore called at the beginning of each instruction by the microinstruction terminating execution of the instruction just carried out.

More particularly, therefore, the execution of any instruction of the program which the processor performs takes place in the following manner:

The last microinstruction of the microprogram which has executed the preceding instruction is an unconditional jump microinstruction SAI to the address IALFA Table H), that is the first microinstruction of the interpreter microprogram.

Table H in which the microinstructions corresponding to the interpreter microprogram are listed is given hereinafter.

The first column indicates the symbolic names of the jump addresses which will be used as operands in the jump microinstructions.

TABLE H

| SYMB.ADDRESS | MICROINSTRN. | CODE | 1st OPERAND | 2nd OPERAND |
|---|---|---|---|---|
| IALFA | 8 8 0 0 | CRTA | A08 | C00 |
|  | D 8 B 8 | AMD | A08 | CB8 |
| IALFAJ | C E B 6 | MAD | A14 | CB6 |
|  | 5 E F C | TAB | A14 | B15 |
|  | C E B 7 | MAD | A14 | CB7 |
|  | 6 E F 0 | AND | A14 | B15 |
|  | 2 1 E 1 | SAD0 | D01 | IINTE |
| IALFUR | C E B 6 | MAD | A14 | CB6 |
|  | B E E 7 | TADI | A14 |  |
|  | 3 3 1 3 | SADI | D03 | IALFA1 |
|  | 4 7 2 F | SLL | L07 | L02 |
|  | 7 8 0 0 | ROMA | A08 |  |
|  | 5 8 F C | TAB | A08 | B14 |
|  | 7 8 0 0 | ROMA | A08 |  |
|  | 5 8 F C | TAB | A08 | B15 |
|  | 4 2 7 F | SLL | L02 | L07 |
|  | 0 2 1 5 | SAI | IALFA2 |  |
| IALFA1 | E 7 E 5 | MBIP | M07 | B14 |
|  | E 7 F 5 | MBIP | M07 | B15 |
| IALFA2 | C 8 B 8 | MAD | A08 | CB8 |
|  | B 0 6 6 | REDI | D00 |  |
|  | 6 8 F 5 | ADDB | A08 | B15 |
|  | 9 2 0 2 | CRTB | B02 | C02 |
|  | 5 2 E 3 | TBA | A02 | B14 |
|  | 7 B 0 0 | ROMA | A11 |  |
|  | 7 2 0 0 | ROMA | A02 |  |
|  | 5 B 2 C | TAB | A11 | B02 |

The second column gives the microinstruction in hexadecimal code; the third, fourth and fifth columns give the instruction in symbolic form, that is the function performed, the first operand and the second operand, respectively.

It is pointed out that if an operand is indicated by the letter C followed by two alphanumeric characters, this means that the operand is the hexadecimal number (one byte) which follows the letter C.

Reference will now be made to Table H, FIG. 9 and FIGS. 10a, 10b and 10c.

By means of the first two microinstructions CRTA and AMD, the character CRT 00 is forced into the address $\phi\phi$B8 of the RAM 1, that is the instruction modification byte (block 200 of FIG. 10a) is put to zero; this is necessary since a new instruction has to be initiated. By means of the following two microinstructions, that is MAD and TAB, the contents of the cell $\phi\phi$B6 are transferred to the operative register B15 through the register A14 the said cell containing, as has been said, the program conditions byte CP-313 (block 201).

With the microinstruction MAD there are transferred to the register A14 of the group 31 the contents of the cell $\phi\phi$B7, in which is recorded the interrupt reservation byte PI-314 (block 201).

As has been seen, the interrupt reservation byte PI contains in coded form the causes which may produce an interrupt in the program being executed. The logical AND is then carried out between CP-313 and PI-314 by the microinstruction AND (logical decision 202).

As explained hereinbefore (see Table A), the microinstruction AND sends the switching element D01 of the group of switching elements 40 to one if the result of the AND is zero. With the following microinstruction SADO, the contents of the switching element D01 are sensed and, if this is at zero logical level (that is, if an interrupt has been reserved) a jump is carried out to the address given by the symbolical name IINTE (block 250) at which is recorded the first microinstruction of Consequently, D01 will be forced to zero by the microinstruction AND and therefore the jump to IINTE will be obtained.

TABLE J

| SYMB.ADDRESS | MICROINSTRN. | CODE | 1st OPERAND | 2nd OPERAND |
|---|---|---|---|---|
| IINTE | 6 E F 4 | ANDB | A14 | B15 |
| | C A C 7 | MAD | A10 | CC7 |
| | B F F 7 | TEDI | B15 | |
| | B A E 7 | TADI | A10 | |
| | 2 1 6 1 | SADO | D01 | IINTE1 |
| | 2 2 6 7 | SADO | D02 | IINTE2 |
| | 3 3 6 7 | SADI | D03 | IINTE2 |
| | C 8 E D | MAD | A08 | CED |
| | 5 8 8 C | TAB | A08 | B08 |
| | C 8 E C | MAD | A08 | CEC |
| | 6 8 7 3 | ORE | A08 | B07 |
| | 2 1 6 1 | SADO | D01 | IINTE1 |
| | 6 7 8 3 | ORE | A07 | B08 |
| | 3 1 6 7 | SADI | D01 | IINTE2 |
| IINTE1 | 9 A 0 2 | CRTB | B10 | C02 |
| | 6 A A E | ORA | A10 | B10 |
| | D A C 7 | AMD | A10 | CC7 |
| | C A B 6 | MAD | A10 | CB6 |
| | 5 A F C | TAB | A10 | B15 |
| | 0 2 0 7 | SAI | IALFAR | |
| IINTE2 | 9 A F D | CRTB | B10 | CFD |
| | 6 A A 8 | ANDA | A10 | B10 |
| | D A C 7 | AMD | A10 | CC7 |
| | 9 D 0 $ | ARTB | B13 | C04 |
| IERR01 | 8 E B 0 | CRTA | A14 | CB0 |
| | 9 8 0 0 | CRTB | B08 | C00 |
| | 8 8 D 0 | CRTA | A08 | CD0 |
| | 8 B 0 A | CRTA | A11 | C0A |
| INTER1 | E E 9 D | MAIP | A14 | A09 |
| | E 8 9 9 | AMIP | M08 | A09 |
| | A B 4 A | DCA | A11 | |
| | 2 1 7 4 | SADO | D01 | INTER1 |
| | E 8 7 1 | BMIP | M08 | B07 |
| | E 8 7 B | AMI | M08 | A07 |
| | 8 8 D 7 | CRTA | A08 | C07 |
| | E 8 D 3 | BMI | M08 | B13 |
| | D B B 8 | AMD | A11 | CB8 |
| | C 9 B D | MAD | A09 | CBD |
| | 5 B D 2 | TBA | A11 | B13 |
| INTER5 | 6 B 9 0 | AND | A11 | B09 |
| | 2 1 8 E | SADO | D01 | INTER2 |
| | 8 B 0 0 | CRTA | A11 | C00 |
| INTER4 | D B B 6 | AMD | A11 | CB6 |
| INTER4 | 9 7 1 7 | CRTB | B07 | C17 |
| | 8 7 0 0 | CRTA | A07 | C00 |
| | 0 2 0 0 | SAI | IALFA | |
| INTER2 | C 9 B C | MAD | A09 | CBC |
| | D 9 B 6 | AMD | A09 | CB6 |
| | C 7 B E | MAD | A07 | CBE |
| | 5 7 7 C | TAB | A07 | B07 |
| | C 7 B F | MAD | A07 | CBF |
| | 0 2 0 0 | SAI | IALFA | | a microprogram which handles the interrupts (see Table J). If, on the other hand, the switching element is at one logical level, the phase ALFA of reading from the RAM 1 is continued.

Let us now examine the conditions which determine the jump to IINTE or the continuation of the interpreter microprogram.

If the byte PI is 0000 0000, the AND with the byte CP will of course be 0000 0000, so that the switching element D01 is at 1 level and the jump is not therefore carried out. The condition PI 0000 0000 indicates that no interrupt has been reserved. If at least one bit of PI is at one level and the corresponding bit of CP is also at one, that is to say that particular microinterrupt is enabled, then the AND between CP and PI will have at one the bit of the same weight as that of PI. If, for example, an interrupt has been reserved by means of the console key 100 (FIG. 1b), the byte PI, as has been seen, has the configuration 0010 0000. The byte CP, in turn, has been positioned by the programmer with the configuration 1X1X XXXX, since the program in progress provides for enabling the DBG interrupt, so that the AND between CP and PI will be 0010 0000.

If there has not been any interrupt, the whole byte CP is transferred to the switching elements 40 by means of the microinstuctions MAD and TADI (block 203). A check is then made by means of a microinstruction SADI whether the switching element D03 is at one level or zero level (logical decision 204).

As has been said, the bit 03 of the byte CP indicates whether the reading of the instruction is to be carried out from the RAM 1 or from the ROM 2.

If the reading of the instruction is to be carried out from the RAM 1 (case of normal programs), the first and second bytes of the instruction at the address contained in the long register L07 are read by means of the two microinstructions MBIP (block 205). At each reading (MBIP) the register L07 is incremented by one. The two bytes are moreover transferred to the registers B14 and B15 of the operative registers 32. From what has been said, it can be seen how the register L07 acts as a program addresser for the instructions, since it always indicates the address of the following instruction after each reading. Moreover, in the event of the instruction preceding the current one having been a jump instruction, it will have already compiled in the register L07, by means of a suitable microprogram carried out in the BETA phase, the address in the RAM 1 of the instruction to which to jump. To sum up, both as regards sequential addressing and as regards addressing with a jump, the register L07 always contains the address in the RAM 1 of the following instruction.

If the current instruction is to be read from the ROM 2 (case of the DBG programs), the bit 03 of the program conditions has been forced to zero, so that the jump to IALFA1 is not executed. However, the microinstruction SLL is executed and exchanges the contents of the register L07 with the contents of the register L02 block 206). Then, by two successive pairs of instructions ROMA and TAB, the first two bytes of the instruction read are transferred to the two registers B14 and B15 (block 206).

It is to be noted that the exchange of L07 and L02 is rendered necessary by the fact that the microinstruction ROMA which executes the reading from the ROM 2 is addressed exclusively by the register L02. It moreover increments the contents of this register by one after each reading. After the reading of the first and second bytes of the instruction, the contents of the register L07 are restored by executing an exchange microinstruction SLL by means of which the register L02 is exchanged with the register L07. It is to be noted, therefore, that in both cases, reading from the RAM 1 and reading from the ROM 2, the two bytes of the instruction to be executed are recorded in the two registers B14 and B15 of the registers 32 and that after such reading the register L07 already contains the address of the following instruction. After this, by means of three microinstructions MAD, REDI, ADDB (block 207 of FIG. 10a), the second byte of the instruction read is modified in accordance with the instruction modification byte (MI) previously recorded in the cell $\phi\phi B6$.

Figure 10A:
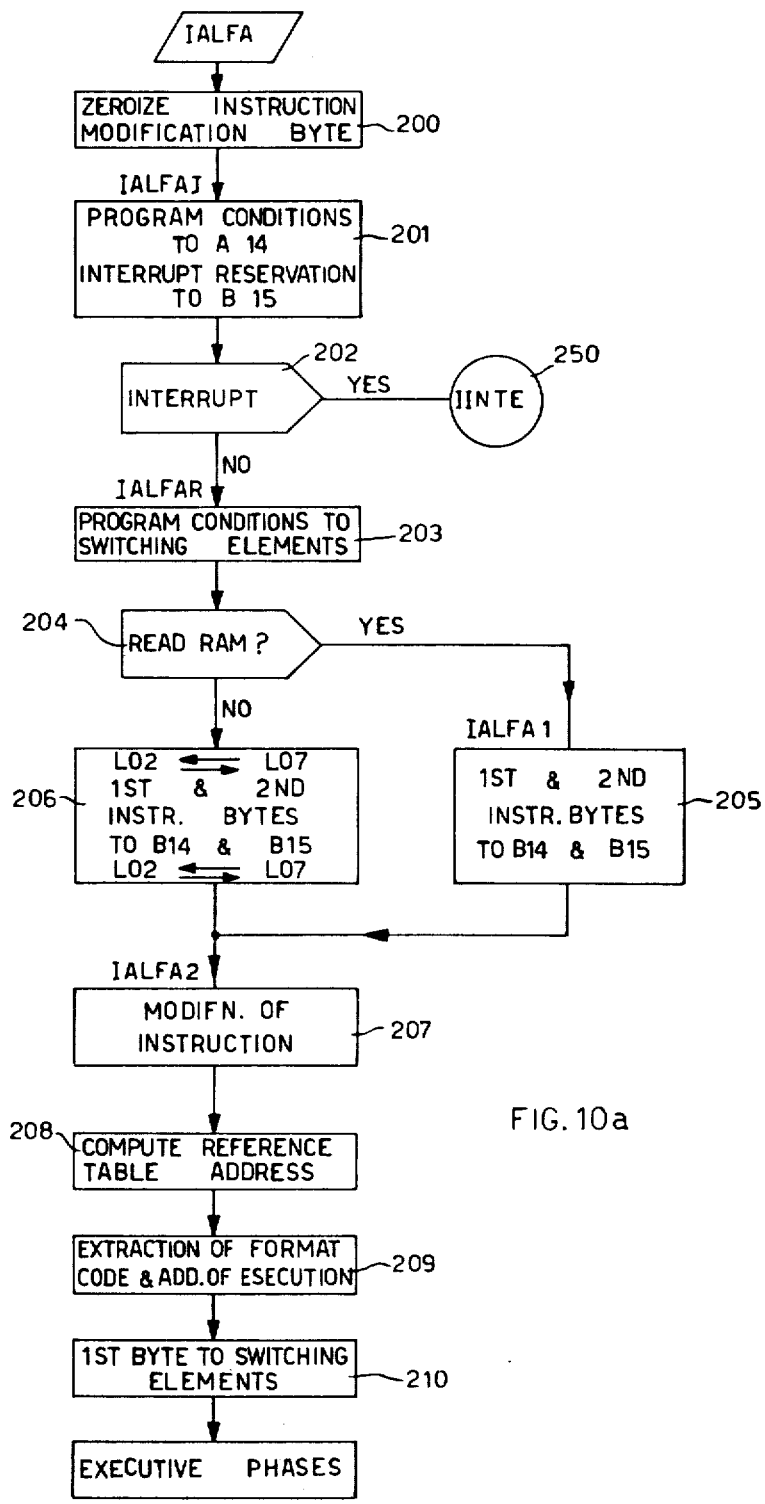
FIGS. 10a, 10b and 10c show the flow chart of the interpreter microprogram.

By means of the microinstructions CRTB and TBA (block 208), the first byte of the instruction is used to calculate an ROM address from which there are written pairs of bytes which correspond to the formats of the instructions (1st semibyte) and the addresses of the execute phases (2nd, 3rd and 4th semibytes) associated with sets of instructions; these pairs of bytes constitute the elements characterising the instruction. Then, by means of two consecutive microinstructions ROMA, the two bytes associated with the instruction are read and are transferred to the operative register L02 (FIG. 8). At this point, the instruction contained in L02 is examined by a microprogram which recognizes one of the seven possible formats given in FIG. 10d.

If the instruction recognized is of format 1, it is composed of a function code F, two bits I1 and I2 which indicate whether the respective registers R1 and R2 address the RAM 1 in direct or indirect manner, and two fields R1 and R2 of four bits which indicate two constants. If I1 = I2 = 0, the addresses of the operands are computed by multiplying the constants R1 and R2 by 8 and adding the value of the base register RB-310 to the result. In this way, the RAM 1 can be addressed by registers of eight bytes. If I1 = 1 and I2 = O, R1 indicates one of the sixteen privileged registers of the RAM 1 and R2 has the same foregoing significance. In this case, the first operand is read in the zone of the RAM 1 addressed by the contents of R1, while the second operand is computed as stated hereinbefore. All the cases I1 = 0 and I2 = 1 or I1 = 1 can be deduced from the foregoing ones.

If the instruction is of format 2, it is composed of a function code F, a bit I, and two fields R1 and L2. The first operand is computed as in format 1 (I1 = 0, I1 = 1), while the second operand is computed by adding the pointer P1 or P2 specified by the code F to RB. The field L2 contains the number of bytes of the second operand to be read starting from the computed address.

If the instruction is of format 3, it is composed of a function code F and two fields L1 and L2. The addresses of the operands are computed like those of the second operand of format 2 and the lengths of the operands are specified by the fields L1 and L2.

If the instruction is of format 4, it is composed of two fields. One indicates the function code F and the other a field E, MD, I and L which may assume four different significances on the basis of the contents of F. The code F addresses the two operands by means of the pointers P1 and P2 as for format 3 and moreover specifies the significance of the second field.

If the instruction is of format 5, it comprises a function code F in which the first operand is computed as for format 3 and the second operand as for format 1.

If the instruction is of format 6, the two bytes of the instruction are used directly in the following BETA phase.

If the instruction is of format 7, it is composed of four bytes, whereby it first transfers the bytes 1 and 2 to other registers 30 and then puts the bytes 3 and 4 addressed by the register L07 into B14 and B15. The instruction is composed of a function code F, a field E which indicates the element of the reference table from which to compute the address of the operand, and a field LD which indicates the displacement with respect to the address computed in this way.

After these operations, the interpreter ends its task and therefore initiates the execute phase BETA, in which the operands previously computed are processed. The instructions executed by the DBG programs are given in TABLE K, in which the respective formats appear.

Figure 10B:
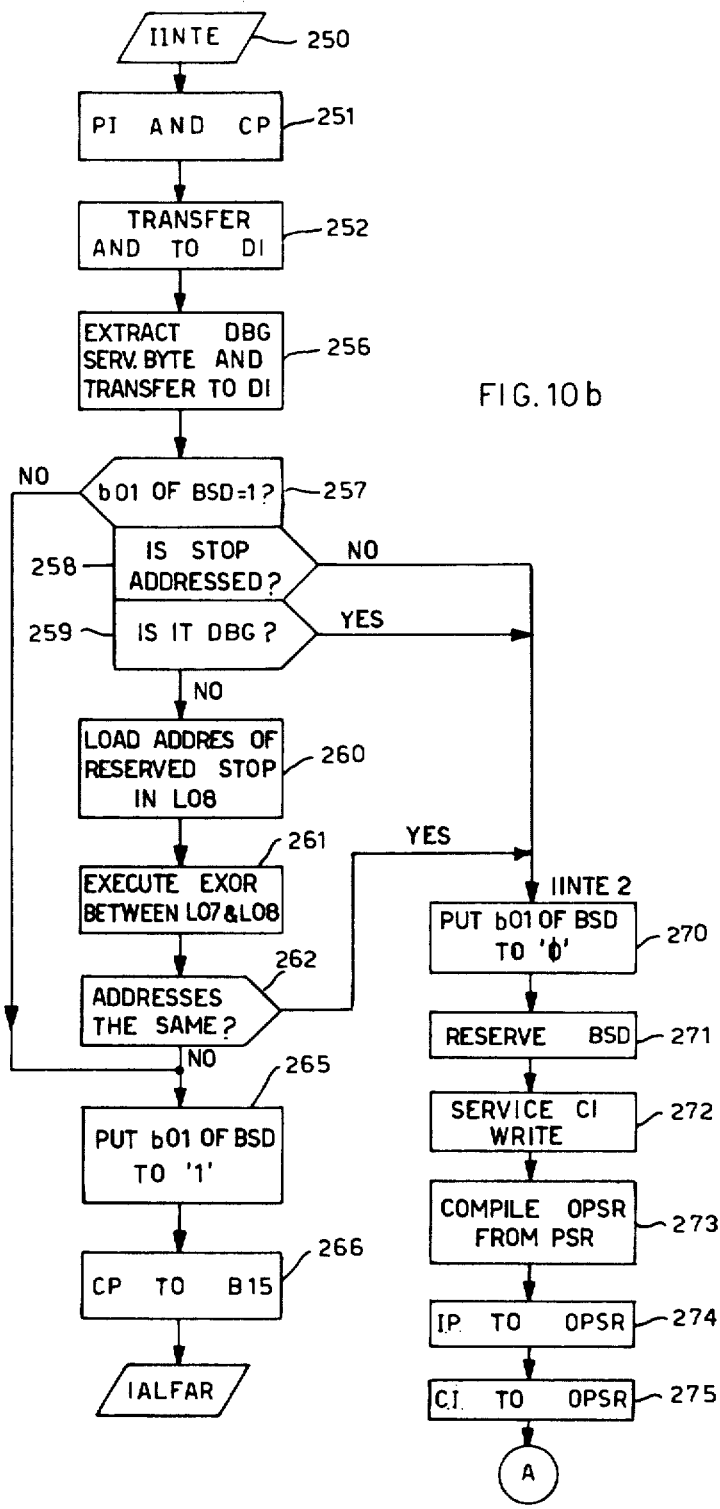
Figure 10C:
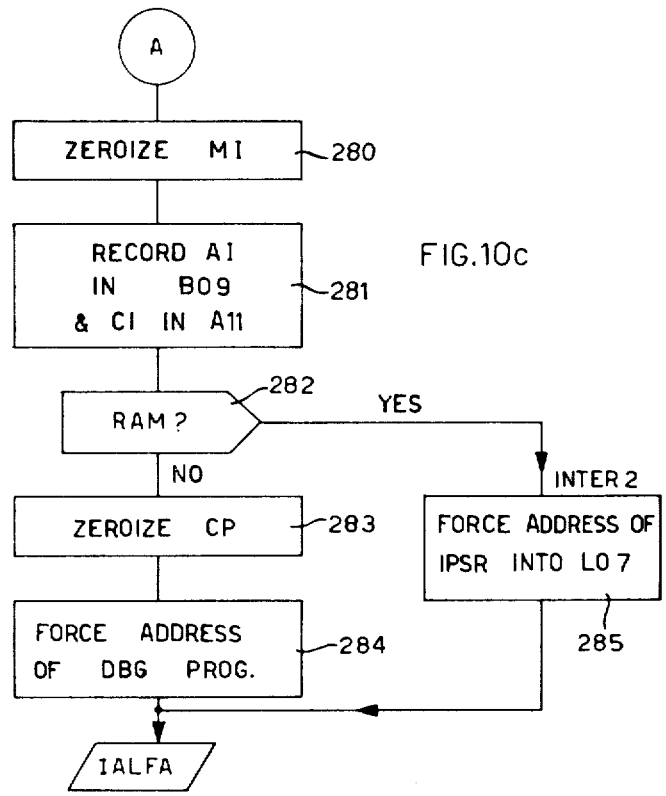
Figure 10D:
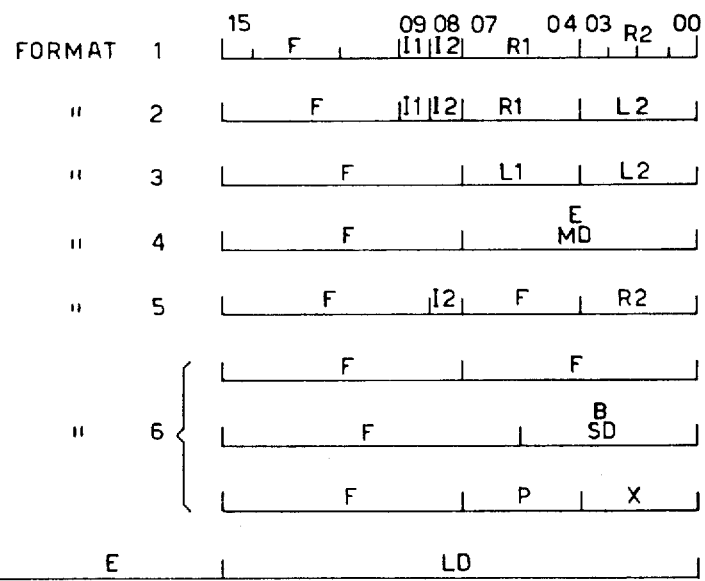
FIG. 10d shows the formats of the instructions.

If, during the phase ALFA, an interrupt is recognized (logical decision 202 of FIG. 10a), the interpreter performs a jump to the address IINTE (Table J and FIG. 10b). The first microinstruction ANDB executes again the AND between CP and PI and preserves the result thereof in the register B15 (block 251). This result is then transferred to the DEV-40 by means of the microinstruction TBDI and the switching elements are tested to recognize the cause of interruption with the exception of those originating from intervention of the programmer on account of DBG requests. In this case, the DBG service byte is read from the RAM 1 by means of the microinstruction MAD and is thereafter transferred to the switching elements 40 by means of the microinstruction TADI (block 256). After this, the switching elements D01, D02 and D03 which contain the bits 01, 02 and 03, respectively, of the BSD are tested.

The bit is normally at 0 level, as a result of which a jump is carried out to the address IINTE1 at which this bit is put to 1 and at which a jump is carried out to the address IALFAR. This is done to render the interrupt operative not during the instruction in progress or current instruction, but at the end thereof. Then there is sensed the switching element D03 (block 259), which distinguishes the STOP addressed from all the other DBG programs.

The checking of the bit 03 is effected after the bit 02 for the following reasons.

Let it be assumed that the programmer reserves a STOP address, that is he wishes the execution of the program to be interrupted at the instruction corresponding to the STOP address. This causes the bit 02 of the BSD to be brought to one together with the bit 05 of the byte PI, as will be better described hereinafter. This bit arrangement conditions the interpreter to jump to the address IINTE (logical decision 202) and from this it arrives at the logical decision 259.

The logical decision 259 distinguishes whether, besides the STOP addressed, another DBG program has been requested by the programmer. This eventuality arises if the operator becomes aware, as soon as the STOP request is made, that it is of no use to him and instead wishes, for example, to execute a special DBG program recorded on a magnetic card 9. This eventually corresponds to having the bits 02 and 03 in the BSD at one simultaneously. This causes a jump of the interpreter to IINTE2. It is arranged beforehand that at IINTE2 the STOP addressed will be inhibited and the DBG program selected by the programmer will be executed. In the example given, this program causes the reading and execution of the program recorded on the M.C. 9.

In brief, it is clear how the search for a reserved STOP address takes place only if there are not other alternative DBG requests, and it is therefore the DBG program of lower priority; in fact, the bit 02 of the STOP addressed is inhibited by any other DBG request.

In the event of the sole DBG request being the STOP addressed, there are executed the microinstructions MAD, TAB, MAD (block 260), by means of which the two bytes of the reserved STOP address removed from the cells $\phi\phi$EC and $\phi\phi$ED (register IS-350, FIG. 9) are transferred to the register L08 (30 in FIG. 2b). Then, by means of the microinstructions ORE, SADO, ORE, the EX-OR is carried out between the contents of the registers L07 and L08 (30 in FIG. 2b). That is, a comparison is made between the program address and the reserved address.

If the two addresses are the same, the microinstruction ORE puts the switching element D01 to one.

In this case, the microinstruction SADI causes a jump to IINTE2 (logical decision 262) and, as will be explained hereinafter, visual display of the instruction recorded at the reserved address will take place.

In the case of different addresses, the microinstructions CRTB, ORA and AMD are executed and produce the writing in the RAM 1 at the address $\phi\phi$C7 of the BSD, in which, however, the bit 01 has been put to 1 level (block 266). Then there are executed the microinstructions MAD and TAB, which restore the byte CP in the register B15 (block 266). A microinstruction SAI is thereafter executed and produces an unconditional jump to the address IALFAR (block 203 of FIG. 10a).

In this way, whether the bit 01 of the BSD is at 0 level (logical decision 256) or the addresses are different, the bit 01 of the BSD is put to 1 in each case and interpretation of the instruction is therefore continued with, so that during the following instruction the interpreter again executes a comparison of the addresses. In the event of the addresses being the same or there being a DBG request different from the STOP reservation, a jump is made to the address IINTE2.

The microinstructions CRTB and ANDA are executed and zeorize the bit 01 of the BSD (block 270), that is the normal condition of this bit is restored after the interrupt is activated. The BSD modified in this way is then put back in the RAM 1 at the address $\phi\phi$C7 by means of the microinstructions AMD and CRTB (block 271).

In this way, the reservation of the STOP is cancelled. Then there is executed the microinstruction CRTB, by means of which there is written in the register B13 the byte CI 0000 0100, which indicates that the cause of interruption is a DBG program.

Starting from this microinstruction the actual interruption of the program in progress takes place; in fact, the eight microinstructions following those contained at the address IERRO1 in the ROM 2 are executed and produce the transfer of the first ten bytes of the parameters of the program being executed which are recorded in the register 300-PSR to the corresponding cells of the register 301-OPSR (block 273).

The contents of the register L07 are then recorded at the addresses $\phi\phi$DA and $\phi\phi$DB of the RAM 1 by means of the microinstructions BMIP and AMI, that is the program addresser of the interrupted program is preserved in the register OPSR-301.

The interrupt code previously compiled is then written by means of the microinstructions CRTA and BMI at the address $\phi\phi$D7 (register 324 of FIG. 9).

In this way, there are preserved in the register OPSR-301 all the parameters which will allow resumption of the interrupted program at the end of the interrupt program.

As will be seen, all the interrupt programs terminate with the restoration of the register OPSR-301 to the register PSR-300. After this phase, the interpreter microprogram compiles the register 300 with the parameters of the interrupt program which is to be executed in substitution for the interrupted program. More particularly, by means of the microinstructions AMD (block 280 of FIG. 10c) it zeroizes the byte MI of the register PSR-300 and by means of the microinstructions MAD and TBA, TAB it transfers to the register B09 the byte AI recorded in the cell $\phi\phi$BD of the RAM 1 (register AI-334) and to the register A11 the byte CI previously compiled in the form 00000100 (block 281).

As has been said, the byte AI is compiled by the programmer to define whether the interrupt program is resident in the RAM 1 or in the ROM 2. In this particular case, for the reasons explained in the introduction, it has been chosen to record the DBG programs in the ROM 2, but this does not bar the possibility for the user to record his own DBG programs in the RAM 1 in the event of his having the opportunity of doing so. To do this, it is sufficient to activate the bit 03 of AI-334. There is now carried out the logical AND between AI and CI, which makes D01 = 1 if the AND is different from 0000 0000.

The microinstruction SADO checks the switching element D01 and, if this is at one level (program recorded in the ROM), it executes two microinstructions CRTA and AMD which zeroize the byte CP of the interrupt program in progress (block 283).

In this way it is brought to notice how the interpreter microprogram, having recognized that the cause of interruption is a DBG program, provides for inhibiting any other possible interrupt (CP = 0000 0000), inasmuch as these interrupts would be incompatible with the DBG programs.

After this, it executes the microinstructions CRTB and CRTA by means of which it forces the address 17φφ of the ROM 2 into the register L07 (block 284), then performs an unconditional jump to the symbolic address IALFA (FIG. 10a) to interpret the first instruction of the DBG program. The address 17φφ corresponds to the beginning of the zone B of the ROM in FIG. 9. It is to be noted that inter alia the interpreter has also forced the bit 03 of CP-313 to zero, so that when a return is made to IALFA the reading of the instructions will be effected from the ROM 2 and not from the RAM 1.

It is to be noted, moreover, that the interpreter also zeroizes the bit 05 of CP-313 relating to the instructions for debugging, because otherwise, after starting the DBG program, it would enter a closed circuit.

In fact, in executing the first instruction of the DBG program, the interpreter, at logical decision 202 (FIG. 10a), would find the DBG interrupt enabled, inasmuch as PI is not changed and the bit 05 of CP = 1. Consequently, it would jump to IINTE and, through the blocks 250 to 284 (FIGS. 10b and 10c), would jump again to the address IALFA and would not get out of the aforesaid cycle again.

Finally, in the event of the interrupt program being recorded in the RAM 1 (logical decision 182), the interpreter executes the microinstructions MAD, AMD, MAD, TAB, MAD (block 285 of FIG. 10c) by means of which it forces the address contained in the third and fourth bytes of the register IPSR-302 into the addressing register L07 of the program in execution and moreover loads the byte CP-333 of the register IPSR-302 into the register CP-313, thus establishing in the register PSR-300 the new conditions of the interrupt program.

DEBUGGING PROGRAMS

1. Instructions used.

It has been seen hereinbefore that the consequence of the operation of the key 100 or the recognition of a previously reserved STOP address is that the bit 05 of PI-314 and the bit 03 of the BSD are forced to 1 level.

It has moreover been seen that if the programmer has recorded the DBG programs in the ROM 2 he has taken care to put the bit 01 of the byte AI-334 of IPSR-302 to 0.

Finally, it has been seen how the simultaneous presence of the values of the bits just mentioned conditions the interpreter microprogram to interrupt the processing of the program in progress, preserve its significance parameters and force the address 17φφ of the ROM 2 into the program addresser L07.

This address is the address of the initial instruction of the DBG program stored in the ROM 2.

Before proceeding to the description of the DBG program, it is appropriate to explain with reference to Table K the significance of the instructions used thereby.

In Table K, the first column indicates for each instruction the format described hereinbefore to which the instruction itself belongs, the second column gives a brief description of the operation effected by the instruction, and the third and fourth columns indicate respectively the symbolic code and the machine code in hexadecimal notation of the instruction itself.

Let us now examine briefly the steps to be performed to process any instruction in Table K.

As has been seen, the interpreter reads the two bytes of the instruction from the RAM 1 or the ROM 2. On the basis of the contents of these bytes, the interpreter recognizes the format associated with the instruction, computes the address of the operands on the basis of the format, extracts the operands from the RAM 1 and transfers them to the operative registers B14 and B15. At this point, on the basis of the contents of the field F of the instruction, the microprograms which execute the instruction are extracted from the ROM 2. At the end of the execution, the interpreter is called and proceeds to the extraction of the following instruction.

Referring to Table K, the symbology used in the columns of the symbolic code and in the machine code of the instructions will now be explained. R1 and R2 indicate one of the sixteen privileged registers of the RAM 1.

TABLE K

| FORMAT | DESCRIPTION | SYMB.CODE | MACHINE CODE | |
|---|---|---|---|---|
| | | | 1st BYTE | 2nd BYTE |
| 1 | R1 ← R1 + R2 | AR | C 00$X_1X_2$ | R1 R2 |
| 1 | R1 ← R1 − R2 | SR | φ 01$X_1X_2$ | R1 R2 |
| 1 | R1 ← R2 | LR | φ 10$X_1X_2$ | R1 R2 |
| 1 | R2 ← WORKING REGISTER | LAX | 6 110 $X_2$ | B R2 |
| 2 | PACK | PK | 5 00$X_1$,1 | R1 L2 |
| 3 | INTR. AND DISPLAY VIS. FOR DBG | YOP | 6 E | L1 L2 |
| 3 | UNPACK AND TRANSC. HEXADEC. | YTX | D 6 | L1 L2 |
| 4 | P1 ← P1+(MD+1) | AP, 1 | 3 C | MD |
| 4 | P1 ← (P1−(MD+1)) | SP, 1 | 3 E | MD |
| 4 | P2 ← (P2+(MD+1)) | AP, 2 | 3 D | MD |
| 4 | PS ← (P2−(MD+1)) | SP, 2 | 3 F | MD |
| 4 | P1 ← E | TI, 1 | B 8 | E |
| 4 | P2 ← E | TL, 2 | B 9 | E |
| 4 | POINT 1 ← POINT 2 | MVC | C 5 | L |
| 4 | CONST 'I' → MEM (P1) | MVI, 1 | C 6 | I |
| 4 | CONST 'I' → MEM 'MVI, 2 | C 7 | 1 | |
| 4 | COMP. CONST 'I'- POINT 1 | CBI, 1 | B C | I |
| 4 | COMP. CONST 'I'- POINT 2 | CBI, 2 | B D | I |
| 4 | ENABLE BARS | KES | A 7 | I |
| 4 | AWAIT END OF OPERATION | WAIT | A 5 | I |

TABLE K-continued

| | | | | |
|---|---|---|---|---|
| 5 | P1←R2 | TRD, 1 | 6 110 X$_2$ | φ R2 |
| 5 | P2←R2 | TRD, 2 | 6 110 X$_2$ | 1 R2 |
| 5 | R2←P1 | LPD, 1 | 6 110 X$_2$ | 2 R2 |
| 5 | R2←P2 | LPD, 2 | 6 110 X$_2$ | 3 R2 |
| 6 | IP←(IP+SD) (SKIP) | F | 7 3 | 00 SD |
| 6 | IP←(IP−SD) (SKIP) | R | 7 3 | 01 SD |
| 6 | MOD. BIN. ACCORD. TO P1 | MDB, 1 | 9 A | 00 SD |
| 6 | MOD. BIN. ACCORD. TO P2 | MDB, 2 | 9 B | 00 SD |
| 6 | EXCHANGE RB⇌P1 | YBP, 1 | A E | φ 2 |
| 6 | EXCHANGE RB⇌P2 | YBP, 2 | A F | φ 2 |
| 6 | EXCHANGE P1⇌P2 | TCP | 3 8 | φ 2 |
| 6 | CONVERT DECIM. ←BINAR. | CVB | 3 8 | φ 1 |
| 6 | SEND P.U. COMM. ACCORD. TO P1 | STIO, 1 | A φ | M φ |
| 6 | SEND P.U. COMM. ACCORD. TO P2 | STIO, 2 | A 1 | M φ |
| 6 | LIGHT "ERROR" LAMP | ON KBE | E 4 | φ φ |
| 6 | AND. CONST. K (.)POS. P of Rφ | NI | 2 φ | P K |
| 6 | AND. CONST. K (.)POS. P of RC | NIC | 2 8 | P K |
| 6 | OR. CONST. K (+)Pos. P of RO | OI | 2 9 | P K |
| 6 | OPSR to PSR and execute | YPS | 3 8 | φ 9 |

| | | | MACHINE CODE | |
|---|---|---|---|---|
| FORMAT | DESCRIPTION | SYMB.CODE | 1st BYTE | 2nd 3rd & 4th |
| 7 | COND. DIR. JUMP. F. LONG | BD | 7 φ | E LD |
| 7 | JUMP ON COND. CHECK. F. LONG | BDC | F 00CC | E LD |
| 7 | LOAD 'P1' DIR. F. LONG | TLD, 1 | F 8 | E LD |
| 7 | LOAD 'P2' DIR. F. LONG | TLD, 2 | F 9 | E LD |
| 7 | ACTIVATE M.C. PROGR. | LAC | A B | E LD |

The address of the first operand R1 or of the second operand R2 is contained in the register indicated in the instruction (direct addressing), if the corresponding bit X1 or X2, respectively, is at zero. If the bit is at one level, the corresponding register addresses a memory zone in which the address of the operand is recorded.

L1 and L2 indicate the number of bytes less one of the operands addressed by the pointers P1 and P2.

MD is the value less one of the constant which is to be added to, or subtracted from, the value of the pointers P1 and P2.

E is the reference number which contains the address to be forced into P1 or P2. I indicates the immediate operand equivalent to the byte to be used in the instruction. SD indicates the value which must be added to, or subtracted from, the program addresser to obtain the jump address (SKIP).

2. Visual display of the instruction present in the registers 362 and 363.

The DBG program recorded in the ROM 2 will now be described with reference to Table L and to FIGS. 11a to 11g.

The DBG program recorded in the ROM 2 is divided into a plurality of functional blocks B100, B0, B1,B2,B6 the first of which B100 is common to all the others; the following ones B0,B1,B2,B6 on the other hand, are callable selectively by the bars S0,S1,S2,S6 indicated collectively by the references 102 in FIG. 1b. 1b.

It is to be made clear that all the bars 102 (S0-S6) are used also when the key 100 is in the NORMAL position. In this case they each assume a special significance assigned to them by the program in course of execution. For example, the bars S0 and S6 may be interpreted by the program as normal end of introduction of data from the keyboard 5 and resumption of the processing using these data. The remaining bars S1-S5, in addition to concluding the normal introduction of data, add to these blocks of data supplementary information determined by the programmer.

Of course, the operation of the processer when the key 100 is in the NORMAL position is not described, but, on the other hand, the operations associated with the bars 102 when the key 100 is in the Dbg position will be described.

A description of the initial block B100 of the program common to all the other programs will now be given. this functional block preserves other parameters of the interrupted program which are not contained in OPSR-301 and moreover prepares the visual display of the address and of the instruction which was to be executed at the instant of the interrupt.

Figure 11A:
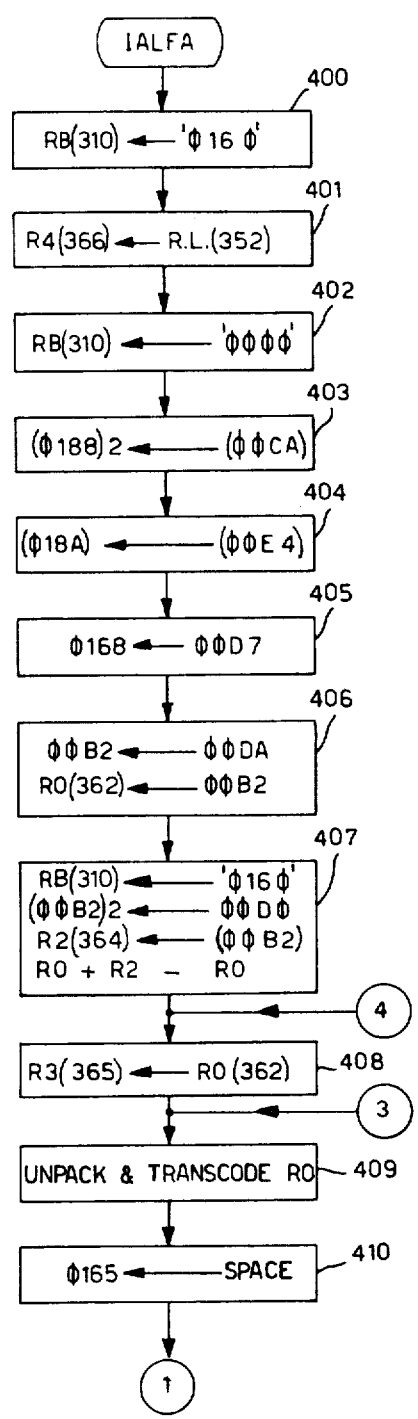

More particularly, by means of the first two instructions TLD,2 and YPB,2 the register RB-310 is brought to φ16φ (block 400 of FIG. 11a). The contents of the working register 352 are then transferred to the register 366 by means of an instruction LAX (block 410). It is to be noted that the register 366 is addressed by the instruction LAX as the fourth register (identified by the last semibyte of the instruction) starting from the base register RB-310 of PSR-300 which contains the address φ16φ.

The base register RB-310 is zeroized by means of the instructions TL and YBP, 1 (Block 402). Thereafter, by means of the instructions TLD,1, TLD,2 and MVC, there are preserved two bytes of the condition register RC-359 in cells ϕ188 and ϕ189 (block 403), which, as has been said, contain the conditions entered from outside by the operator before the DBG interrupt. These bytes will be put back into the RC-359 by the DRC program in the event of the interrupted program being resumed after the execution of the DBG program.

TABLE L

DEBUGGING PROGRAMME

| ROM 2 ADDRESS | SYMBOLIC CODE | INSTRUCTION | REMARK |
|---|---|---|---|
| 17 ϕϕ | TLD, 2 | F 9 ϕ ϕ ϕ 1 6 ϕ | LOAD ϕ16ϕ into P2 |
| ϕ4 | YBP, 2 | A F ϕ 2 | EXCHANGE P2 with RB (RB = ϕ16ϕ) |
| ϕ6 | LAX | 6 C B 4 | DEPOSIT RL IN R4 |
| ϕ8 | TL | B 8 ϕ ϕ | ZEROIZE POINTER 1 |
| ϕA | YBP, 1 | A F ϕ 2 | EXCHANGE P1 WITH RB (RB = ϕϕϕϕ) |
| ϕC | TLD, 1 | F 8 ϕ ϕ ϕ 1 8 8 | LOAD ϕ188 INTO P1 |
| 1ϕ | TLD, 2 | F 9 ϕ ϕ ϕϕ C A | LOAD ϕϕCA INTO P2 |
| 14 | MVC | C 5 ϕ 1 | TRANSFER 2 BYTES FROM ϕϕCA TO ϕ188 |
| 16 | AP, 1 | 3 C ϕ 1 | ADD 2 TO P1 (P1 = ϕ18A) |
| 18 | AP, 2 | 3 D 1 9 | ADD 1A to P2 (P2 = ϕϕE4) |
| 1A | MVC | C 5 ϕ ϕ | TRANSF. 1 BYTE FROM ϕϕE4 TO ϕ18A (RESERVE BAR ENABLE BYTE) |
| 1C | SP, 2 | 3 F ϕ C | SUBTRACT ϕD FROM P2 (P2 = ϕϕD7) |
| 1E | SP, 1 | 3 E 2 1 | SUBTRACT 22 FROM P1 (P1 = ϕ168) |
| 2ϕ | MVC | C 5 ϕ ϕ | TRANSF. 1 BYTE FROM ϕϕD7 TO ϕ168 (PRESERVE c1) |
| 22 | AP, 2 | 3 D ϕ 2 | ADD ϕ3 TO P2 (P2 = ϕϕDA) |
| 24 | SP, 1 | 3 E B 5 | SUBTRACT B6 FROM P1 (P1 = ϕϕB2) |
| 26 | MVC | C 5 ϕ 1 | TRANSF. 2 BYTES FROM ϕϕDA TO ϕϕB2 (PRESERVE IP OF OPSR IN P1 OF PSR) |
| 17 28 | AP, 2 | 3 D 8 5 | ADD 86 to P2 (P2 = ϕ16ϕ) |
| 2A | LPD | 6 C 20 | TRANSF. P1 TO R0 (R0= IP of OPSR) |
| 2C | YBP, 2 | A F ϕ 2 | EXCHANGE P2 WITH RB (RB = ϕ16ϕ) |
| 2E | SP, 2 | 3 F 8 F | SUBTRACE 9ϕ FROM P2 (P2 = ϕϕDϕ) |
| 30 | TLD, 1 | F 8 ϕ ϕ ϕ ϕ B 2 | LOAD ϕϕB2 INTO P1 |
| 34 | MVC | C 5 ϕ 1 | TRANSF. 2 BYTES FROM ϕϕD ϕ TO ϕϕB2 (RB OF OPSR IN P1 OF PSR) |
| 36 | AP, 2 | 3 D 8 F | ADD 9ϕ TO P2 (P2 = ϕ16ϕ) |
| 38 | LPD, 1 | 6 C 2 2 | TRANSF. P1 to R2 (RB OF OPSR IN R2) |
| 3A | SR | ϕ 4 ϕ 2 | R0←R2 - R0 (RELATIVE ADDRESS OF OPSR IN R0) |
| 3C | LR | ϕ 8 3 ϕ | TRANSF. R0 TO R3 |
| 3E | TL, 1 | B 8 ϕ ϕ | ZEROIZE P1 |
| 40 | TLD, 2 | F 9 ϕ ϕ ϕ ϕ ϕ 5 | LOAD ϕϕ5 INTO P2 |
| 44 | YTX | D 6 7 3 | UNPACK AND TRANSCODE RELATIVE ADDRESS OF OPSR) FROM ϕ165 to ϕ16ϕ |
| 46 | MVI, 2 | C 7 2 ϕ | FORCE ϕINTO ϕ165 |
| 48 | YBP, 1 | A E ϕ 2 | EXCHANGE RB WITH P1 (RB = ϕϕϕϕ) |
| 4A | AP, 1 | 3 C ϕ0 5 | ADD ϕ6 TO P1 (P1 ϕ166) |
| 17 4C | AP, 2 | 3 D D ϕ | ADD D1 to P2 (P2 = ϕϕD6) |
| 4E | YTX | D 6 1 0 | UNPACK AND TRANSCODE (CP OF OPSR IN ϕ166) FROM ϕϕD6 to ϕ166 |
| 5ϕ | KES | A 7 4 7 | ENABLE BARS: S0, S1, S2, S6 (0100 0111) |
| 52 | SP, 1 | 3 E B 1 | SUBTRACT B2 FROM P (P1 = ϕϕB4) |
| 54 | SP, 2 | 3 F ϕ 5 | SUBTRACT ϕ6 FROM P2 (P2 = ϕϕDϕ) |
| 56 | MVC | C 5 ϕ 1 | TRANSF. 2 BYTES FROM ϕϕDϕ TO ϕϕB4 (RB of OPSR IN P2 of PS) |
| 58 | AP, 1 | 3 C 9 B | ADD 9C TO P1 (P1 = ϕ15ϕ) |
| 5A | YBP, 1 | A E ϕ 2 | EXCHANGE RB WITH P1 (RB = ϕ15ϕ) |
| 5C | LPD, 2 | 6 C 3 4 | TRANSFER P2 TO R4 (RB OF OPSR IN R2 FROM RB = ϕ160) |
| 5E | LR | ϕ 814 | TRANSF. R2 TO ϕ158 (RB OF OPSR IN ϕ158) |
| 6ϕ | AR | C ϕ 4 5 | R2←R2+R3 (R2 = ABSOLUTE ADDRESS OF OPSR) |
| 62 | LR | ϕ 8 ϕ 4 | TRANSF. R2 TO ϕ15ϕ |
| 64 | TRD | 6 C 1 4 | TRANSF. R2 TO P2 (P2 CONTAINS ABSOLUTE ADDRESS OF OPSR) |
| 17 66 | TL | B 8 ϕ ϕ | ZEROIZE P1 |

TABLE L-continued

DEBUGGING PROGRAMME

| ROM 2 ADDRESS | SYMBOLIC CODE | INSTRUCTION | REMARK |
|---|---|---|---|
| 68 | YBP, 1 | A E φ 2 | EXCHANGE P1 WITH RB (RB = φφφ) |
| 6A | AP, 1 | 3 C 1 B | ADD 1 C TO P1 (P1 = φ16C) |
| 6C | MVC | C 5 φ 3 | TRANSFER 4 BYTES (UNEXECUTED OPSR INSTRUCTION) TO φ16C |
| 6E | TLD, 2 | F 9 φ φ φ 1 6 8 | LOAD φ168 INTO P2 |
| 72 | TCP | 3 8 φ 2 | EXCHANGE P1 WITH P2 (P1 = φ168 AND P2 = φ16C) |
| 74 | YTX | D 6 7 3 | UNPACK AND TRANSCODE (UNEXECUTED OPSR INSTRUCTON) FROM φ16C TO φ168 |
| 76 | SP, 1 | 3 E φ 1 | SUBTRACT φ2 FROM P1 (P1 = φ166) |
| 78 | SP, 2 | 3 F φ 4 | SUBTRACT φ5 FROM P2 (P2 = φ167) |
| 7A | MVC | C 5 φ φ | TRANSFER 1 BYTE FROM φ167 TO φ166 (2nd SEMI-BYTE OF CP IN φ166) |
| 7C | MVI | C 7 2 φ | FORCE φ INTO φ167 |
| 7E | SP, 2 | 3 F φ 6 | SUBTRACT φ7 FROM P2 (P2 = φ16φ) |
| 8φ | YBP, 2 | A F φ2 | EXCHANGE RB WITH P2 (RB = φ16φ) |
| 82 | TLD, 1 | F 8 φ φ φ 1 φ | FORCE φφ1φ INTO P1 (P1 φφ1φ) |
| 17 86 | YOP | 6 E 7 F | DISPLAY VISUALITY INSTRUCTION TO BE EXECUTED OF OPSR FOR 16 BYTES ADDRESSED BY P1 AND INTRODUCE DATA FROM KEYBOARD FOR 8 BYTES ADRESSED BY P2 PUT CC = 0 IF S0, CC=1 IF S1 CC=2 IF S6, CC=3 IF S2 OR RUN |
| 88 | BDC | F φ φ φ 1 7 A E | JUMP TO ADDRESS 17AE IF CC = φφ |
| 8C | BDC | F 1 φ φ 1 7 C 4 | JUMP TO ADDRESS 17C4 IF CC = φ1 |
| 90 | BDC | F 2φ φ 1 7 EE | JUMP TO ADDRESS 17EE IF CC = φ2 |
| 94 | YBP, 2 | A F φ 2 | EXCHANGE RB WITH P2 (RB = φφφ) |
| 96 | NIC | 2 8 9 D | AND BETWEEN (1101) AND SEMI-BYTE IN POSN. 9 OF RC (BAR CODE ENTERED) PUT CC = 0 IF S2 |
| 98 | Fφ | 6 8 φ 4 | IF CC = 0, SKIP |
| 9A | BD | 7 φ φ φ 1 8 φ C | JUMP TO 'RUN' PROGRAM - ADDRESS 18φC PROGRAM FOR INTRODUCTION FROM M.C. BAR S2. |
| 17 9E | TLD, 1 | F 8 φ φ 1 8 C | FORCE φ18C INTO P1 |
| A2 | SP, 2 | 3 F p 1 | SUBTRACT 92 FROM P2 (P2 = φφBE) |
| A4 | MVC | C 5 φ 1 | PRESERVE 11 IN REGISTER 367 |
| A6 | AP, 2 | 3 D 8 1 | ADD 82 to P2 (P2 = φ15φ) |
| A8 | STI0, 2 | A F φ φ | COMPILE PARAMETERS OF TRANSFER PERIPHERAL - RAM 1 TRANSFER FROM M.C. ACCORD-ING TO P2 |
| AA | LAC | A B 8 8 φ 1 5 φ | START PGR. ADDRESS φ15φ RAM. READ-MEMORY PROGRAM BAR S0. |
| AE | AP, 1 | 3 C A F | ADD Bφ TO P1 (P1 = φφC7) |
| Bφ | YBP, 1 | A E φ 2 | EXCHANGE P1 WITH RB (RB = φφC7) |
| B2 | NI | 2 φ φ B | (BSD) (BSD) AND ('φB') |
| B4 | YBP, 1 | A E φ 2 | EXCHANGE P1 WITH RB (RB = φ16φ) |
| B6 | SP, 1 | 3 E A F | SUBTRACT BφFROM P1 (P1 = φφ1φ) |
| B8 | CBI, 1 | 8 C 2 φ | JUMP TO S1 IF INTRODUCED |
| BA | FNO | 6 8 8 8 | ADDRESS FROM KEYBOARD |
| 17 BC | ARI | 5 φ 3 4 | REG. (365)←REG. (365)+4 |
| BE | LR | φ 8 φ 3 | REG. (362)←REG. (365) |
| Cφ | BD | 7 φ φ φ 1 7 3 E | JUMP TO ADDRESS 173E STOP RESERVATION PROGRAM BAR S1 |
| C4 | PK | 5 1 φ φ | PACK REG (364) AND TRANSCODE TRANSF. TO REG. (362) |

TABLE L-continued

DEBUGGING PROGRAMME

| ROM 2 ADDRESS | SYMBOLIC CODE | INSTRUCTION | REMARK |
|---|---|---|---|
| C6 | NIC | 2 8 9 F | ADDRESS INTRODUCED FROM KEYBOARD (0101) AND (POS. 9 OF RC) |
| C8 | BD | F φ φ φ 1 7 3 C | IF AND = 0 JUMP TO 173C |
| CC | TLD, 2 | F 9 φ φ φ 1 5 8 | FORCE φ158 INTO P2 |
| Dφ | YBP, 2 | A F φ 2 | EXCHANGE P2 WITH RB (RB = φ158) |
| D2 | AR | C φ φ 1 | RESERVED ABSOLUTE ADDRESS TO 361 |
| D4 | CVB | 3 8 φ 1 | 361 DEC.←(361 BIN.) |
| D6 | SP, 2 | 3 F C 1 | SUBTRACT C2 FROM P2 (P2 = φφ9E) |
| D8 | TLD, 1 | F 8 φ φ φ φ C φ | FORCE Cφ INTO P1 |
| DC | YBP, 1 | A F φ 2 | EXCHANGE RB WITH P1 (RB φ φ C φ) |
| Eφ | TLD, 1 | F 8 φ φ φ φ 2 C | FORCE φφ2C INTO P1 |
| E4 | MVC | C 5 0 1 | TRANSF. 1st AND 2nd BYTE OF 361 To 350 |
| 18 φ4 | SP, 2 | 3 F 1 3 | SUBTRACT '14' FROM P2 (P2 = φ16φ) |
| φ6 | YBP, 2 | A F φ 2 | EXCHANGE RB WITH P2 (RB = φ16φ) |
| φ8 | BD | 7 φ φ φ 1 7 B C | JUMP TO 17BC "STEP-BY-STEP EXECUTION" PROGRAM - RUN KEY |
| φC | TLD, 2 | F 9 φ φ φ 1 8 8 | FORCE P2 TO 'φ188' |
| 1φ | TLD, 1 | F 8 0 0 0 0 C A | FORCE P1 TO 'φφCA' |
| 14 | MVC | C 5 φ 1 | RESTORE 2 BYTES TO R.C. 359 |
| 16 | AP, 2 | 3 D φ 1 | ADD 2 TO P2 (P2 = φ18A) |
| 18 | AP, 1 | 3 C 1 9 | ADD 1A TO P1 (P1 = φφE4) |
| 1A | MVC | C 5 φ φ | RESTORE 'BAR ENABLE' BYTE (370) |
| 1C | SP, 2 | 3 F φ 9 | SUBTRACT 'φA' FROM P2 (P2 = φ18φ) |
| 1E | SP, 1 | 3 E 3 B | SUBTRACT '3C' FROM P1 (P1 = φφA8) |
| 2φ | MVC | C 5 φ 7 | RESTORE 8 BYTES OF REG (366) TO WORKING REG. 352 |
| 22 | YPS | 3 8 φ 9 | RESTORE 10 BYTES OF OPSR 301 TO PSR 300 AND ACTIVATE PROGRAM UNDER TEST. |

It is to be noted that the instruction MVC transfers starting from the cell addressed by the sum of the contents of the register P2-312 and RB-310 a field of length L+1 from the cell addressed by the sum of the contents of RB-310 and P1-311; L is the number contained in the second byte of the instruction.

Then, by means of the instructions AP1, AP2, and MVC, the register AB-370 (enable bars) is transferred to the cell φ18A (block 404).

By means of the instructions SP2, SP1 and MVC, the register CI-324 is transferred to the cell φ168 (block 405).

By means of the instructions SP2, SP1, MVC there are transferred to the register P1-311 of PSR-300 the two bytes which indicate the absolute address of reentry of the interrupted program (register IR-327). Thereafter, by means of the instructions AP2 and LPD, this address is transferred from P1-311 to the register 362 (block 406).

By means of the instructions YBP,2, SP2, TLD,1 and MVC the register RB-310 is brought to the value φ16φ and the base register RB-320 of OPSR-301 is transferred to the register P1-311 of PSR-300. Then, the register Rb-320 is transferred to the register 364 by means of the instructions AP2 and LPD1.

The differences between the contents of the registers 354 and 362 is formed by means of the instruction SR and the result is put into the register 362 (block 407). This difference is then transferred to the register 363 by means of an instruction LR (block 408). By means of the operations just described there is recorded in the registers 360 and 363 the relative address in hexadecimal code of the instruction to be executed of the interrupted program.

By means of the instructions TL1 and TL2, the registers P1-311 and P2-312 are respectively positioned at the values φφφφ and φφφ5 which, added to the register RB-310, address the cells φ16φ and φ165, respectively.

An instruction YTX is then executed, which unpacks and transcodes four bytes (specified by the last semi-byte of the instruction) from the register P2-312 and transfers them in eight bytes (specified by the third semibyte of the instruction) addressed by the register P1-311 by eliminating the non-significant zeros (block 409).

There is then executed an instruction MVI,2 which is addressed by P2-312 and writes a "space" CRT in the cell φ165 (block 410).

Figure 11B:
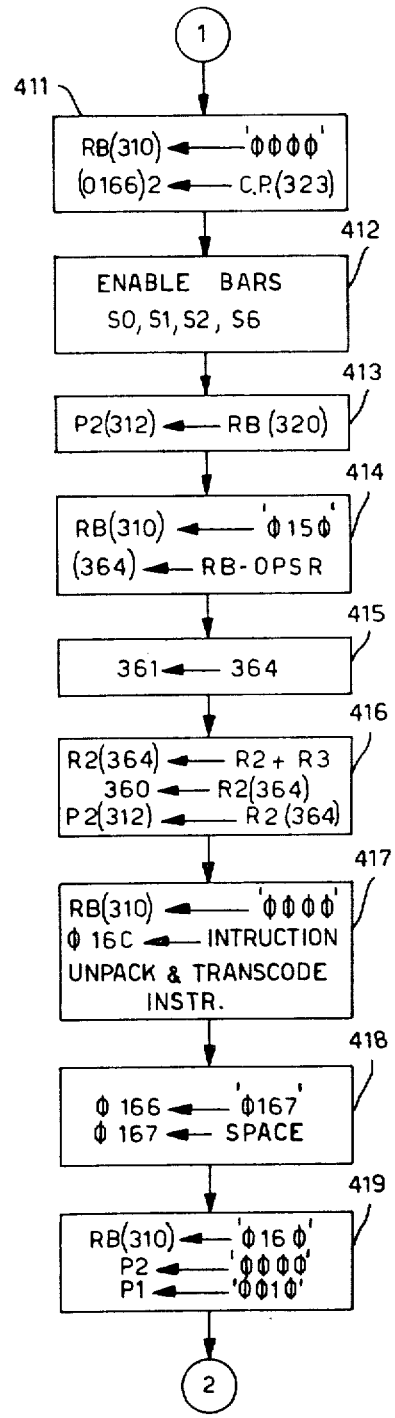

By means of the instructions YPB,1, AP1 and AP2 and YTX the register RB-310 is zeroized and the byte CP-313 is read from the RAM 1, unpacked, transcoded and transferred to the cells 0i66 and 0167 (block 411 of FIG. 11b).

Then there is executed the instruction KES, which compiles in the cell φφE4 the code expressed by the second byte. This code is 01000111 and each bit is associated with a corresponding bar 102 (block 412). More particularly, this code is interpreted as a code for enabling the bars S0, S1, S2 and S6 by the instruction YOP to check whether the bars actuated by the programmer have been enabled or not.

By means of the instructions SP1, SP2 and MVC, the register RB-320 of OPSR-301 is transferred to the register P2-312 of PSR (block 413). RB-320 of OPSR-301 is transferred to the register 364 by means of the instructions AP1, YBP1, LPD2 (block 414). The contents of the register 364 are then transferred to the register 361 (block 415).

The absolute address of the instruction to be executed of the interrupted program is computed in the register 364 by means of the instructions LR and AR (block 416). It is to be noted that the contents of the register 365 were the relative address of the interrupted program. The absolute address is then transferred to the register 360 and to the register P2-312 by means of the instructions LR and TRD (block 416). The register RB-310 is zeroized by means of the instructions TL and YBP1 and the contents of the cell addressed by P2-312 are transferred by means of the instructions AP1 and MVC to the second half of the register 363. These contents are unpacked and transcoded by means of the instructions TLD2, TCP and YTX, so that in the register 363 there is recorded the instruction which was to be executed by the interrupted program in unpacked code (block 417). By means of the instructions SP1, SP2 and MVC, the second semibyte of the byte CP, recorded in the cell $\phi 167$, is shifted to the left by one cell, so that this semibyte is now recorded in both the cells $\phi 166$ and $\phi 167$. Thereafter, a space CRT is written in the cell $\phi 167$ by means of the instruction MVI (block 418).

To sum up, the operations performed from block 406 to block 418 have prearranged in the registers 362 and 363, in unpacked code, the relative address of the instruction to be executed of the interrupted program, a space CRT, the second semibyte of the byte CP (which comprises, inter alia, the condition code), a space CRT and the hexadecimal code of the instruction contained at this address. An example of preparation of the registers 362 and 363 will be described with reference to FIGS. 12a – 12f.

Let it be assumed that the program has been interrupted at the absolute address 2423 expressed in packed hexadecimal code, which is transferred to the register 362 (block 406) and is represented therein in packed form as shown in FIG. 12, where the last semibyte (character c) represents the positive sign. Let it be assumed, moreover, that the contents of RB-320 of OPSR-301 are $12\phi\phi$, these contents are transferred to the register 364 and 362 and the result is stored in the register 364 (block 407) and are represented in the packed form as shown in FIG. 12a. The difference is now formed between the two registers 364 and 362 and the result is stored in the register 362 as is shown in FIG. 12b (block 408). The contents of the register 362 are then unpacked (block 409) and then occupy the first five bytes of the register 362 (FIG. 12c). A space CRT is then inserted in the cell 165 (block 410) and the byte CP (323) is inserted in unpacked form in the cells 0166 and 0167. It is assumed that this byte has the value 4A represented in FIG. 12e. Thereafter, the instruction which was to be executed by the program interrupted is read and is transferred in packed form to the second half of the register 363. Let it be assumed that the instruction has the code F9000005, that is it is an instruction TLD, 2 by means of which the number 5 is loaded into the pointer P2-312 (FIG. 12b). This instruction is thereupon rewritten in the register 363 in unpacked form (FIG. 12c and block 417). The byte CP is then shifted to the left by one place and a space CRT is written in the cell $\phi 167$ (block 418).

Figure 12A:
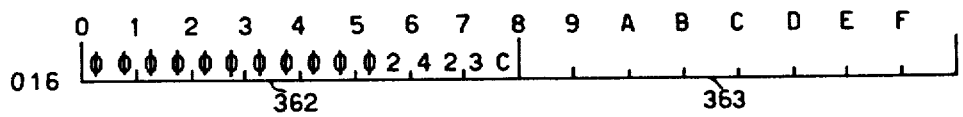
FIGS. 12a to 12f show an example of visual display of an instruction.
Figure 12A:
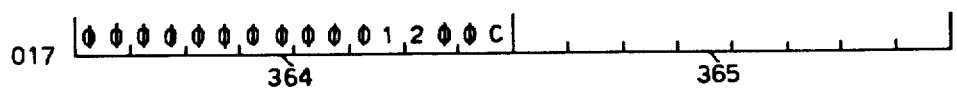
Figure 12B:
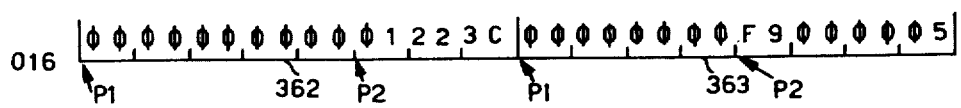
Figure 12C:
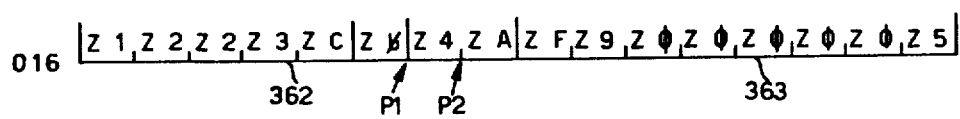
Figure 12D:
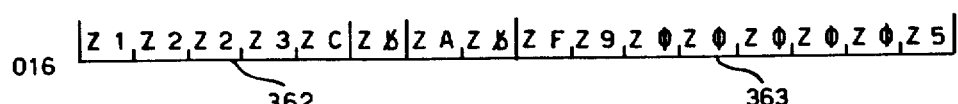
Figure 12E:
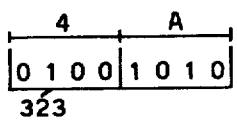

In brief, the configuration of the two registers 362 and 363 is as shown in FIG. 12d.

Figure 12F:
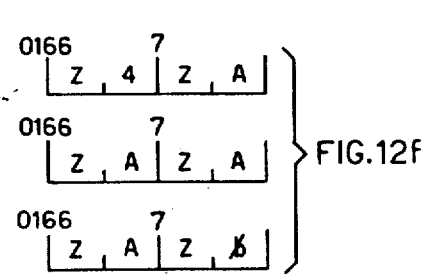

FIG. 12f shows in detail the sequence of the configurations of the cells $\phi 166$ and $\phi 167$ in the passage from the configuration of FIG. 12c to that of FIG. 12d.

The configuration prearranged in the registers 363 and 364 will then be visually displayed, as will be seen better hereinafter.

The description of the DBG program will now be resumed (FIG. 11b).

By means of the instructions SP2, YBP, 2 and TLD, 1, the register RB-310 is brought to $\phi 16\phi$ and the register P1-311 is brought to $\phi\phi 1\phi$ (block 419 of FIG. 11b). After this, an instruction YOP is executed (blocks 420 and 421 of FIG. 11c), which sends to the display 103 the characters recorded in the registers 362 and 363 represented and transfers the data entered by the operator to the register 364 and positions the condition code according to the bar 102 actuated by the operator.

The instruction YOP can be regarded as being divided substantially into three functional blocks: a first block provides for sending to the visual display unit 6 the data compiled by the preceding instructions in the registers 362 and 363; a second block provides for introducing the data entered on the keyboard into the register 364 indicated by the pointer P1-311; and a third block which provides for compiling the condition code contained in the program conditions byte 313 and the ninth semibyte of the conditions register 359 according to the bar which has been actuated.

The first functional block is a microprogram which uses the sum of the pointer P2-312 and the base register RB-310 to address the first byte of the register 362 in order to initiate the reading from the RAM 1 of the data contained in the sixteen bytes following the one addressed.

By means of suitable microinstructions, this microprogram transfers the data directly to the selected peripheral units (through the node NC and the channel logic 45).

In this case, through the medium of the instruction YOP, the channel logic 45 has selected the display 6 (FIG. 1b). As a result the data contained in the two registers 362 and 363 are visually displayed.

The manner in which the channel logic 45 selects the display 6 has been mentioned hereinbefore and is moreover stated in the said patent application Ser. No. 454,973. Furthermore, this selection may be effected in any known manner; it is therefore not described in detail, because it does not constitute an object of the present invention.

The second functional block of the instruction YOP is a microprogram which uses the sum of the pointer P1-311 and RB-310 to address the initial cell of the register 364 and deposit in the eight following bytes the data entered on the keyboard. This microprogram utilizes suitable microinstructions (not given in the Tables) which enable data to be exchanged with the selected peripheral unit. These data are introduced through the gate 70 in FIG. 2b into the node ND and from this they are transferred (by means of the node NB) to the register B14 (FIG. 8). The introduction of the data from the keyboard 5 into the register B14 is controlled by a microinstruction not given in the Tables, which generates the commands CZ03, CA02, CT06, CT07 and the selection commands CO32 to CO39, which act respectively on the gates 70, 71, 72, 73 and on the selection circuits given in FIG. 7, as a result of which the characters are transferred from the keyboard 5 to the register B14. More particularly, it is made clear that this transfer takes place in parallel as regards bits and in series as regards characters, that is the characters are transferred one at a time.

3. Bar recognition.

The third functional block will now be described in detail with reference to the microprogram given in Table M and to the flow chart of FIG. 13.

Figure 13:
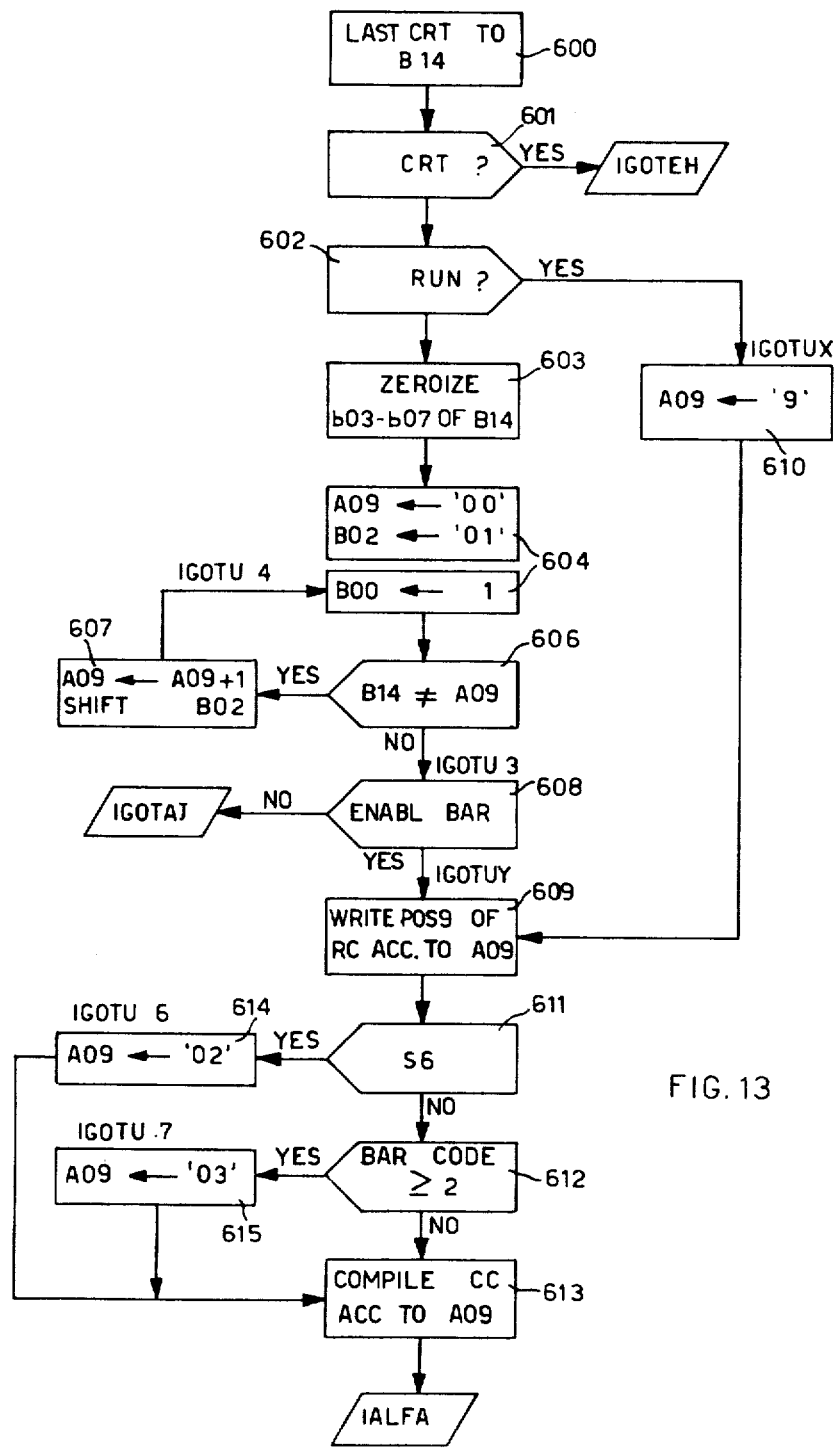
FIG. 13 shows the flow chart of the bar identification microprogram.

As has been stated, the last character coming from the keyboard 5 has been stored in the register B14 through the agency of the second functional block (block 600 of FIG. 13).

Through the medium of the microinstruction SDIB, the CRT contained in B14 is exchanged with that contained in the switching elements 40.

There are then sensed the bits 03 to 07 of the last CRT introduced by means of the instructions SADO and SADI which operate on the switching elements DO3 to DO7 (logical decision 601).

It is to be noted that if the last introduction from the keyboard is a bar of the group 102 or the RUN key of the console 7 into the register B14, the CRT recorded adopts the following configuration: 10011XXX. The bits XXX indicate in binary the number from 0 to 6 associated with the bars 102, while the number 7 is associated with the RUN key.

If, on the other hand, the last character introduced is an alpha numeric code, at least one of the bits from b03 to b07 assumes a configuration different from 10011, so that a jump to the address IGOTEH is executed. The microprogram which begins at IGOTEH is the one which effects the introduction of the characters of the register 364 of the RAM 1, that is it carries out the second functional block hereinbefore mentioned.

If the bits b03-b07 have the configuration 10011, the RUN key, to which there corresponds 10011111, is recognized by means of the microinstructions CRTA, ORE and SADI, which check by means of a mask whether the contents of the register B14 are equal to 10011111 (logical decision 602).

TABLE M

| SYMB. ADDRESS | MICROINSTRN. | CODE | 1st OPERAND | 2nd OPERAND |
|---|---|---|---|---|
| IGOTEO | B E 9 7 | SDIB | B14 | |
| | 2 7 A 2 | SADO | D07 | IGOTEH |
| | 3 6 A 2 | SADI | D06 | IGOTEH |
| | 3 5 A 2 | SADI | D05 | IGOTEH |
| | 8 4 A 2 | SADO | D04 | IGOTEH |
| | 2 3 A 2 | SADO | D03 | IGOTEH |
| | B E 9 7 | SDIB | B14 | |
| | 8 9 9 F | CRTA | A09 | C9F |
| | 6 9 E 3 | ORE | A09 | B14 |
| | 3 1 F 4 | SADI | D01 | IGOTUX |
| | 8907 | CRTA | A09 | C07 |
| | 6 9 E 4 | ANDE | A09 | B14 |
| | 8 9 0 0 | CRTA | A09 | C00 |
| | 9 2 0 1 | CRTB | B02 | C01 |
| IGOTU4 | B 8 6 6 | SEDI | D00 | |
| | 6 9 E 2 | SOT | A09 | B14 |
| | 3 1 D 2 | SADI | D01 | IGOTU3 |
| | A 9 4 9 | ICA | A09 | |
| | 0 8 D 8 | SHSB | B02 | |
| | 0 8 C C | SAI | IGOTU4 | |
| IGOTU3 | C 2 E 4 | MAD | A02 | CE4 |
| | 6 2 2 0 | AND | A02 | B02 |
| | 0 8 D 4 | SADI | D01 | IGOTAJ |
| IGOTUY | C 2 C B | MAD | A02 | CCB |
| | B 2 2 7 | AXAP | A02 | |
| | 5 9 2 C | TAB | A09 | B02 |
| | B 2 1 6 | ROTB | B02 | |
| | 6 2 2 E | ORA | A02 | B02 |
| | D 2 C B | AMD | A02 | CCB |
| | 9 2 0 6 | CRTB | B02 | C06 |
| | 6 9 2 3 | ORE | A09 | B02 |

TABLE M-continued

| SYMB ADDRESS | MICROINSTRN | CODE | 1st OPERAND | 2nd OPERAND |
|---|---|---|---|---|
| | 3 1 E E | SADI | D01 | IGOTU6 |
| | 9202 | CRTB | B02 | C02 |
| | B 8 6 6 | SEDI | D00 | |
| | 6 9 2 2 | SOT | A09 | B02 |
| | 3 0 E C | SADI | D00 | IGOTU7 |
| IGOTU8 | C 2 B 6 | MAD | A02 | CB6 |
| | 9 2 1 C | CRTB | B02 | C1C |
| | 6 2 2 4 | ANDB | A02 | B02 |
| | 6 9 2 E | ORA | A09 | B02 |
| | D 9 B 6 | AMD | A09 | CB6 |
| | 0 2 0 0 | SAI | IALFA | |
| IGOTU7 | 8 9 0 3 | CRTA | A09 | C03 |
| | 0 8 E 4 | SAI | IGOTU8 | |
| IGOTU6 | 8 9 0 2 | CRTA | A09 | C02 |
| | 0 8 E 4 | SAI | IGOTU8 | |
| IGOTUX | 0 9 0 9 | CRTA | A09 | C09 |
| | 0 8 D 5 | SAI | IGOTUY | |

If these contents are different, the CRT is unquestionably a bar of the group 102.

By means of the microinstruction CRTA and ANDB, the bits 03 to 07 of the register B14 are zeroized, while the bits 00–02 indicated by XXX, which give in binary the number associated with the bar 102 introduced, are not altered (block 603). Then, by means of the microinstructions CRTA and CRTB and SEDI, the operative registers A09 = $\phi\phi$ and B02 = $\phi$1 are prearranged and the switching element D00 is put to one. A check is made by means of the microinstructions SOT and SADI to see whether the contents of B14 are equal to the contents of A09 (logical decision 606). If the two registers have different contents, by means of the microinstructions ICA and SHSB the register A09 is incremented by one unit and the contents of the register B02 are shifted to the left by one place (block 607). Then by means of an unconditional jump SAI, a return is made to the block 604 and the cycle of the blocks 604, 606, 607 is repeated. This cycle is repeated a number of times corresponding to the serial number of the bar 102 entered.

If, for example, the bar S6 has been entered, the cycle is repeated seven times, and so on. It is to be noted that when the contents of the register B14 are equal to those of the register A09, the 1 bit initially recorded in the first place of the register B02 has been shifted to the left by as many places as there have been cycles effected. In the example given, the 1 bit is recorded in the seventh place of the register B02, that is the byte recorded in B02 is 0100 0000.

When B14 = A09, a check is made by means of the microinstructions MAD, AND and SADI whether the bar entered is enabled or not by the program (logical decision 608). As has been said hereinbefore, the DBG program has compiled the position $\phi\phi$E4 of the RAM 1 (register 370 of FIG. 9) with a bar enable byte in which the bits at 1 level identify the enabled bar.

More particularly, the bars S0, S1, S2, S6 have been enabled (block 412 of FIG. 11b), so that the byte 01000111 is recorded in the position $\phi\phi$E4 of the RAM 1.

A check is therefore made by means of the microinstruction AND to see whether a 1 bit is recorded in the position of the register 370 corresponding to the bar previously identified, that is a check is made to see whether the bar has been enabled. In the example given, 1 bit is recorded both in the sixth place of the register B02 and in the sixth place of the register 370.

On the other hand, in the event of the bar not having been enabled, a jump to the address IGOTAJ would have been made. At this address there is recorded the initial microinstruction of a microprogram which controls the operations following upon the actuation of a bar which is not enabled, for example the lighting of a lamp on the console 7 and the wait for a fresh introduction. Of course, this microprogram is not described, since it does not constitute an object of the present invention.

If the bar actuated by the operator has been enabled by the DBG program, the microinstruction MAD is executed and transfers the fifth byte of the conditions register RC-359, which is recorded in the cell $\phi\phi$CB, to the operative register AO2. As has been said, in this byte there are recorded starting from the right the semibytes of the eighth and ninth positions of RC-359 and the ninth position contains the code of the bar last introduced and previously also recorded in the cell $\phi$188 (register 365), as described with reference to the block 403 of FIG. 11a.

There is then executed a microinstruction AZAP, which puts the bits of position 9 of RC to zero.

By means of the microinstructions TAB and ROTB, there is transferred to the register BO2 the code of the actuated bar present in AO9 after exchanging the semibytes.

In the example considered (actuation of the bar S6), the byte 0000 0110 was present in the register AO9, so that now the byte 0110 0000 is recorded in the register BO2.

Through the microinstruction ORA, the OR is carried out between the register AO2 and the register BO2 and the result is transferred to the register AO2. In this way, in the first semibyte of the register AO2 there is recorded the binary code of the actuated bar and in the second semibyte there is recorded the unchanged contents of the eighth position of the RC-359.

Finally, by means of the microinstruction AMD, the binary code of the actuated bar is restored to the ninth position of RC-359, while the eighth position is rewritten unchanged. These operations are indicated briefly in block 609 of FIG. 13.

In the event of the key actuated not being a bar, but the RUN key, as has been said, a jump is effected to the address IGOTUX at which is written the character 0000 1001 in the register AO9 by means of a microinstruction CRTA (block 610). This character corresponds to the RUN key and, by means of an unconditional jump SAI to the address IGOTUY (block 609), the recording of the character 1001 in the ninth position of the RC-359 is carried out as already described for the bars. In each case, after the microinstruction AMD of the block 609, a check is made by means of the microinstructions CRTB and ORE as to whether the contents of the register AO9 are equal to the character 06 which identifies the bar S6 (logical decision 611).

If the comparison has a negative result, a check is made by means of the microinstructions CRTB, SEDI, SOT to see whether the contents of the register AO9 are greater than or equal to two, that is whether the bars S0, S1 have been actuated, or the remaining enabled bar S2 (logical decision 612).

Let it be assumed that the bar actuated is S0 or S1, so that the register AO9 contains the byte 0000 0000 or 0000 0001. By means of the microinstructions MAD, CRTB and ANDB the byte CP-313 is extracted from the address $\phi\phi$B6 and the two least significant bits corresponding to the condition code are zeroized. The byte CP modified in this way is then put into the register BO2.

Then, by means of the microinstructions ORA and AMB, the byte CP-313 is written in the cell $\phi\phi$B6, the two least significant bits of this byte containing 00 or 01 according to whether the bar actuated is S0 or S1. These operations are indicated in block 613.

If, on the other hand, a bar S6 has been actuated (logical decision 611) or the bar S2 (logical decision 612), a jump is made to the address IGOTU6 or the address IGOTU7, respectively. In both cases, the microinstruction CRTA is executed (blocks 614 and 615) and forces the character 0000 0010 or 0000 0011, respectively, into the register AO9. Then, in both cases, an unconditional jump is executed to the address IGOTU8, from which there are executed the microinstructions already described with reference to block 613.

After this, a jump is made to the address IALFA to carry out recognition of the following instruction through the interpreter microprogram, as explained hereinbefore.

To conclude, it has been seen how the third functional block of the instruction YOP compiles position nine of RC-359 with the code of the actuated bar, and how it positions the condition code at 00 if the bar S0 has been actuated, at 01 for the bar S1, at 02 for the bar S6 and at 03 for the bar S2 and the RUN key.

Figures 11C, 11D:
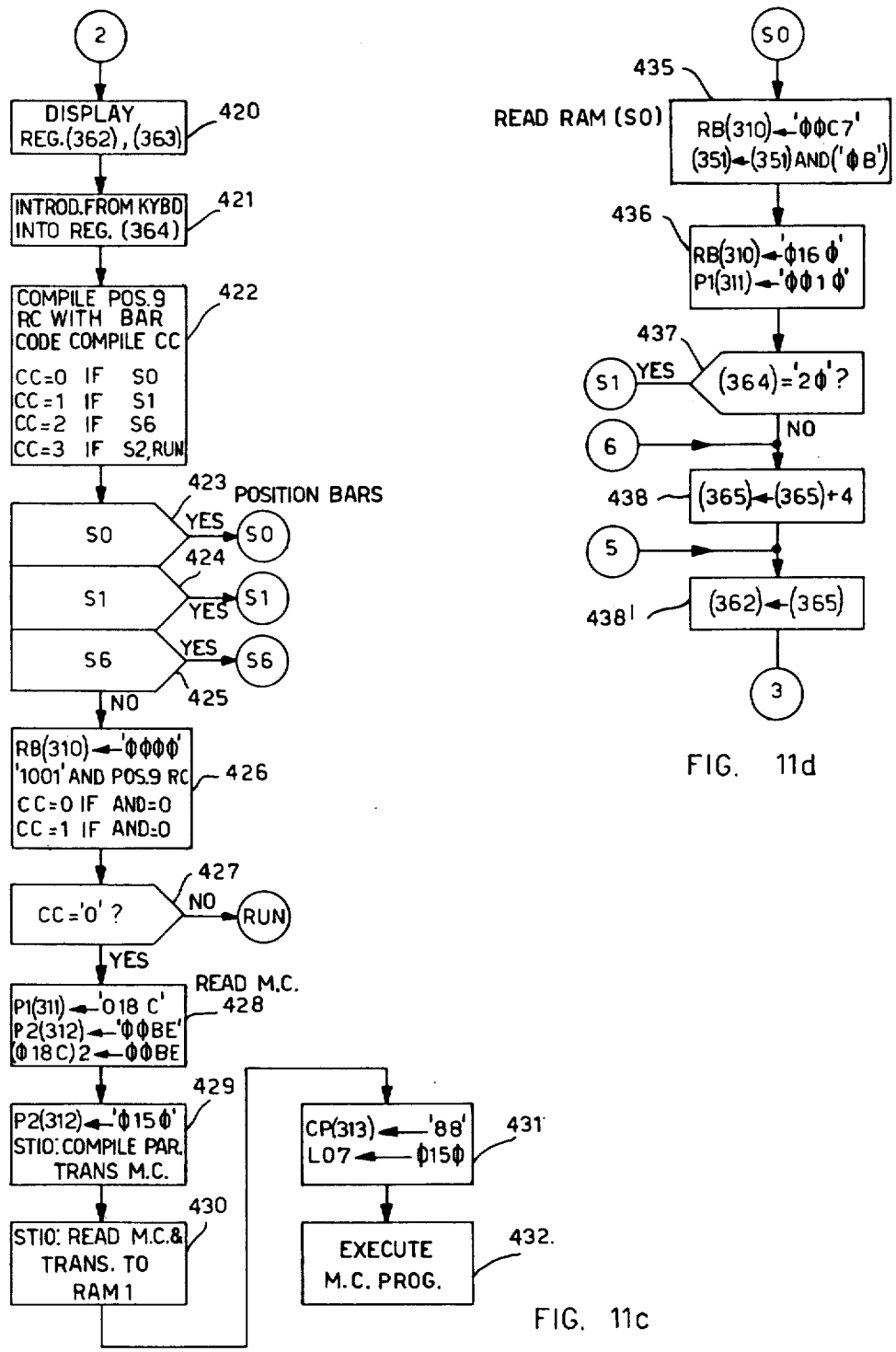

The operations of the three functional blocks of the instruction YOP which have just been described are indicated symbolically by the blocks 420, 421 and 422 of FIG. 11c.

The description of the DBG program will now be resumed with reference to Table L and FIG. 11c. After the execution of the instruction YOP, the condition code is analyzed by means of three conditional jump instructions DBG (logical decision 422, 423, 424).

The operations associated with the bars S0, S1 and S6 will now be touched upon briefly and will afterwards be explained in detail.

If the bar S0 has been actuated, we have CC=0, so that a jump is made to the address 17AE at which is recorded the memory reading program which visually displays the instruction following that already visually displayed by the instruction YOP, or, in the event of the operator having introduced a number on the keyboard, there is visually displayed the instruction recorded at the address expressed by the number entered increased by the contents of RB-310.

If a number has been entered on the keyboard and the bar S1 has been actuated (CC=1), a jump is executed to the address 17C4 at which is recorded the program reserving the stopping of the processing of the program to be corrected at the address of the RAM 1 expressed by the number entered increased by the contents of RB-320.

Finally, if a number to a hexadecimal base (D-F) of eight CRT has been entered and the bar S6 has been actuated (CC=3), a jump is executed to the address 17EE at which is recorded a program which records at the memory address visually displayed on the display 7 the instruction or data introduced on the keyboard and visually displays the contents of the field recorded keyboard the visually displayed address + 4, thus permitting writing in sequence in the RAM 1. In this way, it is possible to modify any instruction of the program to be corrected.

4. Program for introduction from M.C. (bar S2 and BLOCK PROGRAM B2)

Let us now consider the case where the bar S2 or the RUN key has been actuated.

Through the medium of an instruction YBP2 the base register RB-310 is zeroized and the contents of position 9 of the conditions register 359 are then compared with the constant 1101 by means of an instruction NIC. As has been said, in position 9 of the conditions register there has previously been compiled the binary code of the actuated bar. More particularly, the code associated with the RUN key is 1001. The instruction NIC puts the condition code to zero if the AND is equal to zero and, on the other hand, it puts it to 1 if the AND is different from zero. If 1001 (RUN key) is recorded in position 9 of the conditions register 359, the AND is different from zero, so that CC = 1; if, on the other hand, 0010 is recorded (bar S2), the AND is zero and CC = 0 (block 426 of FIG. 11c).

A check is made by means of the instruction FO (logical decision 427) to see whether CC=0. If CC=0, that is if the bar S2 has been actuated, the following instruction is skipped and the instruction TLD1 is proceeded with, which corresponds to the program of "introduction of DBG program from M.C. and immediate execution."

If, on the other hand, CC=1, a jump is made by means of the instruction BD to the address 18φC at which is recorded a program which resumes the execution of the interrupted program, that is it transfers the register 301-OPSR to the register 300-PSR.

In the case of actuation of the bar S2, the instruction TLD1 is executed, as has been said, and therefore the address φ18C is written in the register P1-311 and, by means of the instruction SP2, the address φφBE is forced into the register P2-312. Then, by means of the instruction MVC, two bytes are transferred from φφBE to the address φ18C. In this way, there is preserved in the second half of the register 367 (FIG. 9) the address of the interrupt program recorded in the register IPSR-302 (block 428 of FIG. 11c).

The instruction AP2 is then executed and forces the address φ15φ into the register P2-312. By means of the following instruction STIO, the contents of the magnetic card 9 (FIG. 1b) are transferred to the registers 360–367.

The instruction STIO may be considered as being divided into two functional blocks. The first block compiles in the register 360 eight CRT's which specify the selected peripheral unit, the type transfer (reading or writing), address of the RAM 1 at which the data are to be introduced or read, and the length of the field concerned in the transfer (a maximum of 64 bytes). These characters are used by the channel logic 45 to control the transfer (block 429).

The second functional block provides for the transfer and checking of the accuracy of the data received in known manner (block 430), using the pointer P2 as addresser of the RAM 1.

The instruction LAC is then executed, which starts the recorded M.C. program in the manner which will now be described with reference to Table N, which contains the microprogram associated with the phase BETA of the instruction LAC.

The first microinstruction of this microprogram is a microinstruction MAD which transfers to the register A14 the byte CP-313 recorded at the address φφB6. Then, by means of the microinstructions TADI and SADI, there is tested the bit 03 of CP-313, which, as has been seen (FIG. 9a), indicates whether the instruction is to be read in the RAM 1 or the ROM 2. This check is rendered necessary since the instruction LAC has a length of four bytes (Table K), so that it is read in two successive stages. During the first stage, as has been explained in the chapter relating to the interpreter, the first two bytes are transferred to the registers B14 and B15, that is the bytes AB and 88, respectively, and during the second stage the third and fourth bytes, that is φ1 and 5φ are read. In the case of a DBG program, the instruction LAC is recorded in the ROM 2, as a result of which it becomes necessary to load the register L02 with the program address recorded in the register L07 (FIG. 8). This is effected by means of the microinstructions SLL and SAB.

Finally, by means of two microinstructions ROMA and a microinstruction TAB, the third and fourth bytes of the instruction, that is φ150, are transferred to the register L11 (FIG. 8). In the event of the instruction LAC belonging to a program resident in the RAM 1, a jump would have been effected to the address IPSRO, so that the microinstructions MAIP and MBI addressed by the register L07 would have been executed. In each case, the address φ15φ is recorded in the register L11. The microinstruction SLL is then executed, whereby the address φ15φ is transferred to the program addresser L07. Then, by means of the microinstructions TBA and AMD, there is transferred to the register CP-313 the byte contained in the register B14, that is the byte 88 which, in hexadecimal-binary code, assumes the configuration 10001000. An unconditional jump is then executed to the address LALFA of the ROM 2, at which is recorded the initial microinstruction of the interpreter microprogram (FIG. 10a).

TABLE N

| SYMB. ADDRESS | MICROINSTRN. | CODE | 1st OPERAND | 2nd OPERAND |
|---|---|---|---|---|
| IPSRI | C E B 6 | MAD | A14 | C'B6' |
| | B E E 7 | TADI | A14 | |
| | 3 3 C 6 | SADI | D03 | IPSRO |
| | 4 7 2 F | SLL | L07 | L02 |
| | 5 2 2 F | SAB | A02 | B02 |
| | 7 B 0 0 | ROMA | A11 | |
| | 7 A 0 0 | ROMA | A10 | |
| | 5 A B C | TAB | A10 | B11 |
| | 1 5 C 8 | SAI | IPSR1 | |
| IPSRO | E 7 B D | MAIP | M07 | A11 |
| | E 7 B 7 | MBI | M07 | B11 |
| IPSR1 | 4 7 B F | SLL | L07 | L11 |
| | 1 5 C 9 | TBA | A14 | B15 |
| | D E B 6 | AMD | A14 | CB6 |
| | 0 2 0 0 | SAI | IALFA | |

The operations just described are indicated symbolically by the block 431 of FIG. 11c.

To sum up, at the end of the instruction LAC, we have the byte 10001000 recorded in the register CP-313 and the address φ15φ recorded in the program addresser.

This means that when the interpreter reaches the logical decision 202 (FIG. 10a) it will not execute the jump to IINTE (block 250), since the bit 05 of the byte CP (10001000) is at 0 level. When the interpreter then reaches the logical decision 204, it will find the bit 03 of CP at 1 level, so that it will carry out a reading from the RAM 1 (block 205) at the address indicated by the register L07, that is φ15φ.

At this address there has been recorded by the instruction STIO (block 431) the first instruction of the magnetic card program which, as has been said, is recorded in the registers 360 to 367. The latter are allocated to the cells of the RAM 1 between $\phi15\phi$ and $\phi18F$ (FIG. 9).

The magnetic card program is then executed like any other program resident in the RAM 1.

It is to be noted that by simply forcing the byte 88 into the register CP-313 it has been possible to change the support of the program in course of execution. In fact, a change has been made from reading from the ROM 2, in which the DBG programs are recorded, to reading from the RAM 1, in which is recorded the program recorded on the magnetic card 9.

The M.C. program may be any DBG program whatsoever (of a maximum length equal to 64 bytes) different from those present in the ROM 2. The programmer will therefore have at his disposal a set of M.C.'s on which are recorded as many DBG programs, which may include the programs supplied together with the system according to the invention or programs compiled by himself to solve special problems connected with the type of program used by him. For example, the debugging programs for programs oriented for accounting problems will be different from the debugging programs oriented for scientific problems.

It should be made clear that programs recorded on M.C.'s must be compiled in such manner as to provide at the end of their execution the parameters of the program which will have to be activated thereafter.

More particularly, three cases may arise:
 a. the program of reentry from DBG is the program previously interrupted (program under test);
 b. the program of reentry is another DBG program;
 c. the program of reentry is defined by the M.C. program or the M.C. program concludes the debugging work.

In cases (a) and (b), the M.C. program cannot be of a length of more than 48 bytes so as not to occupy the registers 366 and 367 which, as has been said, contain parameters which, together with those recorded in the register OPSR-301, are necessary for the resumption of the interrupted program. This program may be the program under test (case a) or the DBG program (case b).

Case (c) arises, for example, when the programmer has a need to use a DBG program of a length of more than 64 bytes.

In this case, the programmer must compile on a M.C. a program of a length of at the most 64 bytes which performs the following functions:
 1. it transfers a zone of memory RAM 1 defined by the programmer to an external support, for example a disc unit;
 2. it introduces a program recorded on an external support (magnetic cards or magnetic tape) into the area previously released;
 3. it loads the program condition byte 313 with the bit 05 of CP at 1 level (reading of RAM) and the program addresser L07 with the address of the first instruction of the program loaded. This last operation has been described in detail with reference to Table N and, as has been seen, is performed by a single instruction LAC.

From this point on, the program loaded performs its diagnostic functions on the program recorded in the remaining part of the RAM 1.

In this way it is possible to execute DBG programs of a certain complexity and, therefore, of a certain length without affecting the program to be tested contained in the RAM 1.

In fact, let it be assumed that the program to be tested and the data thereof completely occupy the free zone of the RAM 1, so that there is no memory available for loading a DBG program even of the smallest size. In this eventuality it would not be possible to load the DBG program without at least partially destroying the program under test and it would then not be possible to cause the two programs to function alternately. Consequently, as already stated in the introduction, the programmer would have to test the program on a processor of higher capacity and such as to contain the program under test and the DBG programs at the same time.

By means of the system according to the invention, on the other hand, by simply bringing the key 100 into the DBG position, introducing the M.C. 9 into the M.C. reader 9' and actuating the bar S2, the computer is put into the DBG condition and the program contained in the M.C. is loaded into the registers 360–367 or 360–365.

This operation does not affect the free memory zone and, therefore, the program under test. From this point on, as has been seen, the program introduced from the M.C. is executed.

More particularly, let it be assumed that the M.C. program transfers to an external support an area of memory containing a part of the program to be tested, for example the second half. Let it be assumed, moreover, that it introduces into this area a DBG program which is then enabled to process the first half of the program under test resident in the RAM 1; by then acting on the key 100, alternate operation of the two programs can be obtained. The DBG program then carries out the diagnostics processing operations and supplies the results of the check affected by printing, for example, the errors made in the compilation of the program under test. The DBG program has moreover been compiled so as to recognize whether in the RAM 1 there are no more instructions of the program under test to be checked.

At this point, the DBG program provides for transferring the checked and corrected part of the program under test to an external support and for loading in its place the second half of the program under test previously transferred to the external support.

The second half of the program under test is then checked and the results of the check effected are printed in a manner similar to that mentioned before.

Thereafter, the programmer is able to make the corrections in the instructions on the basis of the check effected by the DBG program and to reload the corrected program into the RAM 1. The programmer then commands the execution of the program corrected in this way. From what has been said, it has been seen how, by utilizing the DBG system according to the invention, the programmer has the possibility of performing even the most complex checks without affecting the program under test.

As has been said, the DBG system according to the invention moreover enables DBG programs already recorded in the ROM 2 to be called simply by actuating the key 100 and one of the bars 102 (S0, S1, S6).

5. Read-RAM 1 program (bar S0 and BLOCK PROGRAM B0)

More particularly, if the introduction from the keyboard is completed with the actuation of the bar S0 logical decision 423, FIG. 11c), a jump is made to the address 17AE. At this address there is recorded an instruction AP, 1 which forces the address $\phi\phi$C7 into the register P1-311; then there is executed an instruction YBP, 1 which forces the address $\phi\phi$C7 into the register RB-310. The bit 02 of the byte BSD-351 is zeroized by means of the instruction N1 (block 435 of FIG. 11d). Then, by means of the instructions YBP,1 and SP,1, the base register RB-310 is brought to $\phi16\phi$ and the register P1 to $\phi\phi1\phi$ (block 436). A check is then made by means of the instruction CBI, to see whether data have been introduced into the register 64 (logical decision 437). If data have been introduced in the keyboard, a jump is made to the address 7C4, otherwise the instruction ARI is executed, which adds the constant 4 to the contents of the register 365 (block 438). As has been seen, this register contains the relative address of the interrupted program (block 408 of FIG. 11a). This address modified in this way is then transferred to the register 362 by means of the instruction LR and an unconditional jump is executed to the address 173E (block 409 of FIG. 11a). As has been seen, from the block 409 on there begins the visual display of the instruction contained at the address loaded into the register 362.

In this case there are visually displayed the two bytes following the instruction previously visually displayed. Therefore, by actuating the key 100 and the bar S0, the instructions of the program to be corrected can be visually displayed one at a time on the display 7.

If, on the other hand, the actuation of the bar S0 has been preceded by the introduction of an address (logical decision 437) or an introduction from the keyboard has been concluded with the actuation of the bar S1 (logical decision 424 of FIG. 11c), a jump is made to the address 17C4. The contents of the register 364, which contains the address entered on the keyboard (block 421 of FIG. 11c), are packed and transferred to the register 362. These operations are indicated by the block 439 of FIG. 11e.

Then, by means of the instructions NIC and BD, a check is made to see whether the bar actuated is S0 or S1; this is done by means of an AND between position 9 of the conditions register 359 previously compiled according to the bar actuated (FIG. 13) and the constant 1101 (block 440). If the AND is zero, a jump is executed to the address 173C. Therefore, there are carried out the operations described starting from the block 408 of FIG. 11a, that is the instruction whose address has been introduced from the keyboard 5 and which is now recorded in the register 362 (block 439 of FIG. 11e) is visually displayed. To sum up, if an address is introduced on the keyboard 5 and the bar S0 is actuated, the instruction contained at the address entered is visually displayed.

6. STOP reservation program (Bar S1 and BLOCK PROGRAM B1)

If, on the other hand, the bar S1 has been actuated, the register RB-310 is brought to $\phi158$ by means of the instructions TLD,2 and YBP. Then there is formed the sum (AR) of the contents of the registers 361 and 362 and the result is recorded in the register 361 (block 442). As has been said with reference to block 415 of FIG. 11b, the register 361 contains the base register RB-320 of the interrupted program, while the register 362 (block 430) contains the relative address entered on the keyboard 5. Therefore, by means of the operations described by the block 442, there is compiled in the register 361 the absolute address of the interrupted program selected by the programmer by means of the keyboard 5.

By means of an instruction CVB, the absolute address expressed in binary is decoded into decimal and is transferred to the first and second bytes of the register 361 (block 443). This address is transferred to the register IS-350 by means of the instructions SP,2;TLD,1;YBP,1;TLD,1 (block 444). By means of the instructions 01,AP,2;YBP,1;BD the bit 02 of the byte BSD-351 is put to 1, the address $\phi16\phi$ is then forced into the register RB-310 and an unconditional jump is thereafter made to the address 17BE (block 438 of FIG. 11d). From this point on, the operations described with reference to blocks 438' (FIG. 11d), 409 and the following ones (FIGS. 11a and 11b and c) are repeated, so that the instructions previously visually displayed remains on the display 6. It has been seen, therefore, that if the programmer enters a relative address on the keyboard 5 and actuates the bar S1, the absolute address corresponding to that entered is automatically written in the register IS-350 and the bit 02 of the BSD-351 is put to the binary 1. As explained hereinbefore, these data are used by the interpreter microprogram to check at the beginning of the phase ALFA of each instruction whether the address of the instruction in progress is equal to that reserved (logical decisions 258 and 262 of FIG. 10b).

After reserving the STOP address, the programmer brings the key 100 back into the NORMAL position and actuates the RUN key or pushbutton. The processing of the program to be corrected and previously interrupted is therefore resumed starting from the instruction visually displayed on the display 6.

The interpreter program will therefore stop the processing and display the instruction visually when the reserved address is the same as the address of the instruction to be executed.

The usefulness of a DBG program for "reservation of a program stop address" becomes obvious if the case of a program to be corrected which is wrong from a certain point onwards is considered.

In this case, it is useful to stop the processing operations directly at the beginning of the block of instructions in which it is assumed that there is an error.

7. Writing-in RAM 1 program (Bar S6 and BLOC PROGRAM B6)

If, after introducing eight hexadecimal characters, the programmer actuates the bar S6 (logical decision 425 of FIG. 11c), the DBG program executes a jump to the block 446 of FIG. 11f, which corresponds to the address 17EE of Table L.

Starting from this address there is recorded the "writing-in-RAM 1 program" and therefore, as will be explained hereinafter, the eight hexadecimal characters are regarded as a modification of the contents of the RAM 1.

The first instruction recorded at the address 17EE is an instruction AP,2 which positions the pointer P2-312 at the fourth byte of the register 364, while the following instruction TCP positions the pointer 1-311 at the first byte of the register 364. As has been said with reference to block 421 of FIG. 11c, the characters introduced from the keyboard are recorded in the register 364.

The instructon YTC is then executed, which packs and transcodes the characters introduced which are present in the register 364; these instructions are represented symbolically by the block 446 of FIG. 11f. Then, by means of the instructions TLD,2; YBP,2 and TRD,1, there are transferred to the register P1-311 the contents of the register 362 which, as has been seen (block 420 of FIG. 11c), contains the address of the instruction or data present on the display 6. The register P2-312 is then zeroized by means of an instruction TL,2 (block 447 of FIG. 11f). The contents of the register 364 are transferred by means of the instructions YBP,2; AP,2 and MVC to the register of memory RAM 1 addressed by the register P1-311 (block 448). The register RB-310 is then positioned at the value $\phi16\phi$ (block 449). Thereafter, there is a jump to the address 17BC (block 438 of FIG. 11d) starting from which is visually displayed the instruction or the data following the instruction modified in the manner hereinbefore described.

It has been seen, therefore, how it is possible to modify the contents of the instruction present on the display 6 by entering 8 CRT's on the keyboard 5 and actuating the bar S6.

8. Step-by-step execution program.

Finally, if the operator actuates the RUN key or pushbutton of the console 7 (logical decision 427 of FIG. 11c), a jump is executed to the address 18$\phi$C, as has been said. The instructions TLD,2, TLD,1 and MVC are therefore executed (block 450 of FIG. 11g) to restore the cells CA and CB the two bytes of the register RC-359 previously transferred to the register 367 (see block 403 of FIG. 11a); thereafter, by means of the instructions AP,2; AP,1 and MVC (block 451), the bar enable byte previously transferred to the cell $\phi$18A (block 404 of FIG. 11a) is restored to the register AB-370.

By means of the instructions SP,2; SP,1 and MVC (block 452), the working register 352 previously transferred to the register 366 (block 401 of FIG. 11a) is also restored.

Finally, an instruction YPS is executed, which restores the register OPSR-301 to the register PSR-300 and transfers the register IR-327 to the program addresser LO7 (block 452). In this way, the instruction of the program under test following that visually displayed by the display is read. More precisely, the interpreter program:

1. Executes the jump to the symbolic address IINTE (logical decision 202 and block 250, FIGS. 10a and 10b), inasmuch as the bytes CP-313 and PI-314 always have the bit 05 at one level, since the key 100 is still in the DBG position.

2. Since the bit 01 of the BSD is at zero level (which corresponds to its normal condition), a jump is executed to the address IINTE1 (logical decision 257 and block 265 of FIG. 10b), the bit b01 of the BSD is put to one and finally the execution of the instruction is proceeded with by means of the jump to IALFAR (block 265).

3. At the end of this instruction, the interpreter executes the operations explained in point (1) on the following instruction, and at the logical decision 257 it proceeds in sequence as regards what is stated in point (2). The bit 01 of the BSD is moveover put to zero, so that it is always zeroized before the execution of a DBG program.

4. As explained hereinbefore (FIGS. 10b and 10c), the machine goes on to execute the DBG program and the instruction executed is therefore visually displayed.

It has therefore been seen that if the programmer puts the key 100 in the DBG position and actuates the RUN key, the instruction visually displayed is executed. Each time the RUN key is actuated the program counter is incremented by four units, as has been said with regard to the interpreter, and the processor executes the instruction recorded at this address.

By means of repeated actuation of the RUN key, it is therefore possible to command the execution of an instruction and the visual display of the following instruction of a block of the program under test. This alternate sequence of execution of the instruction is called "step-by-step" execution and its usefulness for the debugging of a program under test is obvious.

CONCLUDING REMARKS

Figure 14:
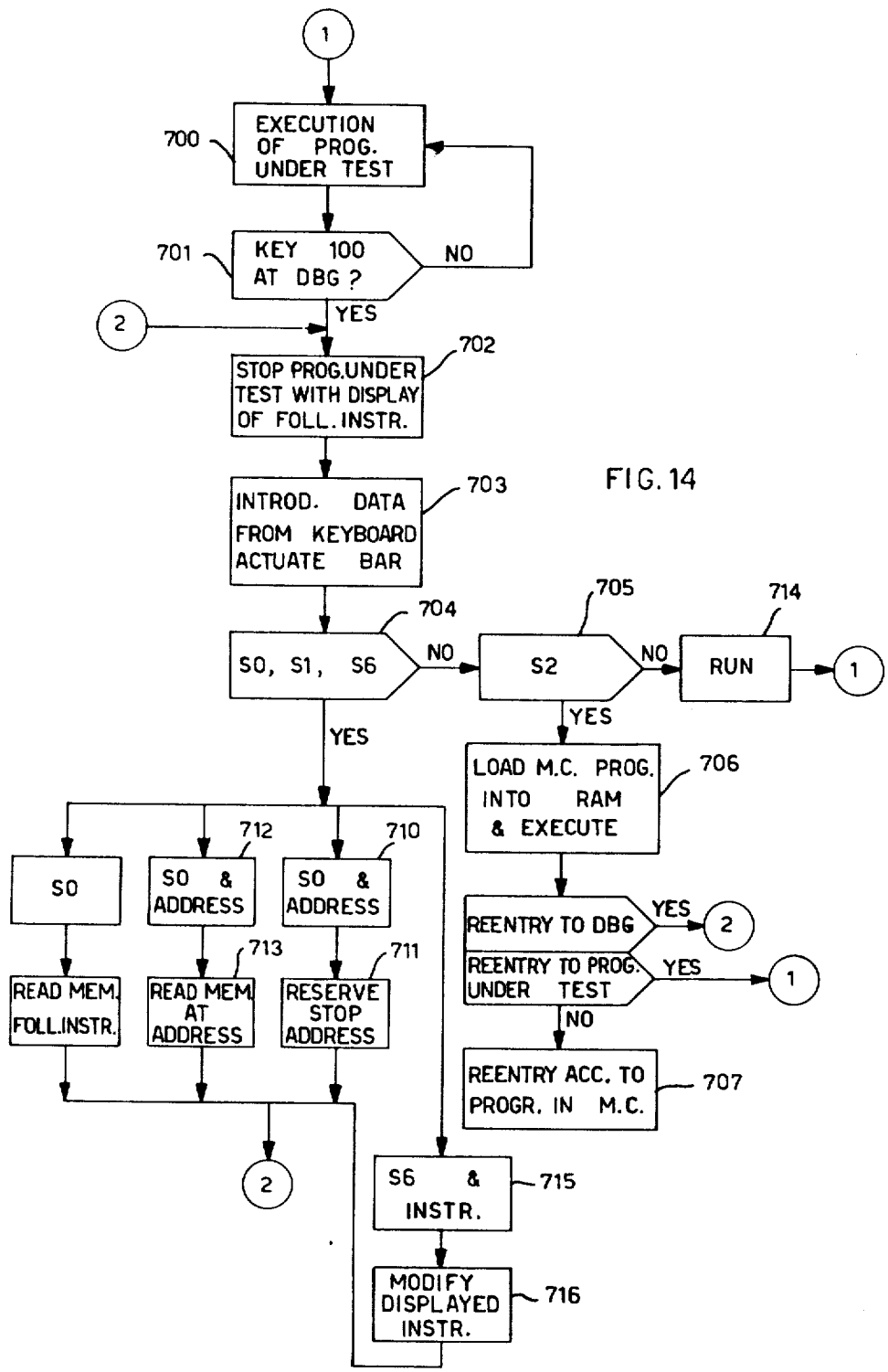
FIG. 14 shows the summary flow chart of the operations of the debugging system according to the invention.

A concluding description of the possibilities offered to the programmer, during the stage or perfecting a program, by the DBG system according to the invention will now be given with reference to FIG. 14.

Normally, the programmer loads the program under test into the computer (block 700) and commands the execution thereof.

When he becomes aware of an error, he turns the key 100 into the DBG position (logical decision 701) and in this way stops the execution of the program under test, then producing visual display on the display unit of the instruction not executed at the instant of the interrupt (block 702). The processor can moreover pass to debugging operation also when the stop address of the processing operations previously reserved has been recognized. In this eventuality, the processor behaves as if the key 100 had been actuated and, therefore, also in this case the significance hereinbefore described for DBG operation is attributed to the bars S0-S6.

At this point, the DBG program enables the bars S0, S1, S2, S6 and puts itself into a state of waiting for the introduction of data from the keyboard (block 703).

According to the bar actuated (logical decisions 704, 705), the processor executes the corresponding DBG program recorded in the ROM 2.

At the end of the DBG programs associated with the bars S0, S1, S6 and the RUN key, the processor returns to the block 701 to request the execution of another DBG program.

If, on the other hand, the operator has commanded through the bar S2 the execution of a program recorded on a M.C. (block 706, the reentry is controlled by the same M.C. program. More particularly, it is possible to have the reentry at the logical decision 701 (program under test or other DBG programs), or at the logical decision 702 and therefore directly into DBG.

The program recorded on a M.C. offers the programmer the possibility of activating other DBG programs recorded on other supports and, consequently, the programmer has at his disposal all the types of reentry he anticipates.

Two simple examples of use of the DBG system according to the invention will now be given.

EXAMPLE I

Let it be assumed that the programmer must look for an error in a program. He may, for example, divide the program into blocks of a certain number of instructions and search for the wrong instruction within the limits of the block. In this case, he must proceed in the following manner.

He turns the key 100 into the DBG position and the instruction following that where the interruption occurs is therefore visually displayed.

He enters on the keyboard the relative address of the instruction at which he desires the program to stop and actuates the bar S1 (blocks 710 and 711).

He brings the key 100 back to the NORMAL position and actuates the RUN key.

The program under test resumes execution up to the reserved address. The program under test stops at this address and the instruction recorded at the reserved address is visually displayed (block 702). Since the program has been executed up to the reserved address, this indicates that there were no formal errors in this block. Let it also be assumed that errors inherent in the program under test are not present. The programmer reserves in the manner hereinbefore seen the address of the following block, brings the key 100 back to NORMAL and actuates the RUN key.

Let it now be assumed that the programmer detects a program error in the second block and that he desires to identify the instruction to be corrected. He then enters the initial address of the block on the keyboard and actuates the bar S0 (blocks 712 and 713). The DBG program provides for visually displaying the address and the corresponding instruction on the display unit, returning therefore to the blocks 702 and 703. At this point, after correcting the errors contained in the block, the programmer actuates the RUN key, which causes resumption of the program under test from the point at which it was interrupted. In this way, the programmer can execute instruction by instruction the block in which he has presumed that there is an error.

When he detects that the instruction visually displayed is wrong, instead of actuating the RUN key, he compiles the correct instruction on the keyboard and actuates the bar S6. In this way, the DBG program replaces the wrong instruction by that entered on the keyboard at the address visually displayed.

In this way, the programmer has the possibility of checking all the instructions of the program and making the corrections which he considers appropriate.

EXAMPLE 2

Let it now be assumed that the program to be perfected occupies all the part of the memory available.

Let it be assumed, moreover, that at the end of all the possible DBG operations executed by the respective programs resident in the ROM 2 the programmer has not been able to eliminate the errors.

From what has been said it is obvious that the program under test cannot be resumed again and therefore the programmer will have to revise his program.

To do this, it is of course useful to him to have the contents of the RAM 1 printed in tabular form. In this way, by analyzing this result, the programmer can trace his way back to the wrong instructions. Of course, in order to carry out the printing of the contents of the memory, it is necessary for a suitable DBG program to monitor the execution of the printing. Since this program does not form part of those recorded in the ROM 2, the programmer can use a M.C. on which this program is recorded.

To obtain the printing of the contents of the memory, the programmer must operate in the following manner:

He introduces the M.C. into the reader 9'.
He positions the key 100 at DBG.
He actuates the bar S2.

As has been seen hereinbefore, this causes the program recorded on the M.C. to be transferred to the registers 360–367 of the ZRM and it is executed immediately.

It is confirmed that the registers 360–367 are not reserved exclusively for the DBG programs, but are used during normal operation to contain intermediate results of a number of instructions.

It is pointed out, moreover, that these registers 360–367 are present in any case in any processor, because it is always necessary to store intermediate results with some instructions (such as, for example, multiplication and division instructions).

It is obvious from what has been said how the use of these registers of the ZRM enables any program recorded on a M.C. to be loaded and executed without affecting the significant parameters of the program under test.

The advantages of this possiblity do not derive exclusively from the DBG program recorded on a M.C., which is limited per se, but derive above all from the ability that the program has of being able to free a memory zone without destroying the contents thereof and of recording a DBG program of greater length and complexity in this zone.

From what has been said, it is obvious how, by using the DBG system according to the invention, the programmer is completely independent as regards the drawing up and perfecting of a program or a modification in an existing program.

It is also clear how the range of possibilities which is offered to the programmer by the system according to the invention is in effect far greater than what has been described hereinbefore. In fact, it depends essentially on the complexity of the problem handled, the number of DBG programs available and, finally, the capacity of the programmer.

It is understood that modifications, replacements or additions of parts may be made in the system for perfecting programs which has just been described without departing from the scope of the present invention.

For example, the key 100 which serves the programmer for activating the debugging programs may be replaced by a pushbutton which enables a changeover switch. The essential result is that the logical level of the signal present on the wire 61 of FIG. 2c be changed over in some way.

Apart from a M.C., the external support for the debugging programs at the disposal of the programmer may be a magnetic tape, a set of punched cards, etc. The sole requirement is that the number of characters recorded on the support be at the most equal to the number of bytes available in the ZRM.

The DBG programs resident in the ROM 2 and described hereinbefore may vary both in number and in content according to the zone of the ROM 2 available and the requirements of the computer.

The function reserved for the bars S0-S6 during the execution of the DBG programs resident in the ROM 2 may be performed by other alphabetic keys or pushbuttons between G and Z, the keys between A and F being used by the hexadecimal code for modifying the instructions. Even pushbuttons added expressly for calling the DBG programs resident in the ROM 2, or switching elements or lock-type keys, come within the variants possible in the program perfecting system which are described in the preceding pages.

The registers 360–367 of the ZRM of the RAM 1, which store the DBG program recorded on an external support during DBG operation, may be arranged in a manner different to that illustrated in FIG. 9. More precisely, they may occupy any cell in the ZRM, provided that their contents are not significant at the end of the instructions which have used them. Moreover, these registers may be disposed not sequentially in the ZRM, but allocated in separate groups. In this case, it will be for the programmer to address these registers correctly during the reading of the M.C.

Finally, both the DBG programs recorded in the ROM 2 and the zone of the RAM 1 (registers 360–367) intended to receive other DBG programs recorded on external supports (for example, M.C.'s) may well be allocated differently. More particularly, they may be allocated to a zone of the RAM 1 prearranged to receive only DBG programs or to a third memory of the central unit 3 intended to contain exclusively DBG programs.

To conclude, it should be made clear that the recognition of the external conditions which concern the DBG programs (key 100 and bars 102) and the following compilation of the registers of the ZRM which are intended to receive the said conditions may be effected in any other manner whatsoever different from that described.

What I claim is:

1. An electronic computer with equipment for debugging operative programs comprising:
    a first memory for storing instructions and data of said operative programs;
    a central unit for processing said programs;
    a switching element normally having a first state for defining a first mode of operation of said computer for processing said operative programs and a second state for defining a second mode of operation for processing a debugging program for debugging said operative programs;
    a keyboard for entering into said first memory information relating to said operative programs during said first mode of operation;
    first means controlled by the switching of said switching element from said first state into said second state to interrupt said first mode of operation and to activate said second mode of operation, second means controlled by the switching of said switching element from said first state to said second state to store the parameters needed to subsequently restart execution of said operative program from the point of interruption,
    third means responsive to the second state of said switching element to enable said keyboard to enter into said first memory information to be processed by said debugging program,
    fourth means controlled by the switching of said switching element from said second state to said first state and responsive to said stored parameters for automatically restarting said operative program, whereby the switching between said modes of operation does not need any intervention by the operator for the correct restart of the operative program.

2. A computer according to claim 1, wherein said switching element is manually operable.

3. An electronic computer with equipment for debugging operative programs comprising:
    a first memory for storing instructions and data of said operative programs;
    a central unit for processing said programs;
    a switching element normally having a first state for defining a first mode of operation of said computer for processing said operative programs and a second state for defining a second mode of operation for processing a debugging program for debugging said operative programs;
    a keyboard for entering into said first memory information relating to said operative programs during said first mode of operation;
    a display unit for displaying information relating to said operative programs during said first mode of operation;
    first means controlled by the switching of said switching element from said first state into said second state to interrupt said first mode of operation and to activate said second mode of operation;
    second means controlled by the switching of said switching element from said first state to said second state to store the parameters needed to subsequently restart execution of said operative program from the point of interruption,
    third means responsive to the second state of said switching element to enable said keyboard to enter information to be processed by said debugging program;
    fourth means responsive to the second state of said switching element to enable said display unit to display information relating to said debugging program,
    fifth means controlled by the switching of said switching element from said second state to said first state and responsive to said stored parameters for automatically restarting said operative program, whereby the switching between said modes of operation does not need any intervention by the operator for the correct restart of the operative program.

4. A computer according to claim 3, wherein said fourth means comprises transmitting means responsive to said switching element to cause during said second mode of operation said central unit to transmit to said display unit the address of the next instruction of said operative program to be executed and coding means for generating a coding of the information located at said address and for supplying said coding to said display unit.

5. A computer according to claim 4 further comprising:
    a condition program register for storing at least one of said parameters including significant results of previously performed instructions,
    said fourth means comprising:
        means conditioned by said switching element to send to said display unit during said second mode of operation the information stored in said condition program register.

6. A computer according to claim 3, wherein said switching element is manually operable.

7. An electronic computer with equipment for debugging operative programs comprising:
    a first memory for storing instructions and data of said operative programs;
    a central unit for processing said programs;
    a switching element normally having a first state for defining a first mode of operation of said computer for processing said operative programs and a second state for defining a second mode of operation for a debugging program for debugging said operative programs;
said debugging program comprising a plurality of blocks;
a keyboard having a plurality of keys for entering into said first memory information relating to said operative programs during said first mode of operation;
first means controlled by the switching of said switching element from said first state into said second state to interrupt said first mode of operation and to activate said second mode of operation;
second means controlled by the switching of said switching element from said first state to said second state to store the parameters needed to subsequently restart execution of said operative program from the point of interruption,
third means responsive to the second state of said switching element to enable said keyboard to enter into said first memory information to be processed by said debugging program;
fourth means controlled by said switching element during said second mode of operation to associate a group of predetermined keys of said plurality to a corresponding block of said debugging program and to cause said central unit to selectively activate each of said blocks for processing information introduced from said keyboard before the actuation of one key of said group;
fifth means controlled by the switching of said switching element from said second state to said first state and responsive to said stored parameters for automatically restarting said operative program, whereby the switching between said modes of operation does not need any intervention by the operator for the correct restart of the operative program.

8. An electronic computer with equipment for debugging operative programs comprising:
a first memory for storing instructions and data of said operative programs;
a central unit for processing said programs;
a switching element normally having a first state for defining a first mode of operation of said computer for processing said operative programs and a second state for defining a second mode of operation for processing a debugging program for debugging said operative programs, said debugging program comprising a plurality of blocks;
a keyboard having a plurality of keys for entering into said first memory information relating to said operative programs during said first mode of operation;
a display unit for displaying information relating to said operative programs during said first mode of operation,
first means controlled by the switching of said switching element from said first state into said second state to interrupt said first mode of operation and to activate said second mode of operation,
second means controlled by the switching of said switching element from said first state to said second state to store the parameters needed to subsequently restart execution of said operative program from the point of interruption,
third means controlled by said switching element to enable said keyboard to enter information to be processed by said debugging program;
fourth means controlled by said switching elements to enable said display unit to display information relating to said debugging program;
fifth means controlled by said switching element during said second mode of operation to associate a group of predetermined keys of said plurality to a corresponding block of said debugging program and to cause said central unit to selectively activate each of said blocks to process information introduced from said keyboard before the actuation of one key of said group;
sixth means controlled by the switching of said switching element from said second state to said first state and responsive to said stored parameters for automatically restarting said operative program, whereby the switching between said modes of operation does not need any intervention by the operator for the correct restart of the operative program.

9. A computer according to claim 8 wherein said central unit comprises an addressing register for addressing the instructions of said operative program stored in the locations of said first memory during said first mode of operation, and wherein said fourth means are responsive to the address stored in said addressing register to enable said display unit to display said address and the information stored in the location addressed by said addressing register, whereby the display unit displays the address and the content of the location of the first memory corresponding to the instruction to be executed at the moment of the interruption caused by said switching element.

10. A computer according to claim 9, wherein said fifth means are responsive to the depression of a third key of said group for activating a third block of said debugging program, further comprising:
means controlled by the instructions of said third block for replacing in the location of said first memory addressed by said addressing register the information stored therein and displayed by said display unit with informations entered by said keyboard.

11. A computer according to claim 9 wherein said fifth means are responsive to the depression of a first key of said group for activating a corresponding first block of said debugging program, further comprising:
means controlled by the instructions of said first block for storing into said addressing register an address entered by said keyboard, said fourth means are responsive to the address stored in said addressing register to enable said display unit to display said address and the information stored in the location addressed by said addressing register.

12. A computer according to claim 11 further comprising:
means controlled by the instructions of said first block for incrementing the content of said addressing register at each successive depression of said first key, whereby the operator is allowed to inspect the content of said first memory starting upon the location identified by the content of said addressing register.

13. A computer according to claim 9 wherein said fifth means are responsive to a second key of said group for activating a corresponding second block of said debugging program, further comprising:
a program stop booking register;

first storing means controlled by the instructions of said second block for storing a condition indicating the actuation of said second key;

second storing means controlled by the instructions of said second block for storing into said program stop booking register a stop address entered by said keyboard;

sixth means operative during said first mode of operation for testing said condition;

seventh means actuated by said sixth means in presence of said condition for comparing the contents of said addressing register and said program stop booking register;

eighth means controlled by said seventh means in presence of the equality of said addresses for interrupting the execution of said operative program and conditioning said fourth means to display the booked address and the relevant content of the first memory.

14. An electronic computer with equipment for debugging operative programs comprising:

memory for storing instructions and data of said operative programs;

said memory including a service register for storing data not relevant at the end of each instruction;

a central unit for processing said programs;

a switching element normally having a first state for defining a first mode of operation of said computer for processing said operative programs and a second state for defining a second mode of operation for processing a debugging program for debugging said operative programs;

a keyboard having a plurality of keys for entering into said memory information relating to said operative programs during said first mode of operation, a peripheral unit for entering information recorded in an external support into said memory;

first means controlled by the switching of said switching element from said first state into said second state to interrupt said first mode of operation and to activate said second mode of operation;

second means responsive to said switching element and controlled by a predetermined key of said keyboard for causing said central unit during said second mode of operation to transfer the program read on said support into said service register and for activating the execution of the program stored in said service register;

third means responsive to predetermined instructions of said program stored on said support for defining the starting point of the program to be executed at the end of the execution of the program stored on said support.

15. An electronic computer with equipment for debugging operative programs comprising:

a memory for storing instructions and data of said operative programs, said memory including:

a zone for storing instruction data not relevant at the end of each instruction;

a central unit for processing said programs;

a switching element normally having a first state for defining a first mode of operation of said computer for processing said operative programs and a second state for defining a second mode of operation for processing a debugging program for debugging said operative programs;

a keyboard having a plurality of keys for entering into said memory information relating to said operative programs during said first mode of operation;

a display unit for displaying information relating to said operative programs during said first mode of operation;

a peripheral unit for entering information recorded on an external support into said memory;

first means controlled by the switching of said switching element from said first state into said second state to interrupt said first mode of operation and to activate said second mode of operation;

second means controlled by said switching element to enable said keyboard to enter information to be processed by said debugging program;

third means controlled by said switching element to enable said display unit to display information processed by said debugging program;

fourth means controlled by a predetermined key of said keyboard for causing said central unit during said second mode of operation to transfer the program read on said support into said zone of the memory and fifth means for activating the execution of the program stored in said zone;

sixth means responsive to predetermined instructions of said program stored in said zone for defining the starting point of the program to be executed at the end of the execution of the program stored in said zone.

16. An electronic computer with equipment for debugging operative programs comprising:

a memory for storing instructions and data of said operative programs, said memory including a zone for storing instruction data not relevant at the end of each instruction;

a central unit for processing said programs;

a switching element for selectively defining a first mode of operation of said computer for processing said operative programs and a second mode of operation for processing a debugging program for debugging said operative programs;

said debugging program comprising a plurality of blocks;

a keyboard for entering into said memory information relating to said operative programs during said first mode of operation;

said keyboard comprising a plurality of keys;

a display unit for displaying information relating to said operative programs during said first mode of operation;

a peripheral unit for entering information recorded on an external support into said memory, first means conrolled by said switching element to interrupt said first mode of operation and to activate said second mode of operation;

second means controlled by said switching element to enable said keyboard to enter information to be processed by said debugging program;

third means controlled by said switching element to enable said display unit to display information processed by said debugging program;

fourth means controlled by said switching element during said second mode of operation to associate a group of predetermined keys of said plurality to a corresponding block of said debugging program and to selectively activate each of said block to process information introduced from said keyboard before the actuation of one key of said group;

fifth means controlled by a key of said group for causing said central unit to transfer the program read on said support into said zone memory and to activate the program stored in said zone.

* * * * *